(12) United States Patent
Cheung et al.

(10) Patent No.: US 9,566,758 B2
(45) Date of Patent: Feb. 14, 2017

(54) DIGITAL FLEXURAL MATERIALS

(71) Applicants: Kenneth C. Cheung, Boston, MA (US); Neil Adam Gershenfeld, Somerville, MA (US)

(72) Inventors: Kenneth C. Cheung, Boston, MA (US); Neil Adam Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 104 days.

(21) Appl. No.: 13/961,880

(22) Filed: Aug. 7, 2013

(65) Prior Publication Data

US 2014/0037873 A1 Feb. 6, 2014

Related U.S. Application Data

(63) Continuation-in-part of application No. 13/924,530, filed on Jun. 21, 2013, and a continuation-in-part of
(Continued)

(51) Int. Cl.
*B32B 3/06* (2006.01)
*B64C 1/00* (2006.01)
(Continued)

(52) U.S. Cl.
CPC . *B32B 3/06* (2013.01); *B64C 1/00* (2013.01); *B64C 1/06* (2013.01); *B64C 3/48* (2013.01);
(Continued)

(58) Field of Classification Search
CPC ..... B32B 3/06; B23P 11/00; Y10T 428/24008
(Continued)

(56) References Cited

U.S. PATENT DOCUMENTS 2,314,949 A  3/1943 Palmer
2,380,336 A  7/1945 Schwebel
(Continued)

FOREIGN PATENT DOCUMENTS

DE 202009000527 U1 3/2009

OTHER PUBLICATIONS

Lego Basic Blue Bucket Set 7615 Instructions, 2009.
(Continued)

*Primary Examiner* — Brent O'Hern
(74) *Attorney, Agent, or Firm* — Norma E. Henderson

(57) ABSTRACT

Digital flexural materials are kits of discrete parts that can be assembled into a lattice structure to produce functionally useful assemblies. Digital flexural materials enable design of materials with many small and inexpensive flexures that combine in a lattice geometry that permits deformation without compromising the strength of the assembly. The number of types of parts in a kit is small compared to the total number of parts. A product constructed from digital flexural materials comprises a set of discrete units that are assembled into the structure according to a lattice geometry, with a majority of the units being reversibly connected to at least two other units in the set according to the lattice geometry, and wherein, in response to loading of the structure, a reversible deformation of at least part of the structure occurs. An automated process may be employed for constructing a product from digital flexural materials.

20 Claims, 59 Drawing Sheets

Related U.S. Application Data application No. 13/277,103, filed on Oct. 19, 2011, now Pat. No. 8,986,809.

(60) Provisional application No. 61/680,275, filed on Aug. 7, 2012, provisional application No. 61/394,713, filed on Oct. 19, 2010, provisional application No. 61/662,358, filed on Jun. 21, 2012.

(51) Int. Cl.
- *E04B 1/02* (2006.01)
- *B64C 1/06* (2006.01)
- *B64C 3/48* (2006.01)
- *B64C 3/44* (2006.01)
- *E04B 1/35* (2006.01)
- *E04B 5/43* (2006.01)
- *E04C 5/06* (2006.01)

(52) U.S. Cl.
CPC ........... *E04B 1/02* (2013.01); *B64C 2003/445* (2013.01); *E04B 1/35* (2013.01); *E04B 5/43* (2013.01); *E04C 5/0645* (2013.01); *Y02T 50/145* (2013.01); *Y10T 29/49826* (2015.01); *Y10T 428/13* (2015.01); *Y10T 428/24008* (2015.01)

(58) Field of Classification Search
USPC ...................................................... 428/99, 98
See application file for complete search history.

(56) References Cited

U.S. PATENT DOCUMENTS

| | | | |
|---|---|---|---|
| 3,005,282 A | 10/1961 | Christiansen | |
| 3,157,582 A | 11/1964 | Bobule | |
| 3,339,911 A * | 9/1967 | AF Strom | F16F 1/46 177/225 |
| 3,836,099 A | 9/1974 | O'Neill | |
| 4,009,543 A | 3/1977 | Smrt | |
| 4,247,066 A | 1/1981 | Frost | |
| 4,593,514 A | 6/1986 | Smith | |
| 4,780,643 A | 10/1988 | Ellis | |
| 5,378,185 A | 1/1995 | Ban | |
| 5,398,472 A | 3/1995 | Eichelkraut | |
| 5,453,034 A | 9/1995 | Larws | |
| 6,056,613 A * | 5/2000 | Pike | B63C 9/135 441/106 |
| 6,336,269 B1 | 1/2002 | Eldridge | |
| 6,407,738 B1 | 6/2002 | Wakabayashi | |
| 7,007,370 B2 | 3/2006 | Gracias | |
| 7,162,324 B2 | 1/2007 | Silverbrook | |
| 7,625,261 B2 | 12/2009 | Andersen | |
| 2003/0146346 A1* | 8/2003 | Chapman, Jr. | B29C 66/721 244/123.3 |
| 2006/0046604 A1 | 3/2006 | Scarborough | |
| 2008/0220112 A1 | 9/2008 | Waldrop | |
| 2009/0030501 A1 | 1/2009 | Morris | |
| 2010/0007223 A1 | 1/2010 | Denne | |
| 2010/0018420 A1 | 1/2010 | Menard | |
| 2010/0197148 A1 | 8/2010 | Rudisill | |
| 2010/0260221 A1 | 10/2010 | Yu | |
| 2010/0292836 A1* | 11/2010 | Cheung | B25J 9/1617 700/245 |
| 2011/0123794 A1 | 5/2011 | Hiller | |
| 2013/0189028 A1 | 7/2013 | Gershenfeld | |

OTHER PUBLICATIONS

Supplementary European search report, EP 11846817, international filed Oct. 19, 2011, report dated Feb. 10, 2015.

International search report and written opinion of international searching authority, PCT/US2011/056961, international filing date Oct. 19, 2011, report dated May 21, 2012.

International search report and written opinion of international searching authority, PCT/US2013/047195, international filing date Jun. 21, 2013, report dated Nov. 1, 2013.

International search report and written opinion of international searching authority, PCT/US2013/054034, international filing date Aug. 7, 2013, report dated Apr. 15, 2014.

International search report and written opinion of international searching authority, PCT/US2013/056063, international filing date Aug. 21, 2013, report dated Apr. 28, 2014.

International search report and written opinion of international searching authority, PCT/US2014/022168, international filing date Mar. 7, 2014, report dated Nov. 28, 2014.

* cited by examiner

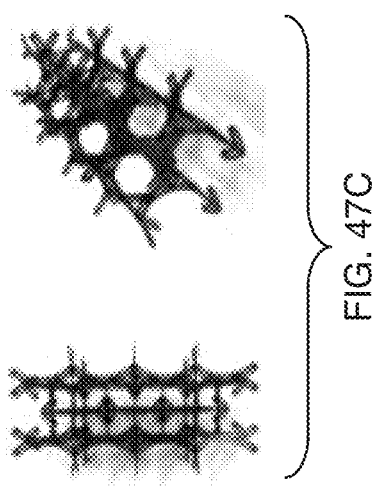
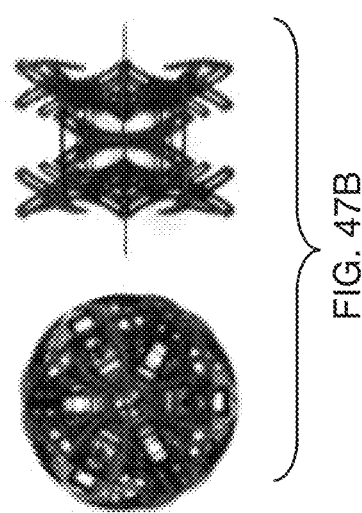
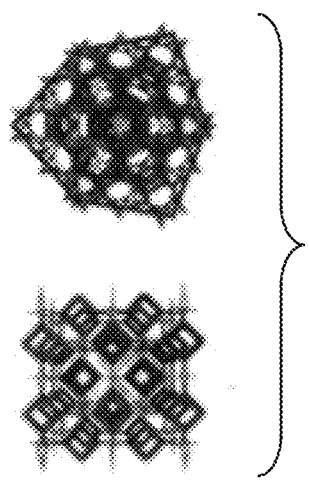
FIG. 47C
FIG. 47B
FIG. 47A

DIGITAL FLEXURAL MATERIALS

RELATED APPLICATIONS

This application claims the benefit of U.S. Provisional Application Ser. No. 61/680,275, filed Aug. 7, 2012, the entire disclosures of which are herein incorporated by reference.

This application is a continuation-in-part of U.S. patent application Ser. No. 13/924,530, filed Jun. 21, 2013, which claims the benefit of U.S. Provisional Application Ser. No. 61/680,275, filed Jun. 21, 2012, the entire disclosures of which are herein incorporated by reference.

This application is also a continuation-in-part of U.S. patent application Ser. No. 13/277,103, filed Oct. 19, 2011, now U.S. Pat. No. 8,986,809, issued Mar. 24, 2015, which claims the benefit of U.S. Provisional Application Ser. No. 61/394,713, filed Oct. 19, 2010, the entire disclosures of which are herein incorporated by reference.

STATEMENT REGARDING FEDERALLY SPONSORED RESEARCH OR DEVELOPMENT

This invention was made with U.S. government support under Grant Number W911NF-11-1-0096, awarded by the Army Research Office. The government has certain rights in this invention.

FIELD OF THE TECHNOLOGY

The present invention relates to digital materials and, in particular, to digital flexural materials.

BACKGROUND

Digital materials are comprised of a small number of types of discrete physical building blocks, which assemble to form constructions that meet the versatility and scalability of digital computation and communication systems. Digital materials promise scalable methods of producing functional things with reconfigurable sets of discrete and compatible parts.

The science of cellular solids has enabled the widespread use of lightweight materials to meet important engineering needs, such as passive energy absorption, but they are not in widespread use for structural applications, perhaps due to a large gap between the strength and stiffness to weight ratios of popular classical solids, and the performance of known lightweight cellular materials that are produced from the same constituent material. The engineering of fiber reinforced composite materials has enabled structures with large reductions in weight for given strength and stiffness targets, but at very high design and processing costs, and many challenges in producing mechanical interfaces (joints). Continuously shape-morphing structures have mostly focused on traditional kinematics with flexural components that match or exceed the deformation length scales, and/or rely on high density and high cost materials such as piezoelectric ceramics, shape memory alloys, and electro-active polymers. This has limited the size, degrees of freedom, and manufacturability of shape-morphing structures to date.

Conventionally designed and engineered fabrication methods employ digital computation and communication algorithms to control analog mechanical equipment that additively or subtractively forms shapes from masses of bulk material. Digital material systems instead propose a method for fabrication from discrete parts with discrete relative local positioning, instead of continuous variation of composition and location of material, as in an analog fabrication system. This may be thought of as printing, noting that an important distinction between digital material printing and conventional commercially available three dimensional printing processes is that digital material printing is reversible, and the information regarding the shape, assembly, and function of a finished product is intrinsic to the material that it is composed of.

Structure design and construction requires consideration of multiple factors. The design and fabrication process will generally include considerations of: 1) design requirements, 2) likely failure modes, 3) stress analysis for failure modes identified, 4) material selection and behavior, 5) fabrication, and 6) testing, all within the context of the overall design goals. For example, in order to achieve reduction in weight, increase in strength, and reduction in cost, the engineering design, materials of construction, and methods of fabrication must all be considered. In general, modern fabrication techniques include various additive and subtractive processes, employing a range of materials, including, but not limited to, composite materials, cellular materials, and digital materials.

"Composite materials" describes any two materials which are combined together in a single bulk material to obtain the best properties from both materials. Many industries are shifting towards the use of more composite materials because they display the single most significant consideration for any application: low weight compared to strength. The material properties of composites are unlike any material thus far, because they combine the properties of a high modulus and high tensile strength fiber for flexibility and strength, with a low modulus stiff matrix which transfers forces from one fiber to the next, creating essentially a continuous analog bulk material. Fiber-reinforced composite materials have thus enabled construction of structures having large reductions in weight for given strength and stiffness targets, but this reduction comes at the cost of very high design and processing costs and many challenges in producing mechanical interfaces (joints).

Composites are still problematic as the material of choice hindering widespread use for many reasons. First, composites vary in fibers, resins, and weaves from one manufacturer to the next, with strength and weight dependent on layup and direction of weave. Second, composites require an energy intensive process. Highly skilled technicians are never really able to have complete control over the application of pressure and heat to allow for proper curing and even distribution of heat over the entire surface [Dorworth, C. Louis, Gardiner L. Ginger, Mellema M. Greg, "Essentials of Advanced Composite Fabrication and Repair", 2010]. Third, any flaw detected in a composite skin renders the entire material a complete waste, or makes repair difficult since creating the exact conditions to maintain bond strength is close to impossible to achieve. Fourth, not only is the composite surface designed, but the tooling and moulding for the composite is just as intensive as the final part. In the process of mitigating stress concentration, composite skins are ultimately labor intensive, time intensive, and expensive.

"Cellular materials" or "cellular solids" refers to the material structure of any living or nonliving matter, typically described as anisotropic and unidirectional or isotropic and having the same properties in all directions. Cellular materials can fill space in two-dimensions as extruded honeycomb or prismatic cells or three-dimensions as space filling polyhedra in various lattice formations. Cellular materials have been mimicked in engineered foam core structures used in construction, aerospace, and medical industries. These man made materials can be designed as highly porous scaffolds or fully dense structures which can be mechanically tuneable for a specific performance. While the science of cellular solids has enabled widespread use of lightweight materials to meet many important engineering needs, such as passive energy absorption, cellular solids are not presently in widespread use for structural applications, perhaps due to a large gap between the strength and stiffness to weight ratios of popular classical solids and the performance of known lightweight cellular materials produced from the same constituent material.

Material science has made much progress in the description of natural cellular solids, such as wood and bone [Gibson, L. J., "Biomechanics of cellular solids", Journal of Biomechanics, vol. 38, pp. 377-399, 2005]. Such biological cellular solids may be considered to be a prime example of natural structural fabrication that is high performing with complex constraints. For analysis, it is now typical to treat cellular materials as classical solids. The properties of the cellular solid are therefore defined by the properties of the solid material that it is made from (the "constituent solid"), and its spatial configuration [Gibson, L., & Ashby, M., Cellular Solids, Structure and Properties, Cambridge University Press., Cambridge, UK, 1988].

Much of the art of continuum mechanics of cellular solids lies in developing a classically analyzed cell model that is an effective representation of the stochastically varying nature of the actual material. The field has done quite well to characterize readily available natural cellular solids in this manner. Natural scaling laws are well known [Gibson, L., & Ashby, M., Cellular Solids, Structure and Properties, Cambridge University Press., Cambridge, UK, 1988], and relate the mechanical properties of the cellular solid to those of the constituent solid material (that which comprises cell edges and/or walls), via the relative density of the former to the latter.

A large variety of applications have developed around the science of cellular solids, evidenced by the widespread use of these materials for passive energy absorption, thermal insulation, and fluid filtering [Maiti, S. K., Gibson, L. J., & Ashby, M. F., "Deformation and Energy Absorption Diagrams for Cellular Solids", Acta Metall, Vol. 32, no. 11, pp. 1963-1975, 1984]. However, despite their low density, they are largely limited in their use for structural applications, because for the weight of popular and inexpensive cellular solids, they are not particularly strong. The conventional model typically considers the geometry of stochastic foams to be such that transverse beam bending dominates the behavior of the material [Gibson, L., & Ashby, M., Cellular Solids, Structure and Properties, Cambridge University Press., Cambridge, UK, 1988]. This results in an overall relative modulus that is expected to be proportional to the square of the relative density, for natural foams.

$$\frac{E^*}{E_s} \propto \frac{\rho^2}{\rho_s^2} \quad \text{Equation 1}$$

In additional to biological cellular solids, this scaling law is useful for analyzing and predicting the properties of non-biological natural foams (e.g. pumice) and engineered foams (e.g. polymer foams, metal foams), whether chemically or mechanically produced. Further analogies to natural cellular structures exist in conventional engineered structures [Aizenberg, A., Weaver, J., Thanawala, M. S., Sundar, V. C., Morse, D. E., & Fratzl, P., "Skeleton of Euplectella sp.: Structural Hierarchy from the Nanoscale to the Macroscale", Science, vol. 309, pp. 275-278, 2005]. Depending on the relative scale desired for analysis, one might look towards the aforementioned engineered foams, or space frame trusses and aero-structures.

Architecture and civil engineering have employed space frame truss structures for many years. These have not previously been scaled volumetrically, as a perfect lattice, to the orders of units that make it practical to consider the bulk assemblies as a continuum, as would be beneficial for engineering and design purposes. Further, it is well known that space frames with many elements sharing structural duty possess highly desirable characteristics in terms of failure modes and damage tolerance [Lakes, R., "Materials with structural hierarchy", Nature, vol. 361, pp. 511-515, 1993; Huybrechts, S., & Tsai, S. W., "Analysis and Behavior of Grid Structures", Composites Science and Technology, vol. 56, pp. 1001-1015, 1996]. This is evident in "geodetic" airframe designs [Paul, D., Kelly, L., Venkaya, V., & Hess, T., "Evolution of U.S. Military Aircraft Structures Technology", Journal of Aircraft, vol. 39, no. 1, pp. 18-29, 2002]. The current state of robotic manufacturing technology makes it easy to see how massively parallel assembly of digital materials can be implemented, including the assembly of structures that are larger than the assembly machinery.

The commercial aerospace industry has been moving towards aircraft designs that have fewer but larger monolithic fiber composite parts, in order to produce highly tuned and lightweight structural systems that meet extreme service, monitoring, and general environmental requirements. Conventional wisdom is that larger monolithic parts are better than an assembly of smaller parts because producing effective joints between parts is highly problematic in practice. Conventional manufacturing processes have scaled up, accordingly, which requires tools (e.g., molds for defining the shape of the part), and ovens (e.g., autoclaves for polymer matrix curing) that are large enough to influence the size of the buildings that must contain them. Some may consider that the expense involved with these manufacturing methods limits the industry altogether; there is no question that it limits prototyping capabilities. Further, the per-part investment is high enough to warrant complex repair processes as defects of small relative size arise, to say nothing of their contribution to resource intensive qualification procedures [U.S. Department of Defense, Composite Materials Handbook, "Polymer Matrix Composites Guidelines for Characterization of Structural Materials", MIL-HDBK-17-1F 1, 2002].

These relatively recent methods also rely on a basis set of conventional manufacturing and fabrication tools and processes. Conventional subtractive manufacturing processes take solid blocks or sheets of material and machine out material by drilling or milling from the existing material to create the final part. The initial material is analog in nature, but often these discrete parts are combined within larger assemblies using irreversible joining and bonding methods which again, render the assemblies irreversible, with surface resolution depending on the machine tools used, and any error in the part means waste of the entire assembly of materials. Conventional subtractive techniques (i.e. milling, water-jet cutting) work poorly with fiber reinforced polymer materials (i.e. requiring diamond tipped bits for carbon fiber composites, subject to wetting and de-lamination during abrasive water jet cutting). For any given additive or subtractive process, representation of the initial model and translation from initial design to final product requires greater integration than the tools currently offer Several additive methods that use discrete components to create an analog material as a final product are known in the art. Conventional additive fiber reinforced polymer manufacturing techniques involve dynamic weaving and robotic layup about formwork that is the size of a part (or larger), requiring very large investments in tooling. Other conventional rapid prototyping technologies such as additive computer controlled three dimensional material printing processes do not produce structurally tuned fiber reinforced composite parts. Selective laser sintering (SLS) uses high power lasers to fuse powders such as glass, metal or thermoplastics, creating forms that are irreversible. The powders are not analog, but are initially formless particles that are discrete and separate. Upon fusing a particle to another, a new analog material is created that is continuous and attached to adjacent particles to form the larger object. Another such additive method is fused deposition modeling (FDM). FDM takes a coil of thermoplastic or metal wire and deposits material from an extruder by heating and melting the material. Stereolithography (SLA) is similar to SLS, but instead of using powder, uses a vat of liquid with a high power laser to create the part in cured layers [Bourell, D. L., Leu, M. C. & Rosen, D. W (Eds.), Roadmap for Additive Manufacturing: Identifying the Future of Freeform Processing, Austin, Tex., The University of Texas at Austin Laboratory for Free-form Fabrication, 2009]. Electron beam melting (EBM) is another additive process prevalent in the aerospace industry, and uses an electron beam to melt metals such as titanium in powder form. Similar to previous processes, each part is built one layer at a time, solidified and a subsequent layer is built. Current additive manufacturing technologies may utilize the same materials used in manufacturing processes, but the final products rarely behave per material specification, always depend on the machine for surface resolution, and any error in the part generates wasted material.

The aforementioned advances of material science in engineering of cellular solids, such as honeycomb core materials and foams, have resulted in the ability to design with lighter, more elastic, more insulating, and more energy absorptive materials. The practice of treating cellular solids as conventional continuous solids allows for simple application with conventional engineering and design methods. In the context of cellular materials, it has been noted that "constructed" periodic metal lattices allow for much larger cell size, and therefore lower relative density, compared to other methods of producing cellular metals [Wadley, H., "Cellular Metals Manufacturing", Advanced Engineering Materials, vol. 4, no. 10, pp. 726-733, 2002].

A natural result—of the understanding and application of cellular material property scaling laws—has been an interest in ultra-light materials. Ultra-light materials may be considered to include any material that is less than 0.1 grams per cubic centimeter. These materials are generally known to obey a less desirable scaling than the denser stochastic cellular materials [Schaedler, T. A., Jacobsen, A. J., Torrents, A., Sorensen, A. E., Lian, J., Greer, J. R., Valdevit, L., & Carter, W. B., "Ultralight Metallic Microlattices", Science, vol. 334, pp. 962-965, 2011], as in Equation 1.

While this generally applies to aerogels, recent results have shown processes that achieve the quadratic scaling of denser stochastic cellular materials (Schaedler, T. A., Jacobsen, A. J., Torrents, A., Sorensen, A. E., Lian, J., Greer, J. R., Valdevit, L., & Carter, W. B., "Ultralight Metallic Microlattices", Science, vol. 334, pp. 962-965, 2011; Mecklenburg, M., Schuchardt, A., Mishra, Y. K., Kaps, S., Adelung, R., Lotnyk, A., Kienle, L., & Schulte, K., "Aerographite: Ultra Lightweight, Flexible Nanowall, Carbon Microtube Material with Outstanding Mechanical Performance", Advanced Materials, vol. 24, pp. 3486-3490; 2012].

Digital materials promise scalable methods of producing functional things with reconfigurable sets of discrete and compatible parts. Digital materials are comprised of a small number of types of discrete physical building blocks that may be assembled to form constructions that have a level of versatility and scalability that is analogous to that of digital computation and communication systems. Digital materials have specifically been defined in prior work by Popescu as having three main properties at the highest level of description: a finite set of components or discrete parts, a finite set of discretized joints of all components in a digital material, and complete control of assembly and placement of discrete interlocking components [Popescu, G., Gershenfeld, N. and Marhale, T., "Digital Materials For Digital Printing", International Conference on Digital Fabrication Technologies, Denver, Colo., September 2006].

A digital material desktop printer, now called the MTM Snap, was the first application constructed entirely out of discrete, snap-fit, reversible digital materials The entire structure for the MTM Snap is made up of a finite set of discrete parts, with built-in flexural connections and slots that are all milled as one CAD file on any CNC shopbot machine. The parts for the machine are made of high density polyethylene, which as a material demonstrates great potential to create robust and stiff flexural connections, although it can be made out of many other suitable materials. The entire machine can be fabricated within a day, with additional motors and tool heads installed depending on the fabrication method desired. These digital material printers can print or mill their own parts, in order to replicate and build more machines like themselves. Current work at MIT's Center for Bits and Atoms is taking the digital material printer to the next level, by incorporating a pick and place mechanism, called a digital material assembler, which is a machine that picks and places each newly fabricated piece to create the final form.

Digital Cellular Solids are cellular solids that exhibit improvements in relative stiffness and strength compared to relative density, over current practices for producing lightweight materials. This is accomplished by assembling lattice geometries that perform better than any currently made with traditional methods. When implemented with fiber composites, the result is not only stiffer and stronger than any previously known ultra-light material, but it presents a new scalable and flexible workflow for applying fiber composites to engineering problems.

Digital composites would allow for rapid prototyping of fiber composite parts with high throughput robotic digital assemblers. The individual components may be produced through conventional means, as suited for mass production of identical parts. With digital assembly of sparse volumes composed of many smaller components, all of the tooling required may be significantly smaller than the finished assemblies. The possible properties of digital materials are myriad, and they can be designed out of any material using existing fabrication technologies and tools in order to build $$\frac{E^*}{E_s} \propto \frac{\rho^3}{\rho_s^3} \qquad \text{Equation 2}$$

cellular structures for any application. Digital materials, as compared to analog materials, are completely reversible, eliminating waste by allowing individual parts to be reused and recycled at any point in the product lifecycle, no matter how large the assembly.

SUMMARY

The present invention demonstrates the applicability of a digital material approach in designing new cellular materials and methods for assembly of structures with static reconfigurability. As a digital material system, digital flexural materials are kits-of-parts with few primitive part types that can produce functionally useful assemblies, which have life cycle efficiencies exceeding that of conventional engineered fabrication methods. Digital materials allow for the design of materials with many small and inexpensive flexures that combine to deliver large displacements with large forces, and/or tunable elastic phases in a lattice geometry that allows for deformation with simple large scale actuation without compromising the strength of the assembly.

An exemplary application of the invention is aerodynamic devices, such as aircraft wings. Variable geometry mechanisms have been employed in many fields including structural and vehicle (sea, air, or land) design. The purpose is often to adapt to varying environmental physical conditions, and the devices themselves are typically active and have been implemented with extrinsic control and actuation. Digital materials allow for structures with similar changes in geometry by design, but which occur as continuous deformations and, possibly, as passive responses to changes in environmental condition. Current control and actuation systems are extrinsic to the primary aircraft structure. A wing having a digital flexural material structure can be tuned to passively elastically deform to desired shapes as a response to changes in load, load distribution, or pressure that results from changes in airspeed, while maintaining structural integrity.

In one aspect of the invention, a product comprises a set of discrete units assembled, or adapted to be assembled, into a structure, according to a lattice geometry. A majority of the discrete units are each reversibly connected, or adapted to be reversibly connected, to at least two other units in the set according to the lattice geometry. In response to loading of the structure, a reversible deformation of at least part of the structure occurs. The reversible deformation of at least part of the structure is due to at least in part to at least one of: the shape of the units in the set, the material composition of the units in the set, the configuration of connections between the units of the set, and the configuration of the lattice geometry. The connections may be elastic. The units in the set of discrete units are identical or may be of at least two types. At least one of the types of units may be a connector unit. At least one of the types of units may differ in material composition or property from at least another of the types of units. In some embodiments, at least some of the units comprise composite material. In some embodiments, at least some of the units include electrical conductors and others of the units do not include electrical conductors.

In another aspect, the invention is an automated process for constructing a product, comprising assembling a set of discrete units into a structure by reversibly connecting a majority of the set of discrete units to each other, each of the discrete units being reversibly connected, or adapted to be reversibly connected, to at least two other unit in the set according to a lattice geometry, and assembling the reversibly connected discrete units into the structure according to the lattice geometry, such that the structure has the property that, in response to loading of the structure, a reversible deformation of at least part of the structure occurs. In some embodiments, the automated process is controlled by a specially adapted processor implementing a computer algorithm. The mechanical properties of the structure produced by the process may be tuned by changing one or more of: the ratio of different types of the discrete units used to assemble the structure, the shape of the different types of the discrete units used to assemble the structure, the mechanical properties of the different types of the discrete units used to assemble the structure, and the lattice geometry of the structure. At least some of the discrete units may be reversibly connected to other units by connections that are adapted to transfer force between connected units. The automated process of claim 14, wherein some of the connections are elastic connections.

BRIEF DESCRIPTION OF THE DRAWINGS

Other aspects, advantages and novel features of the invention will become more apparent from the following detailed description of the invention when considered in conjunction with the accompanying drawings wherein:

FIGS. 9A-G depict the cuboct truss assembly process, wherein FIGS. 9A and 9B are normal views of truss units, FIG. 9C is a perspective view of truss assembly, FIGS. 9D-F are normal views of truss units after they have been assembled to form a volumetric structure, and FIG. 9G is a perspective view of truss units after they assembled to form a volumetric structure;

FIGS. 47A-C depict three exemplary types of directional connection structures;

FIGS. 49A-C depict a directional connection schematic, wherein FIGS. 49A-C show three units being connected together by inserting a tip of a first unit and a tip of a second unit into a keyhole of a third unit;

DETAILED DESCRIPTION

Figure 1A:
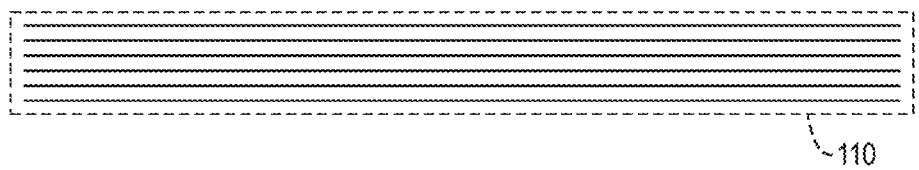
FIGS. 1A-D depict an exemplary conception of a digital composite formed from chained fiber loops, according to one aspect of the present invention.

Digital flexural materials are kits-of-parts with few primitive part types that can produce functionally useful assemblies. They comprise many small and inexpensive flexures that combine to deliver large displacements with large forces and/or tunable elastic phases in a lattice geometry that allows for deformation with simple large scale actuation without compromising the strength of the assembly. Digital flexural materials allow for structures with changes in geometry by design, which occur as continuous deformations and, possibly, as passive responses to changes in environmental condition.

As used herein, the following terms expressly include, but are not to be limited to:

"Analog" means information or physical matter that is represented as a continuous quantity.

"Analog material" means any continuous material or any material used to create a bulk material with special properties, such as, but not limited to, thermoplastics deposited continuously or a solid block of wax. All additive manufacturing processes use materials that are analog in nature to create 2D, 2.5D, and 3D models.

"Digital" means information or physical matter that is represented as discrete quantities or values, depending on the user-defined representation of the system. The term 'digital' in digital fabrication is not to be confused with this definition.

"Digital cellular solid" means a cellular solid that is comprised of digital materials assembled in a lattice geometry.

"Digital composite" means a material comprising many discrete units (digital materials), which units comprise composite material reinforced with anisotropic fibers.

"Digital fabrication" means the use of tools and manufacturing processes that permits taking parts as initial CAD representations, and to then create prototypes that are closer to the final product by using analog materials.

"Digital flexural material" means a digital material that comprises many small and inexpensive flexures that can be combined in a lattice geometry into a structure or flexural material that is able to deliver large displacements with large forces and/or tunable elastic phases, thus allowing for deformation without compromising the strength of the assembly. Digital flexural materials may be used to create structures that can change in geometry by design when force is applied.

"Digital material" means a material made out of components wherein the set of all the components used in a digital material is finite (i.e. discrete parts), the set of the all joints the components of a digital material can form is finite (i.e. discrete joints), and the assembly process has complete control over the placement of each component (i.e. explicit placement).

A primary proposition behind the concept of digital material fabrication is that properly engineered kits-of-parts (with fewer primitives than the average reconfigurable toy construction set), in conjunction with automated assembly and disassembly (hence static reconfigurability), can produce functionally useful parts that have life cycle efficiencies exceeding that of conventional engineered fabrication methods. Structures built with this kit may be well tuned to support a wide range of static and dynamic loads. Further, the system has the ability to gradually adapt to new load patterns, with mobile units that travel over the structure and delete portions of its own structure, as well as other units that are capable of adding new material. Even in its densest form, these structures maintain an integral set of communication channels that allow for the diffusion of information, such as signaling the need to adapt the structure.

Digital Composites can be viewed as engineered cellular solids with many reconfigurable connections. This method of production confines the stochasticity of the material to the production of each part, and allows for highly porous large scale volumetric assemblies. In the case of digital materials, conventional cellular solid analyses are therefore simplified, since the geometry of the cellular structure can be designed as an assembly of digital components. Some variation is introduced through part production and assembly processes, but these can be taken as micro-level stochastic processes that are simple to analyze and characterize.

Figure 1B:
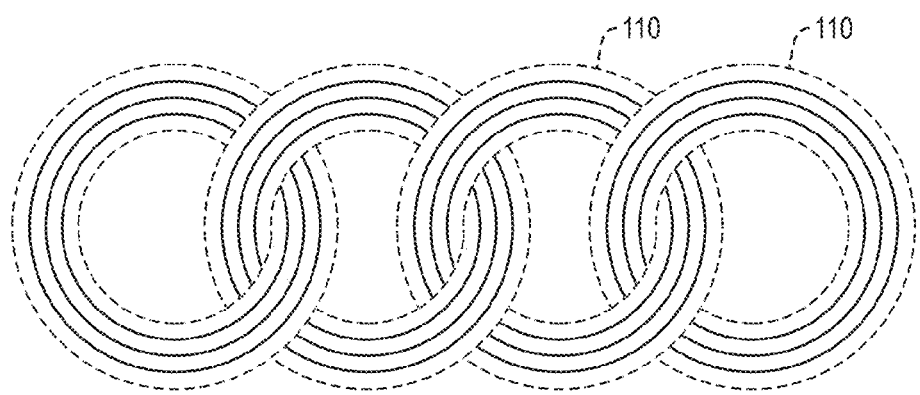
Figure 1C:
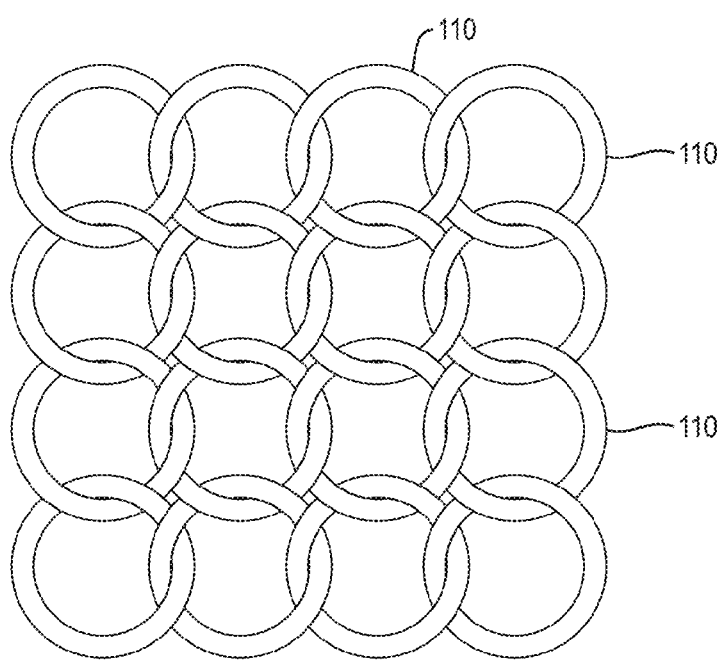
Figure 1D:
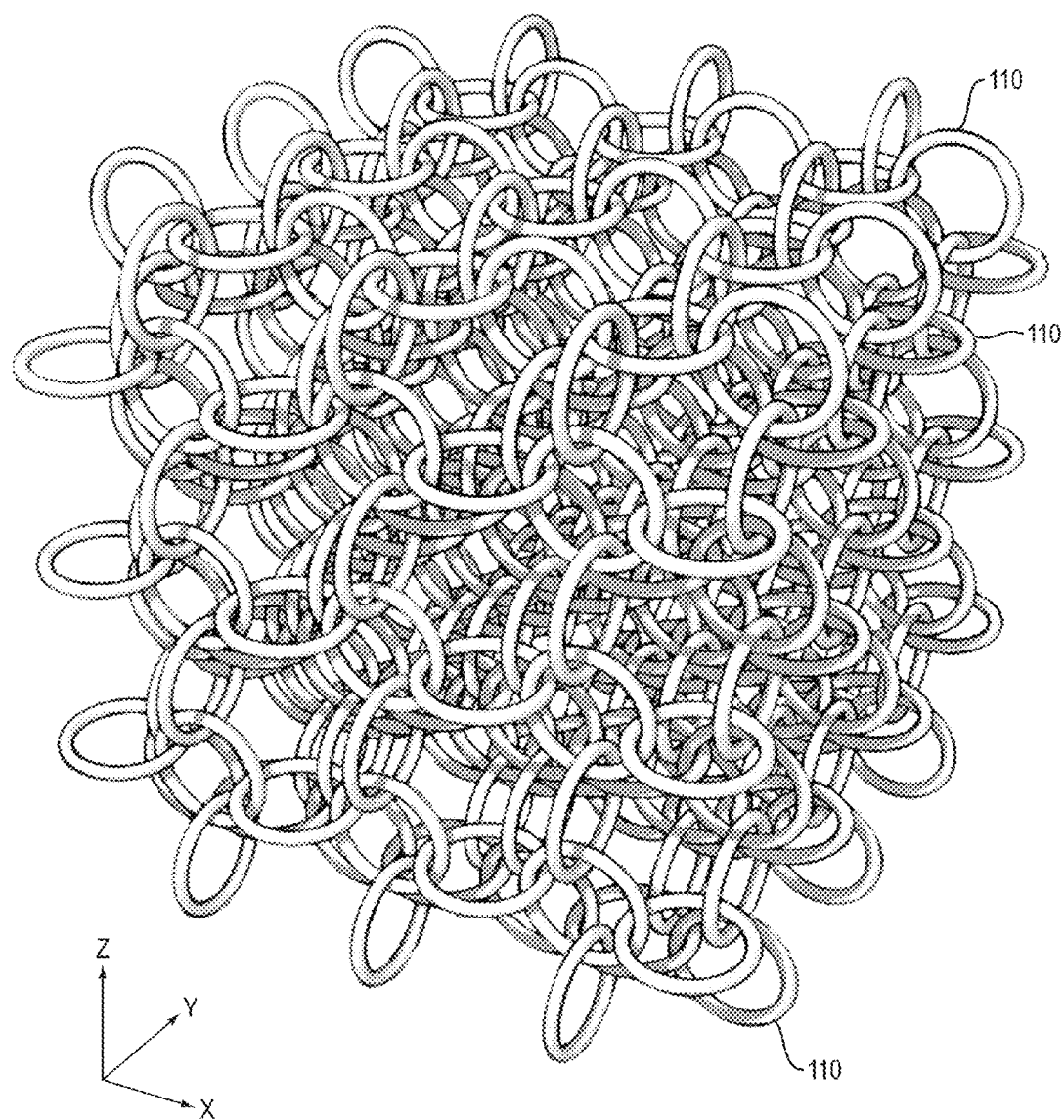
Figure 2A:
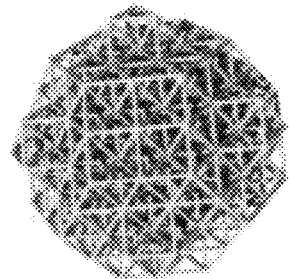
FIGS. 2A-E present examples of structures employing part size hierarchy, core structural variation, and introduction of voids as methods of structural tuning.
Figure 2B:
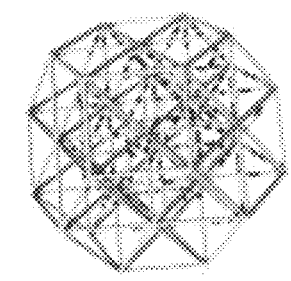
Figure 2C:
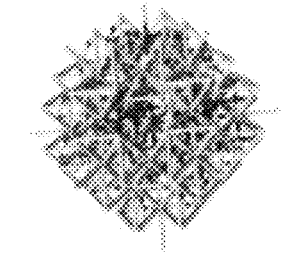
Figure 2D:
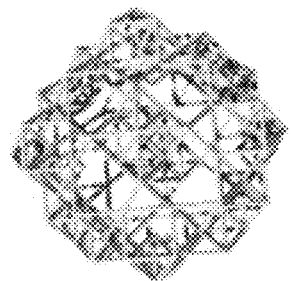
Figure 2E:
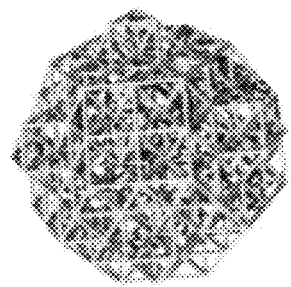

FIGS. 1A-D depict an exemplary conception of a digital composite formed from chained continuous fiber loops. As an application of fiber composites, the core concept is that a chain of discrete fiber composite parts can be close to the strength of a monolithic part, and would have advantages with manufacturing processes, serviceability, and reusability, in addition to the tunability and extensibility that are general goals of digital materials. FIG. 1A depicts a single fiber unit 110 before connection; FIG. 1B depicts a simple chain of loops form from fiber unit 110; FIG. 1C depicts a two-dimensional surface formed from loops 110; and FIG. 1D depicts a three-dimensional volumetric structure formed from loops 110. The structure can therefore be thought of as a chain of parts, each transferring load through load bearing holes with continuous circuits of fiber around their perimeter. In this way, the final structure is an assembly of linked tiles that are individually tuned through their fiber layup, so that forces are transferred between the tiles, rather than having continuous fibers span entire macro-structures.

A major difference between conventional cellular solids and digital cellular solids is the presence of many reversible connections. The primary benefit is the manufacturability of complex geometries that result in mechanical property scaling laws that are quite different to those of both stochastic foams and previously reported non stochastic ultra-light materials. While these connections can also be used to design novel structural behavior, they do come at an overall density cost. It will be shown that this density cost is minimal when employing this strategy for ultra-light materials.

Digital Materials, in general, employ a finite number of types of simple discrete components which can be assembled to large structures according to local-only rules, which makes them good candidates for trivial adaptation to various shapes at a large scale. In addition to simple spatial distribution of regular lattices, precise distribution of parts for a given structural function may also be automatically accomplished through algorithmic distribution throughout a prescribed volume, according to external constraints [Hiller, J., & Lipson, H., "Automatic Design and Manufacture of Soft Robots", IEEE Transactions on Robotics, vol. 28, no. 2, pp. 457-466, 2012]. Other strategies for tuning of mechanical properties include introducing voids, varying part ratios, varying core geometry, and introducing kinematically indeterminate lattice states [Guest, S. D., & Hutchinson, J. W., "On the determinacy of repetitive structures", Journal of the Mechanics and Physics of Solids, vol. 51, pp. 383-391, 2003]. FIGS. 2A-E present examples of structures employing part size hierarchy, core structural variation, and introduction of voids as methods of structural tuning.

Figure 3C:
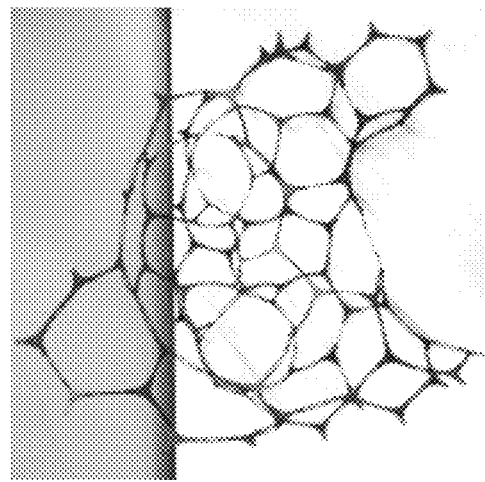
FIG. 3C is an exemplary hyperbolic/geodesic surface kit used in snap-fit flexural lattice studies.
Figure 3B:
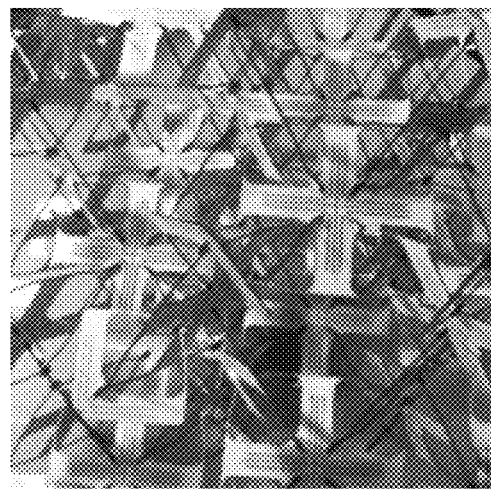
FIGS. 3A and 3B are full and close-up views, respectively of a tensegrity crystal used in snap-fit flexural lattice studies.
Figure 3A:
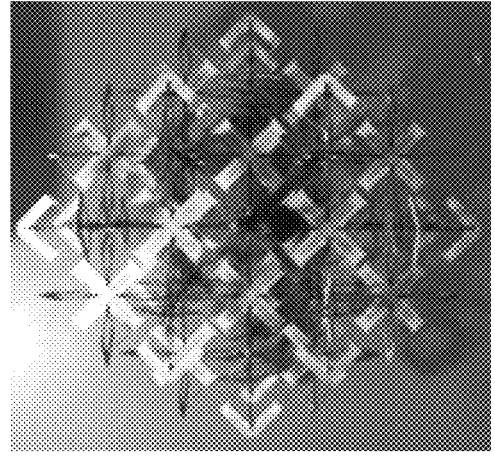

Geometric theory for digital material assemblies as cellular solids. The primary questions surround the effect of geometric design on the relative density of the final structure. FIGS. 3A-C depict exemplary structures used in snap-fit flexural lattice studies. FIGS. 3A and 3B are full and close-up views, respectively of a tensegrity crystal. FIG. 3C is a hyperbolic/geodesic surface kit.

Figure 4C:
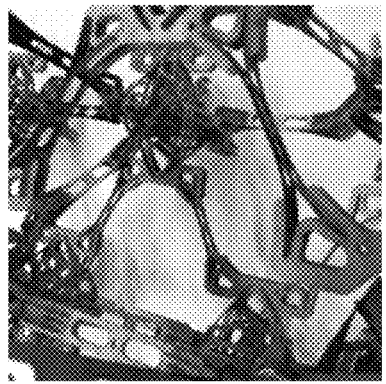
FIGS. 4A-C depict exemplary snap-fit structures that utilize flanged members to increase torsional rigidity, with FIG. 4A showing a simple cubic lattice with two part scheme and FIGS. 4B-C depicting an idealized isotropic lattice structure with regular twelve-connected nodes forming a hexagonally close packed structure.
Figure 4B:
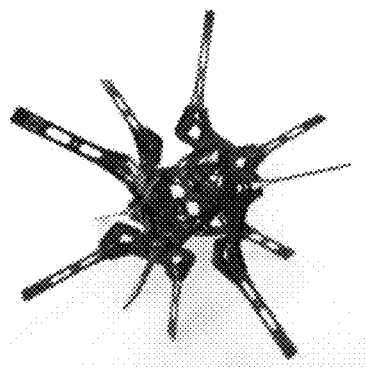
Figure 4A:
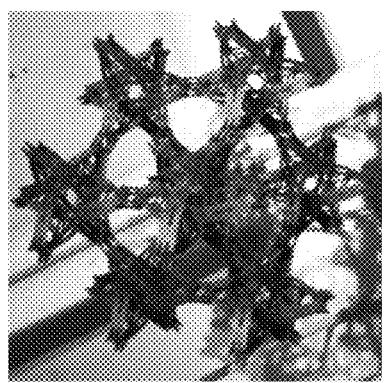
Figure 5D:
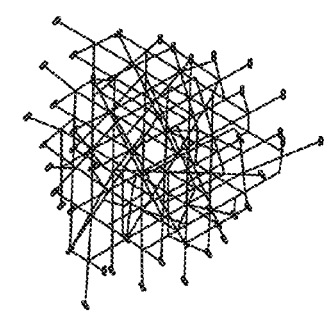
FIGS. 5A-D depict an exemplary two-part scheme for an octet truss.
Figure 5C:
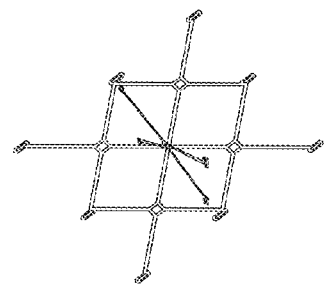
Figure 5B:
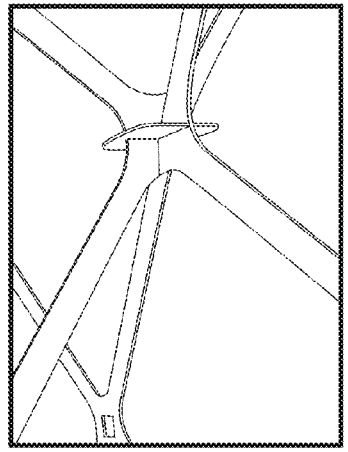
Figure 5A:
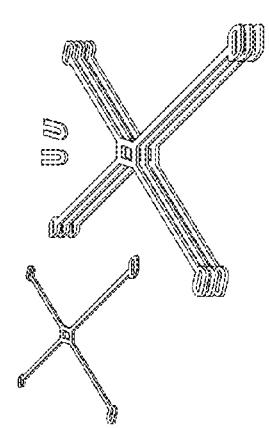

The versatility of the digital material approach, in terms of lattice geometry, is loosely illustrated by the scope of designs shown in FIGS. 4A-C, which were used in snap-fit flexural lattice studies. The designs in FIGS. 4A-C are snap-fit structures that utilize flanged members to increase torsional rigidity. FIGS. 4A-C depict a variety of four-connected units in orthotropic arrangements, topologically similar to the simple cubic lattice with two part scheme that is shown in FIG. 4A. An idealized isotropic lattice structure is shown in FIGS. 4B and 4C, with regular twelve-connected nodes forming a hexagonally close packed (HCP) structure (octet truss with three-part scheme).

While the parts for the schemes above are fabricated as two dimensional shapes, and there are relatively few different shapes per scheme (two for the orthotropic scheme, three for the HCP scheme), there are many parts per spatial unit (twelve for the orthotropic scheme, thirty for the HCP scheme). Given that iterative quantity is required for bulk characterization as a cellular solid, and considering that every connection incurs assembly cost (structural cost/benefit depends on structural objective), the case study that is addressed in the most detail is a simpler design, such as the one shown in FIGS. 5A-D, which depicts a two-part scheme for an octet truss.

At the heart of the original design problem is the decomposition of a regular lattice into self-similar units that tessellate throughout space. The most basic decomposition separates every node and strut member in the lattice into individual units, requiring two connections per strut member and m connections per node, for a lattice with m-connected nodes. When designing a scheme for digital materials, it is advantageous to find ways to partition this lattice into tessellating units that contain multiple strut members each, for practical reasons as well as mechanical reasons that will be discussed in the next section. Considering that the space of all reversible connections used in engineering are fair game for adoption as connection strategies, this may be seen as a very high dimensional problem, wherein certain types of solutions for one factor may constrain the possible solutions for another. This does not prevent examination of the relative importance of a few of the high level geometric decisions that need to be made when embarking on the design process. In particular, density in relationship to connectedness is examined, starting with two dimensional systems and then expanding to three dimensional systems, for clarity.

The oldest record of the two-dimensional minimal edge-packing problem dates back to 36 BC, from Marcus Terentius Varro, and is commonly referred to as the Hexagonal Honeycomb Conjecture. While it has been widely assumed to be true for lack of a counter example, the goal of proving the most efficient division of a plane into similar units stood unsolved until 1999 (a proof by Thomas Hales). There are three obvious regular polygonal area filling tilings of a plane—triangles, squares, and hexagons. However, as long as a pattern is repeating so that a small family of parts can be assembled to produce the final pattern, such as a kagome lattice constructed from triangles [Connelly, R., Fowler, P. W., Guest, S. D., Schulce, B., & Whiteley, W. J., "When is a symmetric pin-jointed framework isostatic?", arXiv: 0803.2325v2 [math.MG] 27 Sep. 2008], the geometry is fair game for digital materials. After the proof of Hales, it is reasonable to believe that hexagonal tiling provides the most space per unit edge, whether produced by regular tiling or not, and therefore the lowest density. Given a polygonal lattice of z-connected nodes and the corresponding strut members of equal length, what is the effect of connectedness on density? Intuitively, it can be assumed that low connectivity will give low relative density, but just how much does high connectedness affect this relative density?

An Estimation of an Upper Bound on the Perimeter to Area Ratio of Not-Necessarily-Space-Filling Two-Dimensional Grids Composed of Polygons. Consider a tiling on a Euclidean plane, which consists of straight strut members of length (1), connected at each end with nodes of arbitrary connectedness (z). Assume that the angles ($\alpha$) between strut members at each node are equal, so that:

$$\alpha = \frac{2\pi}{z} \qquad \text{Equation 2}$$

Further, to enclose maximum volume per polygon, assume that the tiling consists of convex regular polygons with a number of sides (n), which can be determined from the strut member angle:

$$n = \frac{2\pi}{\frac{2\pi}{2} - \alpha} \quad \text{(for Euclidean plane, } n = 2\pi/(\pi - \alpha)\text{)} \qquad \text{Equation 3}$$

which can be expressed in terms of connectedness (z):

$$n = \frac{2\pi}{\frac{2\pi}{2} - \frac{2\pi}{z}} = \frac{1}{\frac{1}{2} - \frac{1}{z}} = \frac{nz}{2} - z \qquad \text{Equation 4}$$

which describes the identity relationship between sidedness and connectedness of this model: the higher the connectivity, the lower the sidedness of the constituent polygons, and vice versa:

$$n = \frac{2z}{z-2} \text{ and } z = \frac{2n}{n-2} \qquad \text{Equation 5}$$

In order to estimate the density of a grid composed of these polygons, it is necessary to estimate the area that each polygon might represent in a given tiling. The object is a scaling argument that addresses the general sensitivity of the perimeter to area ratio to changes in constituent variables. For this, start by determining their characteristic length. Given the number of sides (n), the largest characteristic dimension (a line, d, through the middle of the polygon) can be determined, by starting from one side of this line and summing the components ($\delta$) of each polygon side (of length l) that are parallel to the line, considering the progression of the angle ($\beta$) relative to the line, for half of the sides (n/2):

$$d = \sum_{i=1}^{n/2} (\delta_i) \qquad \text{Equation 6}$$

Where $$\delta_i = l\cos\beta_i \qquad \text{Equation 7}$$

And $$\beta_i = \frac{1}{2}2\pi(i-1) - \frac{1}{2}(2i-1)\alpha = \qquad \text{Equation 8}$$

$$\frac{1}{2}2\pi(1 + i(m-2) - m)m = \frac{2\pi(4i - 2 - n)}{4n}$$

such that:

$$d = \sum_{i=1}^{n/2}\left(l\cos\frac{\pi(4i - n - 2)}{2n}\right) \qquad \text{Equation 9}$$

which converges to (nl/$\pi$) for very large numbers of sides (n). It can be seen that this convergence relates to the classical formula for the circumference of a circle:

$$nl = \pi d \qquad \text{Equation 10}$$

Since it is known that perimeter length is proportional to nl, and area is proportional to d2, then minimization of perimeter to area goes by n/d2. Looking at n/d2 per n, for unit edge length (l=1), clearly shows that the effect of connectedness (and sidedness) on perimeter to area—is within an order of magnitude, and insignificant if relative edge length (l) can be varied across orders of magnitude. These results are applicable to the design of two dimensional cellular materials (i.e. digital cellular skins), when considering load transfer across a surface (e.g. hoop stress).

Extension of these methods to examine the three-dimensional problem (confined to the examination of the effect of connectedness on density) is fairly easy, if somewhat less precise (due to the addition of geometric assumptions about distribution of strut members in the third dimension). The oldest record of the three-dimensional minimal packing problem is considerably more recent than the two-dimensional honeycomb problem, dating back a little over a century [Kelvin, Lord (Sir William Thomson), "On the Division of Space with Minimum Partitional Area", Philosophical Magazine, vol. 24, no. 151, p. 503, 1887]. The Kelvin Conjecture addresses maximally space efficient bubble packing, with tetrakaidecahedrons arranged in a body centered cubic packing Very recently, the Weaire-Phelan structure [Weaire, D.; Phelan, R., "A counter-example to Kelvin's conjecture on minimal surfaces", Phil. Mag. Lett., vol. 69, pp. 107-110, 1994] was presented as a counter-example, with two types of cells and an area to unit volume that is more efficient than that of the Kelvin structure, by a very small amount (0.3%). The problem of what is the most efficient structure remains unsolved.

While there are only a few regular polyhedral space-filling tilings, the three-dimensional problem may be considered as being analogous to the two dimensional one. As in two dimensions, as long as a pattern is repeating so that a small family of parts can be assembled to produce the final pattern, the geometry is fair game for digital materials. With the efficacy of its use in modeling stochastic foams, and a belief in energy minimization in nature, it might seem that four-connected (e.g. the Kelvin structure) tiling provides the most space per unit edge, and therefore the lowest density for structures consisting of all equal length strut members.

Considering the relationship of density to mechanical attributes, given a polyhedral lattice of z-connected nodes and the corresponding strut members of equal length, what is the effect of connectedness on density? Intuitively, it can be assumes that low connectivity will give low relative density, but just how much does high connectedness affect this relative density?

An Estimation of an Upper Bound on the Total Edge Length to Volume Ratio of Three-Dimensional Lattices Composed of Polyhedrons. Consider a tiling in space, which consists of straight strut members of length (1), connected at each end with nodes of arbitrary connectedness (z). Take the simplification that the strut members are distributed throughout at least two discrete planes intersecting each node, so that the angles (a) between strut members are at least:

$$\alpha = 2\pi/(z/2) = \frac{4\pi}{z} \qquad \text{Equation 11}$$

To enclose maximum volume per polyhedron, assume that the tiling consists of convex regular polyhedrons with maximum possible characteristic dimensions defined by a polygon with a number of sides (n), which can be determined from the strut member angle:

$$n = 2\pi/((2\pi/2) - \alpha) = n = \frac{2\pi}{\pi - \alpha} \qquad \text{Equation 12}$$

which can be expressed in terms of connectedness (z):

$$n = \frac{2\pi}{\pi - \frac{4\pi}{z}} = \frac{2}{1 - \frac{4}{z}} = \frac{nz}{4} - \frac{z}{2} \qquad \text{Equation 13}$$

which describes the relationship between sidedness and connectedness of this model: the higher the connectivity, the lower the sidedness of the constituent polygons, and vice versa:

$$n = \frac{2z}{z-4} \text{ and } m = \frac{4z}{z-2} \qquad \text{Equation 14}$$

In order to estimate the total strut member length to volume ratio of a lattice composed of polyhedra whose characteristic length is described by these polygons, estimate the total number of strut members as the square of the number of sides in one of these theoretical constituent polygons, and the volume as the cube of this characteristic length that is calculated from this polygon. Given the number of sides (n) for each polygon the largest characteristic dimension (a line, d, through the middle of the polygon) can be determined, by starting from one side of this line and summing the components ($\delta$) of each polygon side (of length l) that are parallel to the line, considering the progression of the angle ($\beta$) relative to the line, for half of the sides (n/2):

$$d = \sum_{i=1}^{n/2} (\delta_i) \text{ where } \delta_i = l\cos\beta_i \qquad \text{Equation 15}$$

And $$\beta_i = (-1+i)\pi - \frac{1}{2}(2i-1)\frac{4\pi}{z} = \qquad \text{Equation 16}$$
$$\frac{(2 + i(z-4) - z)\pi}{z} = \frac{1}{2}(4i - 2 - n)n\pi$$

such that:

$$d = \sum_{i=1}^{n/2} \left( l\cos\frac{\pi(4i - n - 2)}{2n} \right) \qquad \text{Equation 17}$$

which is identical to the 2d case, since this expression only compares d and n. Given the assumption that total perimeter strut member length is proportional to $n^2$, and volume is proportional to $d^3$, then minimization of total strut member length to volume is proportional to $n^2/d^3$.

$$\left( \left( \frac{2z}{-4+z} \right)^2 \right) \Big/ \left( \sum_{i=1}^{\left( \frac{-2z}{-4+z} \right)} \cos\left[ \frac{(\pi)\left(-2 + 4i - \left( \frac{2z}{-4+z} \right)\right)}{2\left( \frac{2z}{-4+z} \right)} \right] \right)^3 \qquad \text{Equation 18}$$

The contour of $n^2 l/d^3$ per node connectedness (z), for unit edge length (l=1), suggests that like the 2d case, the effect of connectedness on the total strut member length to volume ratio—is also within an order of magnitude, and therefore also insignificant if relative edge length (l) can be varied across orders of magnitude.

These estimation results provide some confidence in retaining the design freedom to choose lattice geometries without straying into an area of the design space where obtaining desirable relative density is unlikely. Focusing further on actual design parameters, look towards a general scaling law that now takes into account dimensions such as strut member length (l) and thickness (t). This will be an expansion of known scaling laws for analytical modeling of cellular solids, with the addition of terms to account for the connections in a digital material, which can be assumed to occur at the nodes in the lattice. The aspect ratio is considered as $\phi=t/l$. Relative density is conventionally defined as $(\rho^*/\rho_s)$, where $\rho^*$ is the mass of the lattice divided by the total bounding volume $(v^*)$, and $\rho_s$ is the density of the constituent solid material (i.e. the mass of the lattice divided by only the volume of the constituent solid material $v_s$):

$\phi=t/l$(aspect ratio, $t$=thickness, $l$=length).

$d=k_p l$(pitch, $k_p$=length constant)

$\rho^*/\rho_s=(m/v^*)/(m/v_s)=v_s/v^*$(Relative density)  Equations 19

The characteristic dimension of the repeating cell may be defined as pitch, d, which is proportional to the length of each strut member according to the lattice geometry. As such, the bounding volume $v^*$ is proportional to d3. The volume of the solid material per cell is composed of the sum of the volumes of the strut members and connections, which for square prism strut members may be defined as t2l and kct3, respectively (note that the size of the connection does not depend on l, as the governing factor in connection design is stress, and therefore maximally scales with the cross sectional area of the strut member).

$v^* \propto d^3$ $v_s = n_l v_{strut\ member} + n_c v_{connection}$ ($n_l$=number of strut members per unit cell, $n_c$=number of connections per unit cell)

$v_{strut\ member} = t^2 l$ $v_{connection} = k_c t^3$ (no dependence on $l$)

$v_s = n_l t^2 l + n_c k_c t^3$ $v_s/v^* \propto (n_l t^2 l)/d^3 + (n_c k_c t^3)/d^3 = (n_l t^2 l)/(k_p l)^3 + (n_c k_c t^3)/(k_p l)^3$  Equations 20

This gives the relationship of relative density to various factors:

$\rho^*/\rho_s = (n_l/k_p^3)\phi^2 + (n_c k_c/k_p^3)\phi^3$ $\rho^*/\rho_s \propto \phi^2$  Equations 21

This demonstrates that relative density scales linearly with the number of strut members per cell, number of connections per cell, and the connection size factor. The contribution of the connection distribution, as defined by a given geometry, to relative density, scales with the cube of the aspect ratio of the strut members, and is therefore relatively unimportant. The governing side of the equation comes from the strut member contribution constants, but these scale with the square of the aspect ratio of the strut members. This suggests that the most effective geometric strategy for reducing the relative density is to reduce the ratio of strut member thickness to length. Pitch factor kc can be understood to encapsulate the total strut member length per volume, which is expected from the previous estimation to not vary by very much between lattice geometries. To validate this understanding of the design space (that strut member aspect ratio is the most important factor in obtaining lattices with low relative density), proceed with precise calculations of the relative density of four candidate lattices, of varying connectedness. These are, in increasing order of connectedness: the Kelvin structure with four connected nodes, a simple cubic lattice with six connected nodes, a simple cubic packing octahedral/cuboctahedral lattice (henceforth referred to as a "cuboct" truss) with eight connected nodes, and a simple rhombic packing 2 tetrahedron 1 octahedron lattice, known as an "octet" truss [U.S. Pat. No. 2,986,241, Fuller, R. B., "Octet Truss", 1961], with twelve connected nodes. Given $\rho^*/\rho_s \propto C_1\phi^2 + C_2\phi^3$, the constants C1 and C2 are found, as shown in Table 1.

TABLE 1

Properties of Candidate Lattice Geometries

| | connectedness m | cell volume $v^*$ | connections per cell $n_c$ | strut members per cell $n_l$ | strut member scaling constant $C_1$ | connection scaling constant $C_2$ |
|---|---|---|---|---|---|---|
| Kelvin Structure | 4 | $(16\sqrt{2})l^3$ | 12 | 24 | $(3\sqrt{2})/4$ | $3/(4\sqrt{2})$ |
| Simple Cubic | 6 | $l^3$ | 1 | 3 | 3 | 1 |
| Cuboct | 8 | $(2\sqrt{2})l^3$ | 3 | 12 | $3\sqrt{2}$ | $3/(2\sqrt{2})$ |
| Octet | 12 | $(\sqrt{2}/2)l^3$ | 1 | 6 | $6\sqrt{2}$ | $\sqrt{2}$ |

Given that the connection scaling constant, C2 is not significant, since it scales with the cube of the strut member aspect ratio, examining the strut member scaling constant, C1, should provide some indication of the relative impact of strut member length and width for these actual lattice designs. This constant essentially provides a measure of the volume contribution of the strut members, to the overall volume. In this version of the model, it also can be taken to account for some of the "double-counted" material that is a result of the method of counting total strut member volume [Gibson, L., & Ashby, M., Cellular Solids, Structure and Properties, Cambridge University Press., Cambridge, UK, 1988]. It does not take into account the increasing spatial complexity of the problem of designing reversible connections, with increasing node connectedness.

It is hoped that these results provide a useful description of the problem space of designing lattices with relative density as a figure of merit. Characteristics such as lattice type, connectivity, and connection size all contribute to the final relative density, with proportional scaling that is within an order of magnitude. In particular for ultra-light materials, the most significant changes in relative density are made by changing the aspect ratio of the strut members.

Mechanics. In stochastic foams, conventional models typically consider the average connectedness to be four, and strut members effectively meeting at midpoints of other strut members, resulting in characteristic behavior that is dominated by transverse beam bending [Gibson, L., & Ashby, M., Cellular Solids, Structure and Properties, Cambridge University Press., Cambridge, UK, 1988]. This results in an overall relative modulus that is expected to be proportional to the square of the relative density, for open cell foams:

$$\frac{E^*}{E_s} \propto \frac{\rho^2}{\rho_s^2} \qquad \text{Equation 22}$$

It is known that it is possible to improve upon this, with nonstochastic geometry [Deshpande, V. S., Ashby, M. F., & Fleck, N. A., "Foam Topology Bending Versus Stretching Dominated Architectures", Acta Materialia, vol. 49, pp. 1035-1040, 2001; Deshpande, V. S., Fleck, N. A., & Ashby, M. F., "Effective properties of the octet-truss lattice material", Journal of the Mechanics and Physics of Solids, vol. 49, pp. 1747-1769, 2001]. In an ideal sparse structure, $E/E_s \propto (\rho/\rho_s)$, when loads are perfectly distributed so as to be purely axial on all elements in the structure. In compression, this is limited by member buckling, beyond the point at which infinitesimal offsets in the loading of an element will produce a bending moment that will receive further contribution from the axial load. In tension, such a proportional relationship is geometry dependent, and relies on the degree of mechanical constraint of each element, as afforded by the lattice geometry [Maxwell, J. C., "On the calculation of the equilibrium and stiffness of frames", Philosophical Magazine, vol. 27, pp. 294-299, 1864], as well as the ability to efficiently transmit bending moments between elements [Broedersz, C. P., Mao, X., Lubensky, T. C. & MacKintosh, F. C., "Criticality and isostaticity in fibre networks", Nature Physics, vol. 7, pp. 983-988, 2011].

A key point here is a small departure from the bulk of the cellular solids literature, which has mostly considered two states of structures: those whose elements are maintained in pure axial loading (therefore dominated by stretching behavior), and those which fall into bending dominated behavior (and therefore consider negligible stretching contribution). A clue as to the practical existence of a third state comes from the statistical mechanics literature, as pertains to the mechanical behavior of interconnected networks of proteins. This class of materials, such as actin meshworks, microtubules, and fibrin and collagen matrices, is known to display higher strength and stiffness than their structural connectivity predicts with traditional framework rigidity criteria. While the exact phenomena that explain this are still under debate, pure mechanical models that show the ability of stretch-bend coupled systems to display proper behavior seem promising [Broedersz, C. P., Mao, X., Lubensky, T. C. & MacKintosh, F. C., "Criticality and isostaticity in fibre networks", Nature Physics, vol. 7, pp. 983-988, 2011]. This relies to some degree on the relative strength and elasticity scaling of microscopic interactions for these materials (e.g. proteins), which form networks with a large disparity in bond strengths [Jacobs, D. J., Rader, A. J., Kuhn, L. A., & Thorpe, M. F., "Protein Flexibility Predictions Using Graph Theory", PROTEINS: Structure, Function, and Genetics, vol. 44, pp. 150-165, 2001]. In any case, if this intermediate phase of mechanical structure exists, then it should be possible to show similar behavior at the macro scale.

There are two main reasons to choose a stretch-bend coupled material over a stretch dominated material. The first is versatility; if this intermediate mechanical mode can be shown, then tuning parts to the better characterized bending and stretching dominated modes should be relatively easy. The second reason is failure mode; it is expected that a stretch dominated fiber composite cellular solid would fail in a brittle fashion, and it is desirable to know what the macro-scale failure mode of a stretch-bend coupled material looks like. A possible third reason has to do with the connections—when not building parts from a material such as carbon fiber, it may be helpful for the design and relative density to avoid pure axial loading of the joints, assuming that strength and stiffness requirements can be met without this.

Consider a model of a sparse digital material lattice as its true geometry, composed of members of length l and square cross section of side t. The relative density $\rho/\rho_s$, and the second moment of area of a member, I, are related to the dimensions t and l by:

$$\frac{\rho}{\rho_s} = \frac{\rho_c}{\rho_s} \text{(connection contribution)} +$$

$$\frac{\rho_l}{\rho_s} \text{(ligament contribution)}$$

$$\frac{\rho}{\rho_s} = C_c \frac{t^3}{l^3} + C_l \frac{t^2}{l^2} \propto \frac{t^2}{l^2}$$

$$I = t^4/12 \text{ for square cross section; } I \propto t^4$$

Equations 23 where $\rho$ = mass density of structure $\rho_s$ = mass density of constituent solid $t$ = strut member thickness $l$ = strut member length for a Kelvin structure, $C_c = 3\sqrt{2}/4$, and $C_l = 3/(4\sqrt{2})$ for a cuboct structure, $C_c = 3\sqrt{2}$, and $C_l 1 = 3/(2\sqrt{2})$    Equations 24

For conventional foams and flexural functional composite part types, transverse beam bending deflection describes the primary response mechanism, modeled as beams that are simply supported at both ends and loaded in the middle [Gibson, L., & Ashby, M., Cellular Solids, Structure and Properties, Cambridge University Press., Cambridge, UK, 1988].

$$\delta \propto \frac{Fl^3}{E_s I}$$

Equations 25

$$\delta = \delta_{bending} \propto Fl^2/E_s I \text{ (for low } \rho/\rho_s\text{)}$$

Where $\delta$ = change in length $E$ = modulus of elasticity of structure $E_s$ = modulus of elasticity of constituent solid $\sigma = F/A_c$ $\epsilon = \delta/L_c$ for a Kelvin structure, $A_c = l^2/2$, and $L_c = l\sqrt{2}/2$ for single beam ($A_c = 2l^2$, and $L_c = l\sqrt{2}$ for entire cell)

for a cuboct structure, $A_c = 8l^2$, and $L_c = l\sqrt{2}/2$ for single beam ($A_c = 32l^2$, and $L_c = 4l\sqrt{2}$ for entire cell)    Equations 26 from which $E = \sigma/\epsilon$ gives an expected relative modulus of:

$$E/E_s = (FL_c/A_c\delta)/E_s$$

Equations 27 for a Kelvin structure, $E/E_s = (\sqrt{2})((F/l\delta)/E_s)$ for a cuboct structure, $E/E_s = (1/(8\sqrt{2}))((F/l\delta)/E_s)$ thus, assume $E/E_s = C_g((F/l\delta)/E_s)$ And $$E/E_s = C_g((F/l\delta)/E_s) \propto C_g \frac{F}{l(Fl^2/E_sI)E_s} \propto C_g\left(\frac{t^2}{l^2}\right)$$

Equation 28 assuming, from above, that $\rho/\rho_s \propto t^2/l^2$ and $I \propto t^4$, $$E/E_s \propto t^2/l^2 \propto (\rho/\rho_s)^2$$

Equation 29

Figure 6:
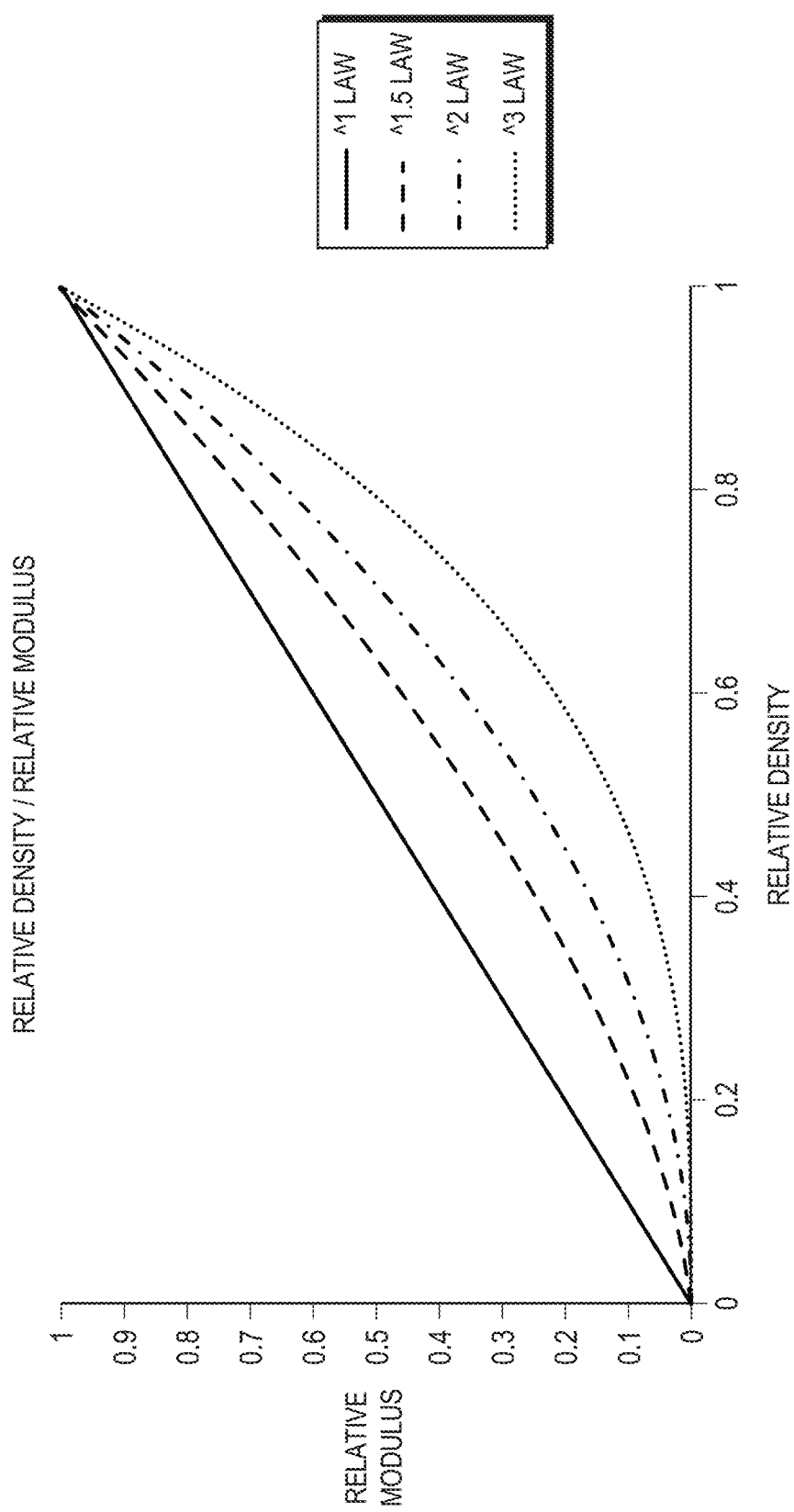
FIG. 6 is a graph depicting the scaling relationship between relative density and relative modulus.

In contrast, the ideal loading condition for any subunit of the system is purely axial, so that $E/E_s \propto (\rho/\rho_s)$. It is known that this can be effected by high degrees of co-constraint, provided by lattice geometries with high connectivity [Warren, W. E., & Kraynik, A. M., "The Linear Elastic Properties of Open-Cell Foams", Journal of Applied Mechanics, vol. 55, pp. 341-346, 1988]. This effect is intuitive upon examination of lattice types, as lattices with higher connectivity tend to connect strut members in such a way to produce axial loading of the individual strut members in the structure. Generally speaking, it is seen that lattices with higher connectivity at each node are better able to constrain the load paths, accordingly. In contrast, a lattice with low connectivity, such as the Kelvin structure, lacks any direct axial loading of material throughout the structure, is in some ways an effective representation for the myriad stochastic cellular solids currently used in engineering practice, and exhibits the quadratic modulus scaling law that makes engineered cellular solids more ideal for applications such as energy absorption, than those requiring high stiffness. If the lattice can be designed for a cellular solid, because it is being assembled from discrete components, then a degree of connectivity can be prescribed that can result in these load pathways balancing through the material as necessary. Geometrically defined constraints can therefore greatly influence the scaling relationship between mechanical material properties and relative density. FIG. 6 is a graph depicting this scaling relationship between relative density and relative modulus.

This emphasis on end constraints for strut members leads to another critical role of the connections. The use of many smaller parts to assemble a large part allows for the use of elastic averaging [Slocum, A. H., & Weber, A. C., "Precision passive mechanical alignment of wafers", Journal of Microelectromechanical Systems, vol. 12, pp. 826-834, 2003] in order to reduce error in manufacturing methods. When many parts are used to locate a single feature, with enough elastic compliance to adjust to small inconsistencies in the location of the feature, the effective location of the feature will be the average of the individual constraints provided by the surrounding parts. When this process is performed correctly, this average location can be more precise than the process used to fabricate the individual parts. The original per-part error must be within a certain threshold for a given system.

By the same rules, when forces are effectively distributed throughout an assembly of smaller parts, tolerances on strength requirements may be reduced as the observed bulk strength of the assembly will be a result of this distribution. This is also naturally enabled by natural coupling of elasticity to strength, whereby weaker and more elastic components transfer load through stronger and stiffer components, while still contributing to overall stiffness.

The major components at hand, in a sparse digital material system as defined here, are the strut members and the connections. The properties of either are a question of design. When considered as a continuum, second order material properties will result from the behavior of both. Whether or not the behavior of either is responsible for the characteristic behavior of the continuum, for a given stress regime, is once again a matter of design. As such, the connections may be designed such that the $\sigma/\epsilon$ curve of the connection ($\sigma(\epsilon)_c$) has a particular relationship to the $\sigma/\epsilon$ curve of the most elastic within-part strut member ($\sigma(\epsilon)_p$).

For instance, if $\sigma(\epsilon)_c$ is always greater than or less than $\sigma(\epsilon)_p$, then the connection either does not contribute to, or dominates, respectively, the bulk material behavior of the digital material. FIGS. 7A-D illustrate tunable multi-phase elasticity through stress-strain diagrams of bulk digital material in different scenarios.

Figure 7B:
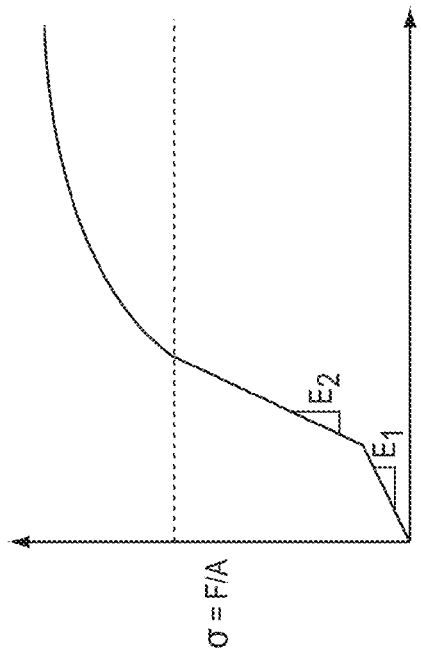
FIGS. 7A-D illustrate tunable multi-phase elasticity through stress-strain diagrams of bulk material in different scenarios.
Figure 7D:
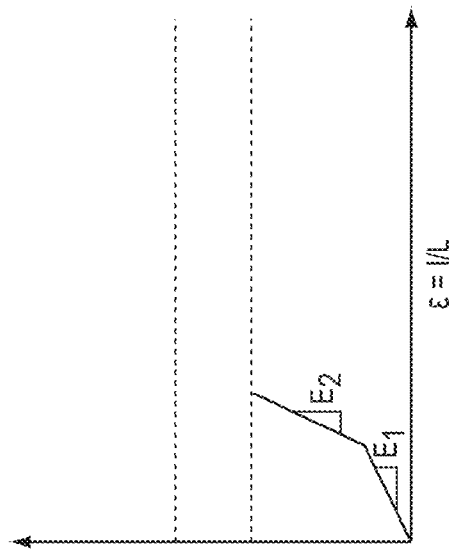
Figure 7A:
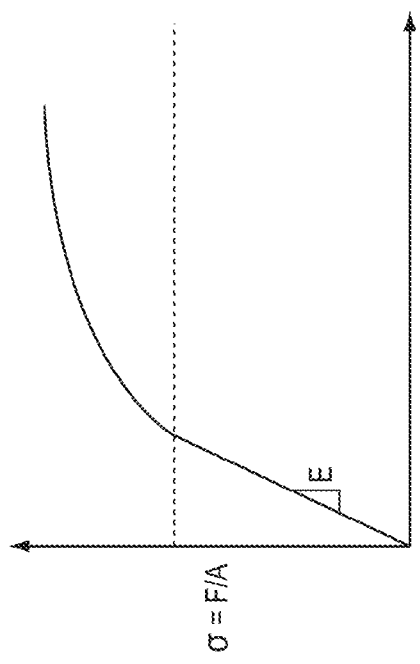
Figure 7C:
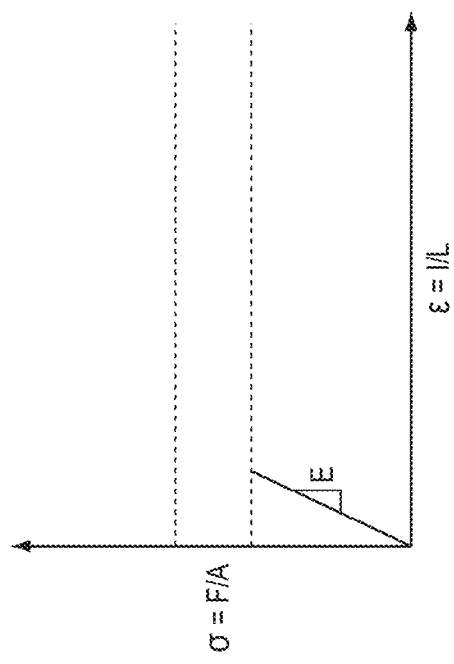
Figure 8B:
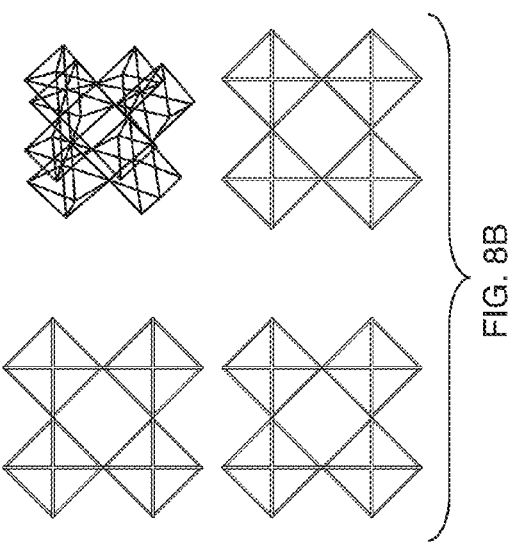
FIGS. 8A-D present exemplary implementations of cuboct truss geometry.
Figure 8D:
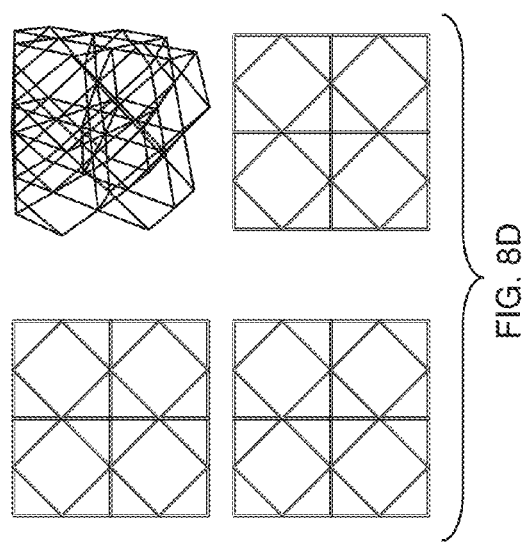
Figure 8A:
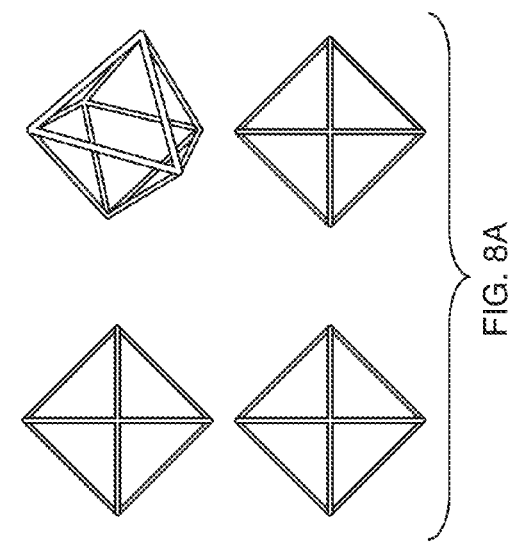
Figure 8C:
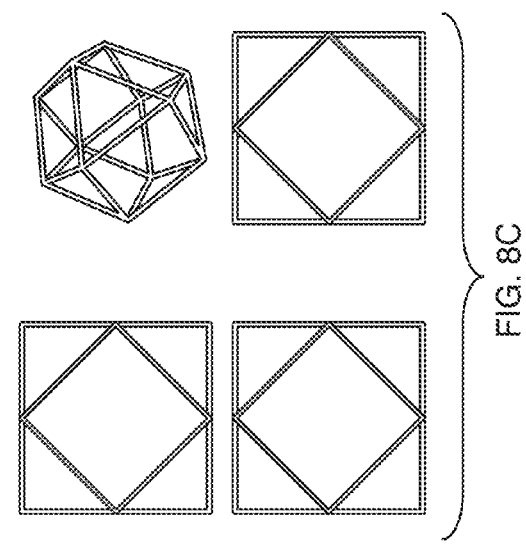

The $\sigma/\epsilon$ curve of the bulk material will look typical, as in FIG. 7A. On the other hand, if $\sigma(\epsilon)_c$ intersects $\sigma(\epsilon)_p$, then the material will appear to have two phases of elasticity, such as in FIG. 7B. The first phase of elasticity may be particularly useful to the development of morphing structures, as it allows for actuation forces that stay well within structural safety limits for the material. As previously noted, digital frangibility is a potentially useful property of digital materials. Hypothetical $\sigma/\epsilon$ curves for such frangible digital materials are shown in FIGS. 7C and 7D.

This multiplexing of behaviors, in the aforementioned case including strut members and connections, can be extended to non-linear behavior within a component or connection (e.g. a flexural component that approaches a hard stop at a specified strain), or multi-part-type designs. To bound the analytical and physical work, focus was placed on regular three dimensional lattice geometry and mechanical structure as the primary dimension of merit. This includes, most notably, elasticity and strength. This provides a representative perspective that is generalizable to a large scope of digital materials.

Exemplary embodiment: Cuboct Truss. For a general purpose digital material system, a desirable attribute is isotropy. There are many perfect lattices or crystal structures with a defining characteristic of anisotropy. Relating to the mechanics of digital material lattices, this anisotropy can be viewed as asymmetry in the constraint of subsets of strut members that are aligned along specific planes throughout the material, or simply a lack of preservation of mechanical equilibrium under load. Of the four very basic lattices discussed earlier, the two with the lowest connectivity (the Kelvin structure, four connected, and the simple cubic lattice, six connected) are known for their lack of rigidity [Maxwell, J. C., "On the calculation of the equilibrium and stiffness of frames", Philosophical Magazine, vol. 27, pp. 294-299, 1864].

A strategy for computer design of an isotropic cellular solid is to take one of these simple efficient anisotropic structures, such as the Kelvin structure, and to introduce random or periodic local perturbations on node locations that preserve the overall topology [Roberts, A. P., & Garboczi, E. J., "Elastic properties of model random three-dimensional open-cell solids", Journal of the Mechanics and Physics of Solids, vol. 50, pp. 33-55, 2002]. This is undesirable for the present application, because this defeats the goal of maintaining strut member constraints. As a result of removing all aligned load paths, mechanical performance might be expected to drop to the lowest common denominator for the geometry, which produces typical quadratic relative density scaling with relative modulus. Furthermore, digital materials with large overall dimension to part size ratios can be constructed such that they can be expected to behave as perfect lattices. This is useful because it maintains the option of introducing perturbations for functional purposes. Regardless, recent theory on the existence of strongly coupled stretch-bend modes in three dimensional lattices suggests that purely bending dominated behavior can be avoided in other ways [Broedersz, C. P., Mao, X., Lubensky, T. C. & MacKintosh, F. C., "Criticality and isostaticity in fibre networks", Nature Physics, vol. 7, pp. 983-988, 2011].

The lowest connectivity lattice found, which is composed of equal length strut members, regular polyhedra, and that satisfies Maxwell's rigidity criterion, is the cuboct truss. The structure can be seen as vertex connected regular octahedrons or square-face connected cuboctahedrons, and in this design is decomposed into elements that comprise four strut members, five parts of connections, and a shear clip to fasten the connections. When assembled, the ends of four crossbar units meet at the center and orthogonal to a fifth crossbar unit, where they are secured with a clip that is inserted orthogonally to the five crossbars. FIGS. 8A-D present exemplary implementations of cuboct truss geometry.

Figure 9A:
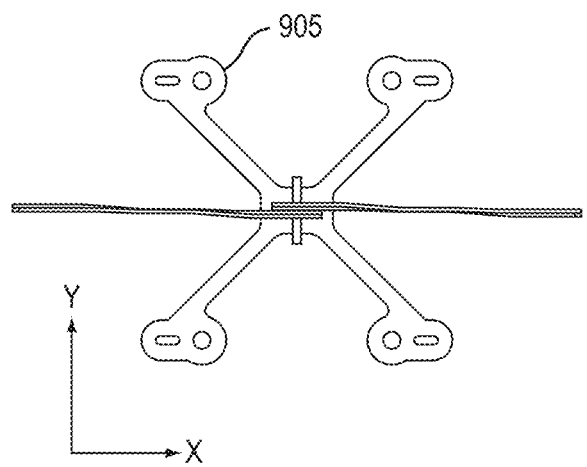
Figure 9B:
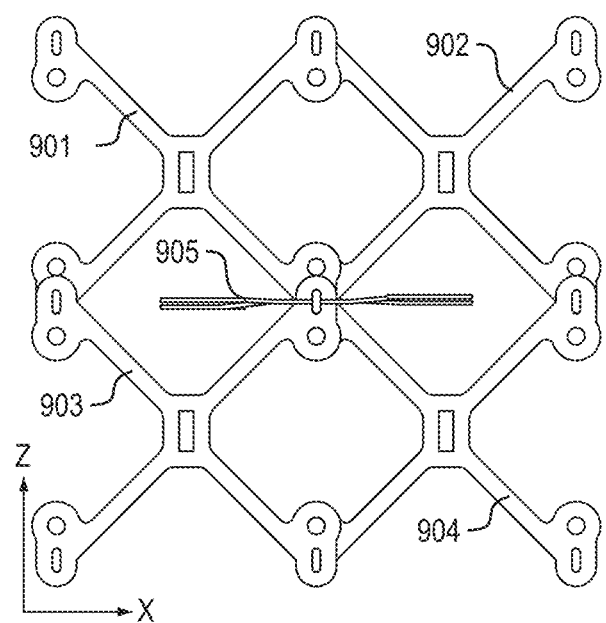
Figure 9C:
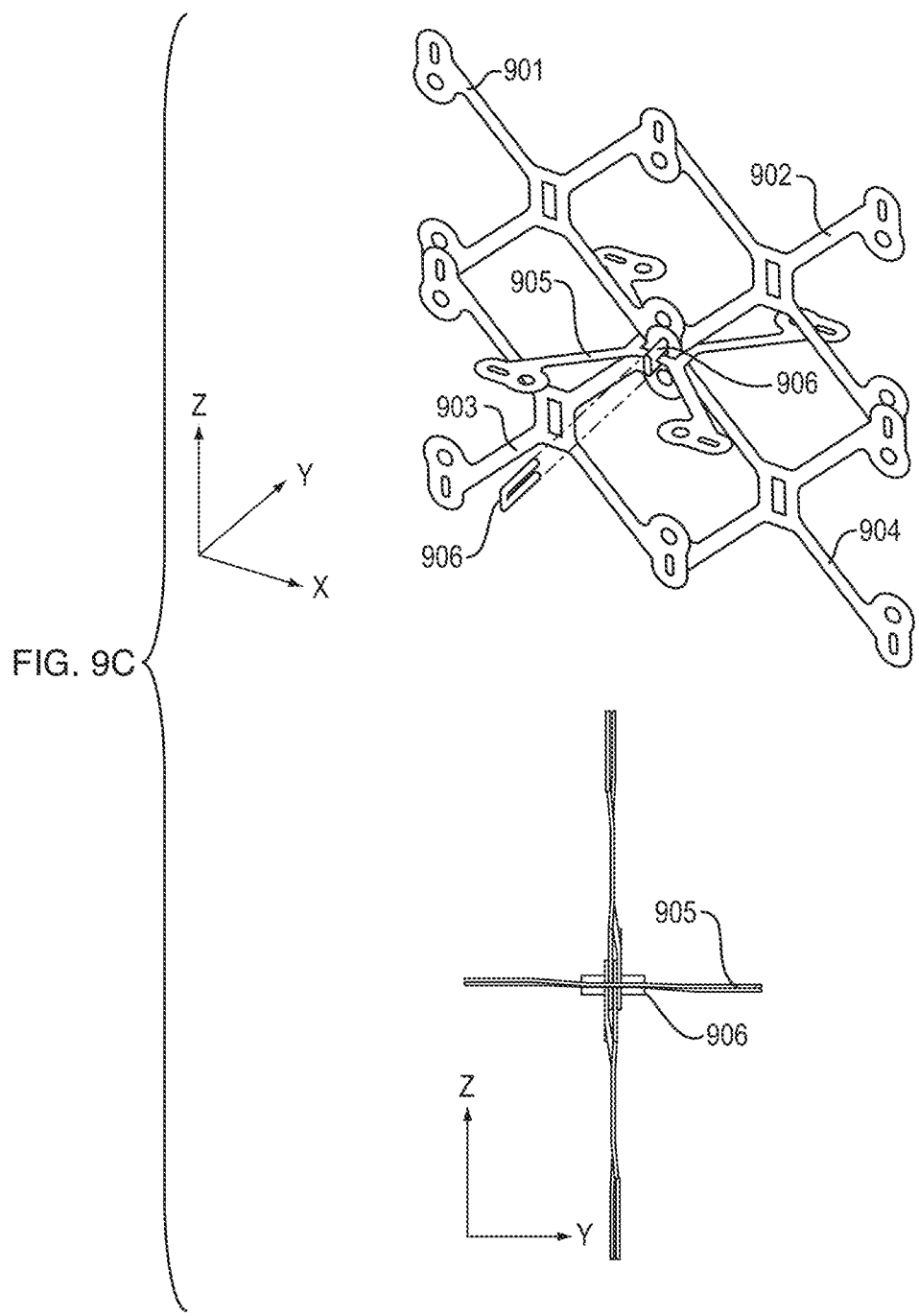
Figure 9D:
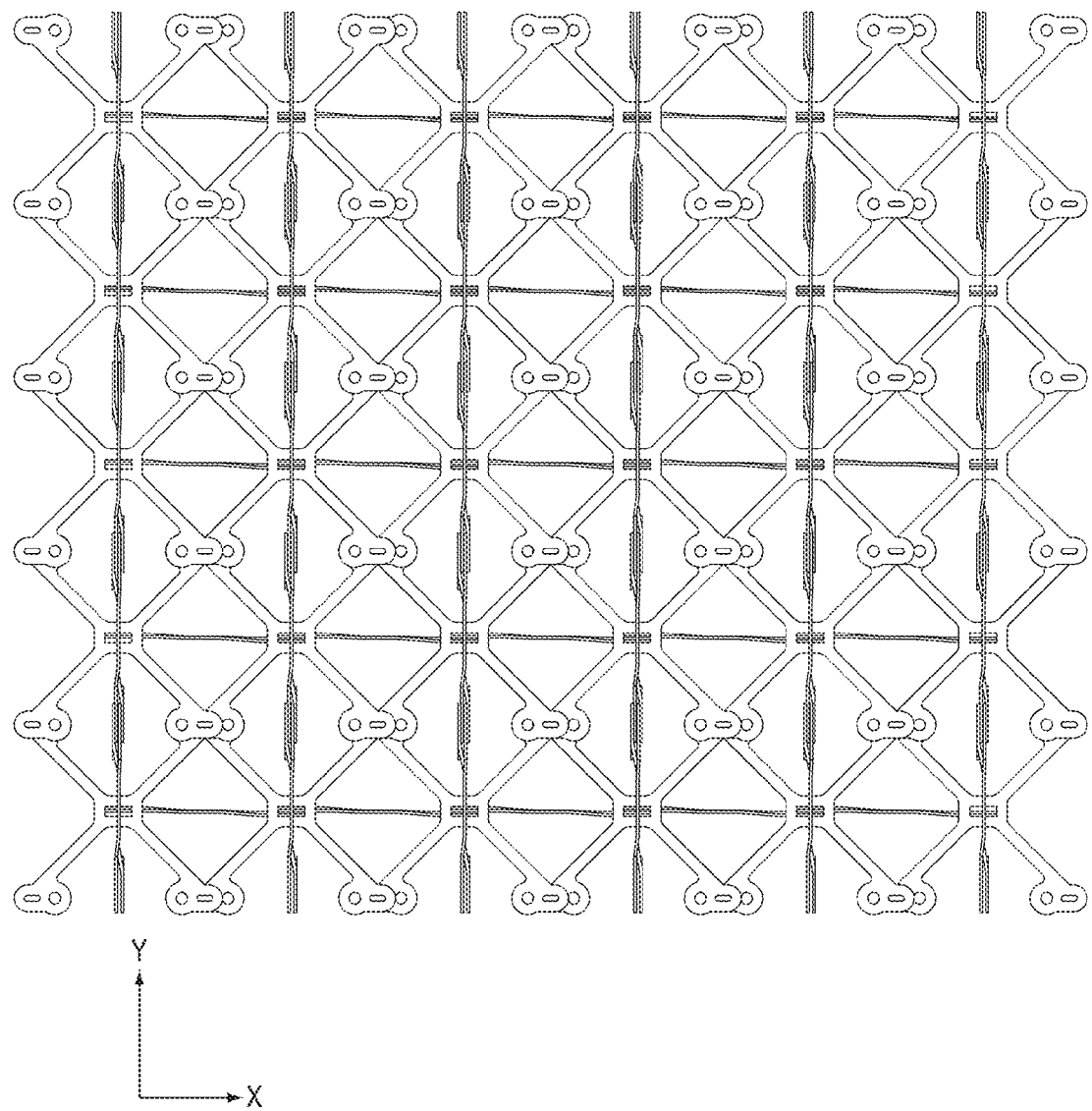
Figure 9E:
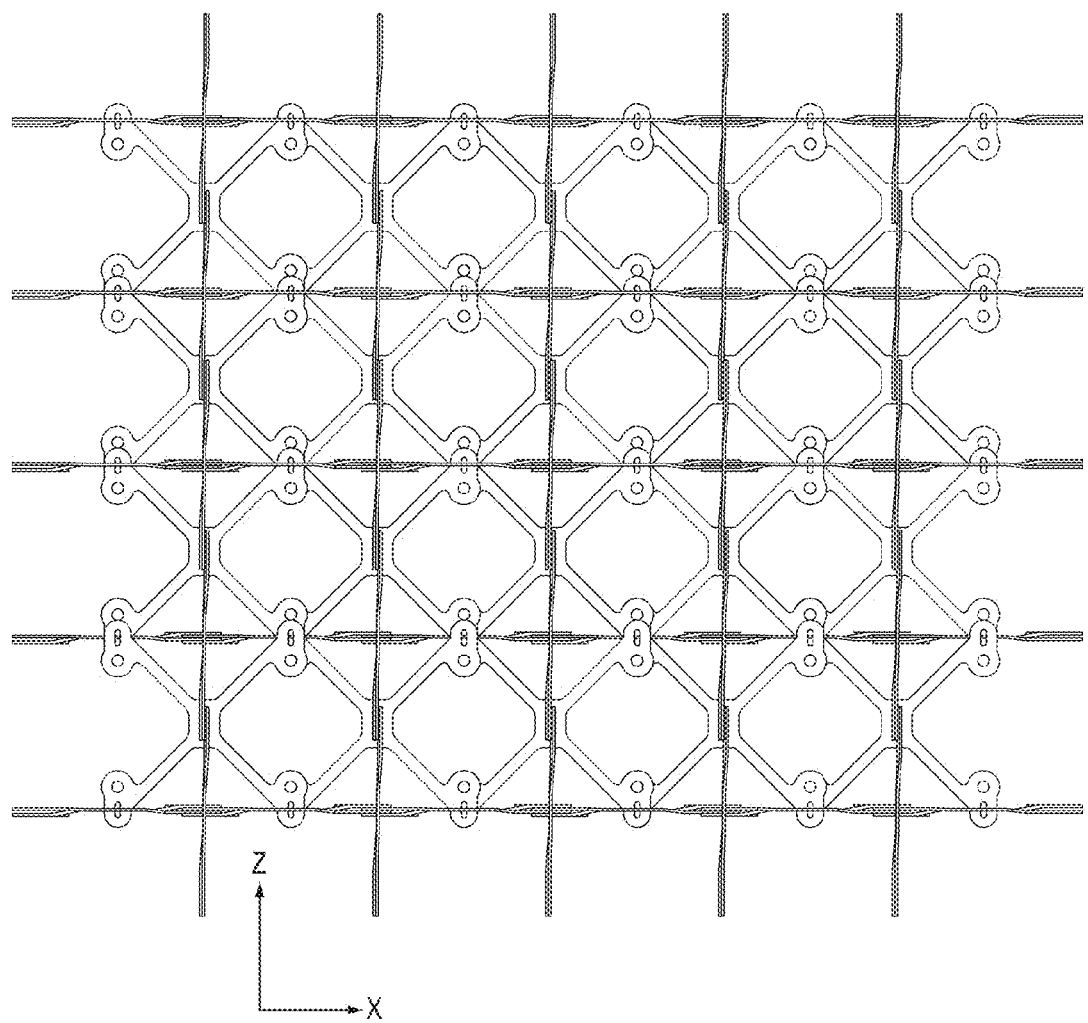
Figure 9F:
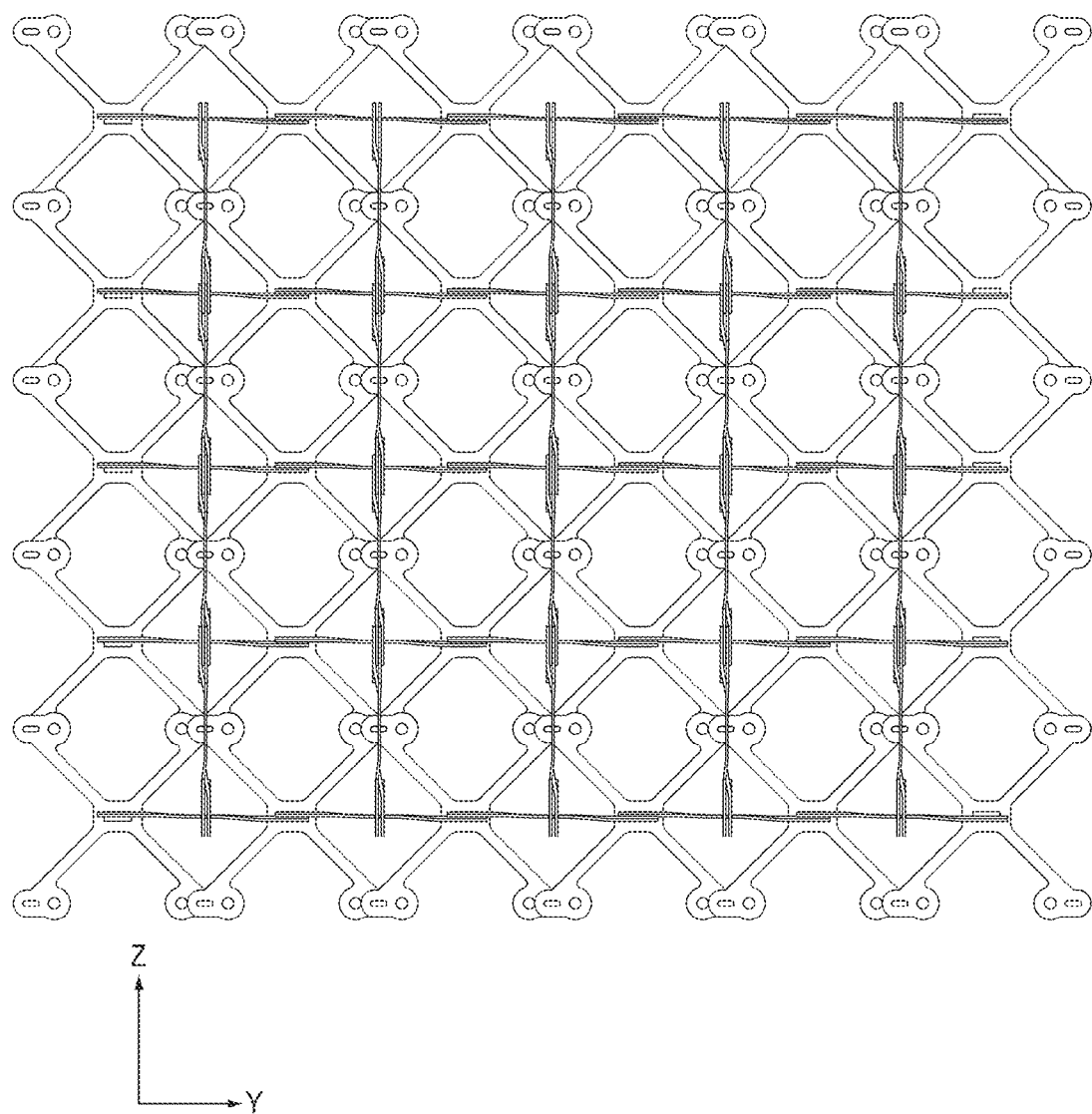
Figure 9G:
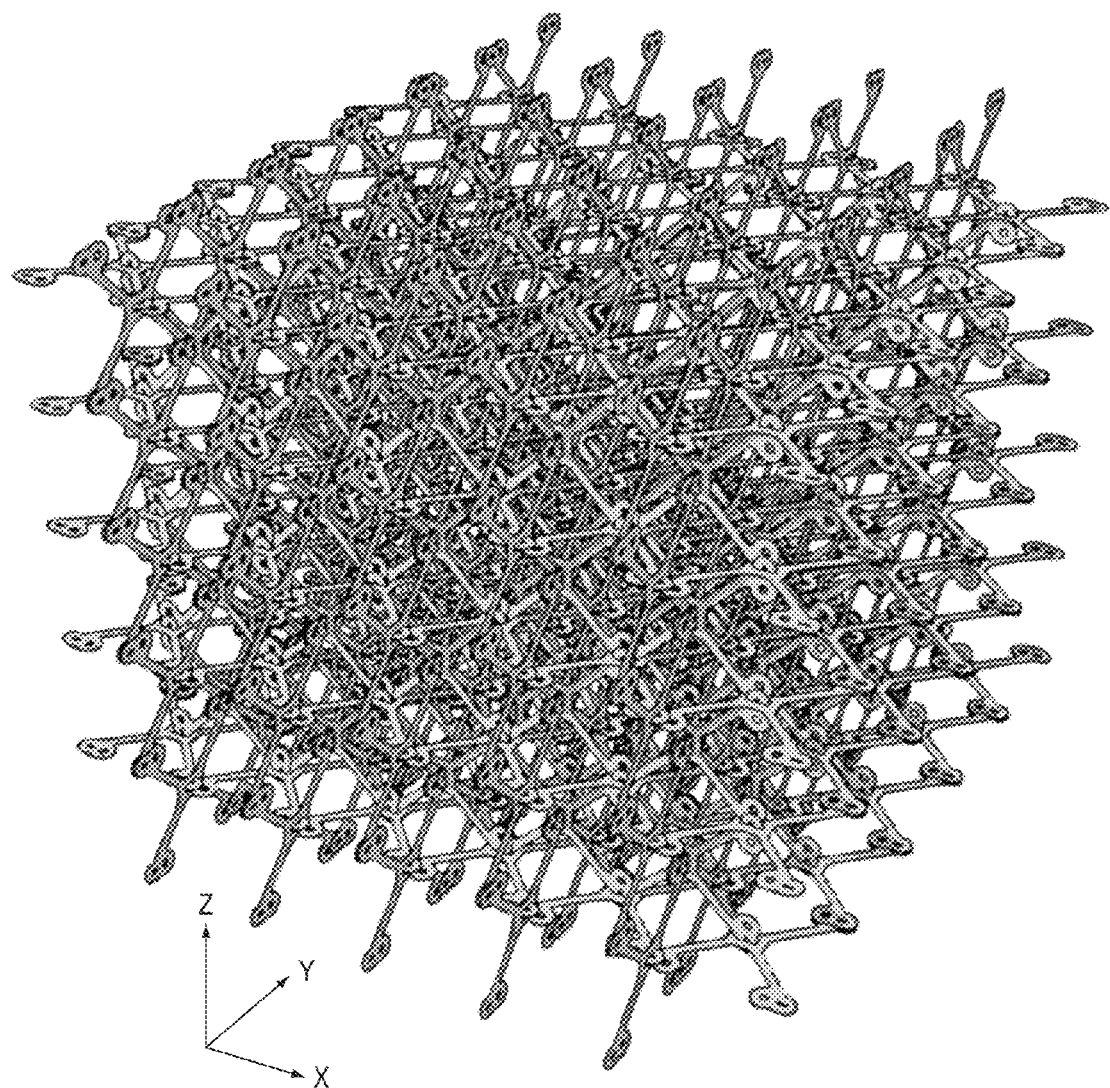

FIGS. 9A-G depict the cuboct truss assembly process. FIGS. 9A and 9B are normal views of truss units, FIG. 9C is a perspective view of truss assembly, FIGS. 9D-F are normal views of truss units after they have been assembled to form a volumetric structure, and FIG. 9G is a perspective view of truss units after they are assembled to form a digital volumetric structure. This design comprises two types of elements—a crossbar (also called a "pinned unit") and a compression clip. FIGS. 9A-C show that, when assembled, the ends of four crossbars 901, 902, 903, 904 meet at a central location orthogonal to a fifth crossbar 905, where they are secured with clip 906 that is inserted orthogonally to the five crossbars. The resulting structure can be seen as vertex connected regular octahedrons or square-face connected cuboctahedrons. Each of crossbars 901, 902, 903, 904, 905 are identical and include pinned locking mechanisms and load transfer mechanisms.

Figure 10A:
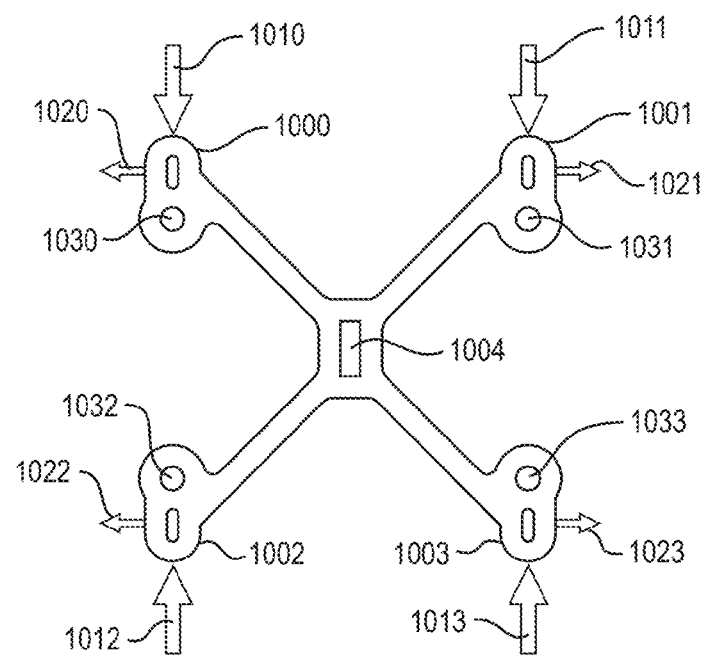
FIGS. 10A and 10B depicts cuboct truss units under compressive load and tension load, respectively.
Figure 10B:
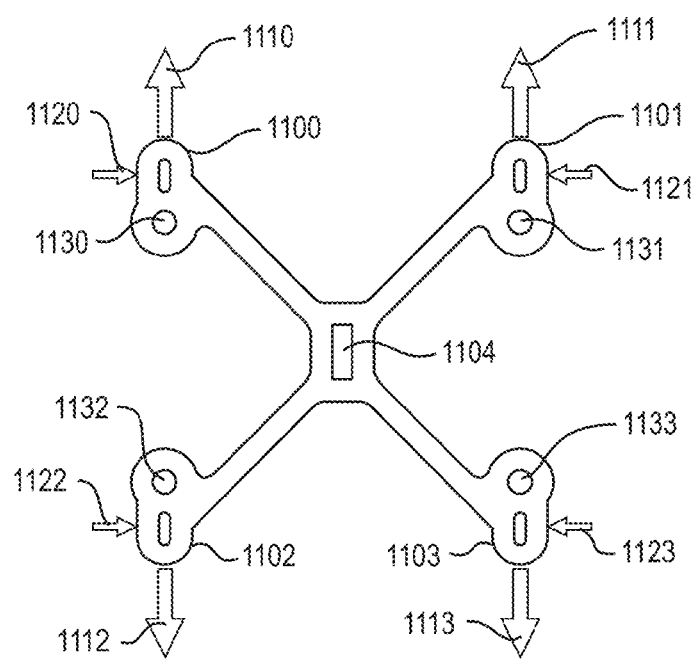

FIGS. 10A-B illustrate cuboct truss load response, depicting cubot truss units under compressive and tension loads, respectively. Units of the type shown in FIGS. 10A-B are sometimes referred to as "pinned units" or "crossbars". As shown in FIG. 10A, the ends of the crossbar units comprise slotted tabs 1000, 1001, 1002, 1003, 1100, 1101, 1102, 1103 that fit into larger slots at the center of adjacent units. These tabs can include small snap-fit tabs, but the primary fastening mechanism used in the case study is the shear pin 906 (FIG. 9C). Also shown in FIG. 9A-G are handles 1030, 1031, 1032, 1033, 1130, 1131, 1132, 1133 that aid in automated assembly but remain out of the way of the connection and can be easily grasped by a machine. Each central keyhole 1004, 1104 allows four orthogonal units (two from either direction) to be simultaneously locked in. The regularity of the spatial arrangement of these four parallel tabs in the central keyhole affects connection-derived elastic properties, to a degree that depends on the aspect ratio of the parts (thickness to strut member length). The simplest solution, used in the case study, is to use consistent and equalized placement of tabs according to global orientation.

The load transfer mechanisms may utilize the ideal angle of the strut members in the crossbar. In FIG. 10A-B, loading is shown by the arrows 1010, 1011, 1012, 1013, 1110, 1111, 1112, 1113 and reaction deflection is shown by the arrows 1020, 1021, 1022, 1023, 1120, 1121, 1122, 1123. The forces required to assemble these structures may be provided by an external device that places the pins; the forces required to disassemble these structures are either simply set by the shear capacity of the pins, or may be provided by an external device, such as a robotic digital assembler/disassembler. If connection based elastic properties are to be minimized in this design, then the crossbar strut members may be made slender relative to the connection details, in order to provide relatively large surface areas for the connection mechanism. For experimental simplicity, the examples presented utilize the design option of having the connection stiffness exceed that of the strut members, but it will be clear to one of skill in the art of the invention that this is not required.

Strut member geometry. The strut member portion of the a cuboct structure design is either axially loaded or loaded in groups that are oriented relative to the loading axis in such a fashion that a primary bending component (due to the simultaneous axial and transverse loads) only occurs in one plane. This plane will be referred to as the bending plane. The strut member therefore can be considered as a box with all three dimensions constrained by different sets of factors: length (l), thickness (t) orthogonal to the bending plane and the length, and width (w) within the bending plane and orthogonal to the thickness and length. This geometry might be optimized by considering the differences between the buckling out of the bending plane due to axial load, and the buckling within the bending plane due to simultaneous axial and transverse loads. With fixed end constraints, buckling out of the bending plane may be described as anti-symmetric buckling [Timoshenko, S. P., & Gere, Theory of Elastic Stability, McGraw Hill, New York, 1961], using the loading condition that results in maximum in-plane bending: for the cuboct structure, force F applied at an incident angle of $\pi/8$ ($F=F_{ext}/(\sqrt{2})$):

$$F=4\pi^2 EI/l^2;\ F_{ext}=(\sqrt{2})8.18\pi^2 EI_{OP}/l^2;\ I_{op}=wt^3/12;$$
$$F_{ext}=0.962\pi^2 Ewt^3/l^2$$

$$F_{ext}=(\sqrt{2})4\pi^2 EI_{OP}/l^2;$$

$$F_{ext}=(\sqrt{2})\pi^2 Ewt^3/3l^2=0.47\pi^2 Ewt^3/l^2$$

$$F_{ext}=(\sqrt{2})8.18\pi^2 EI_{IN}/l^2;\ I_{IP}=tw^3/12;$$
$$F_{ext}=0.68\pi^2 Etw^3/l^2$$

For in plane bending due to the bending moment caused by the transverse loading component, stress is related to the loading condition and dimensions of the beam (l, t, & w) with Euler Bernoulli theory.

$$\sigma=My/I;\ M=Fl/(\sqrt{2});\ y=w/2;\ I_{IP}=tw^3/12$$

This can be constrained by the yield stress of the material:

$$\sigma_y=(6/(\sqrt{2}))(Fl/tw^2);\ l=((\sqrt{2})\sigma_y/6F)(tw^2);\ t=(6F/(\sqrt{2})\sigma_y)(l/w^2);$$

$$w=\sqrt{((6F/(\sqrt{2})\sigma_y)(l/t))}$$

giving optimal dimensions that should allow the loading condition that produces critical stress due to in plane bending to be equal to the loading condition that produces out of plane buckling:

$$\sigma_{bendIP}=F/(\sqrt{2})tw;\ F=(\sqrt{2})\sigma_y tw^2/6l;\ \sigma_{bendIP}=\sigma_y w/6l$$

$$\sigma_{buckleOP}=\sigma_{buckleIP}+\sigma_{bendIP};\ (\sqrt{2})\pi^2 E/3)(t^2/l^2)=((\sqrt{2})\pi^2 E/3)(w^2/l^2)+\sigma_y w/6l$$

Note that this approximation does not take into account the additional bending expected due to simultaneous axial and transverse loading in the bending plane (which would add considerable complexity to the calculation), and therefore should be understood as an upper bound on aspect ratio of the strut member. It is clear regardless that the buckling terms dominate.

Figure 11:
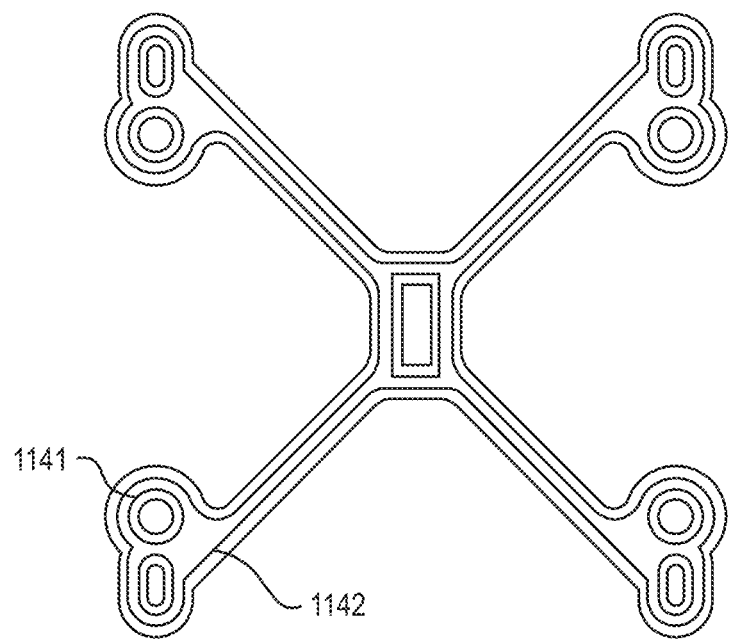
FIG. 11 depicts fiber orientations in a pinned unit.
Figure 12A:
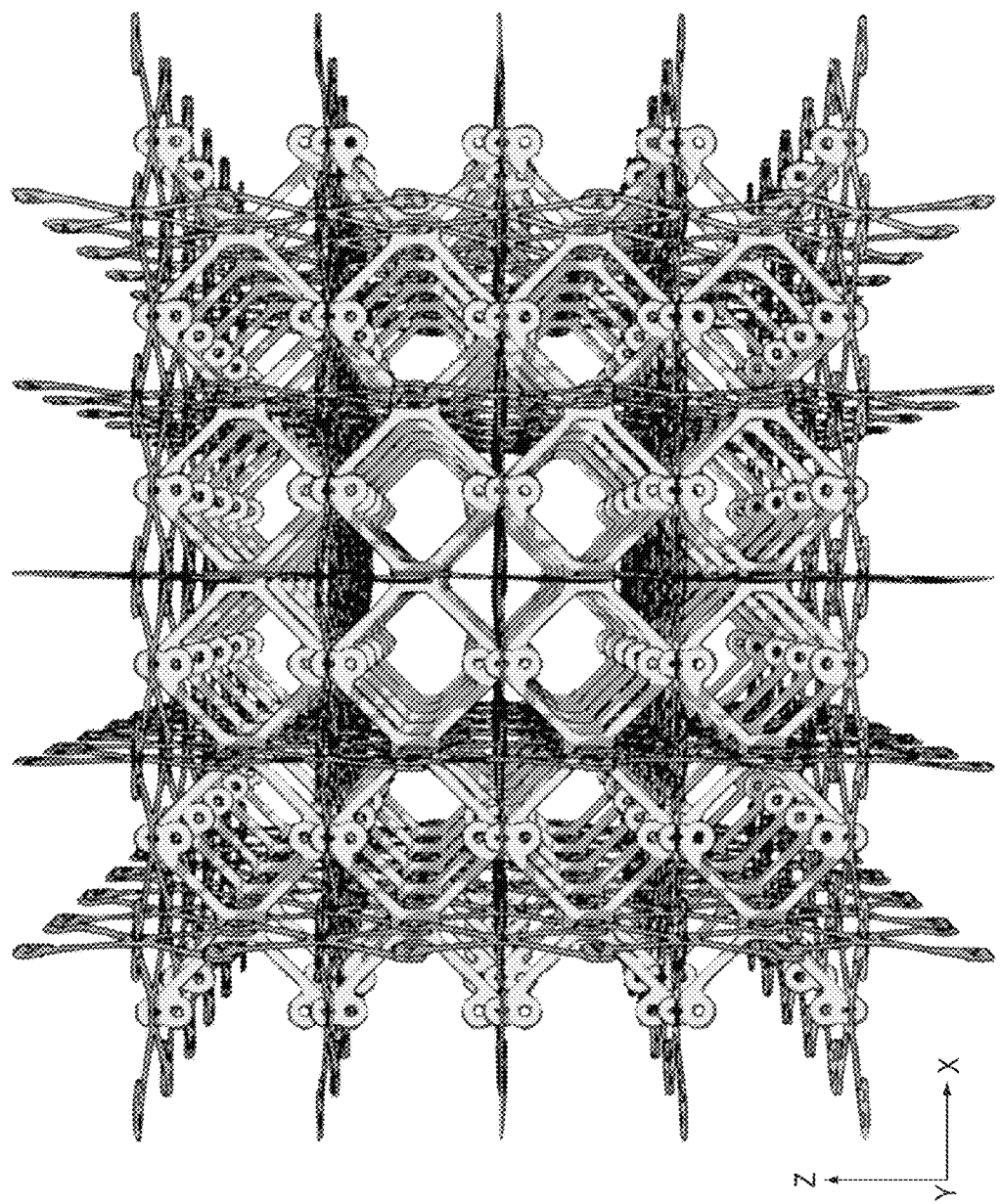
FIGS. 12A-C are perspective views of exemplary complex cuboct truss assemblies, forming volumetric structures.
Figure 12B:
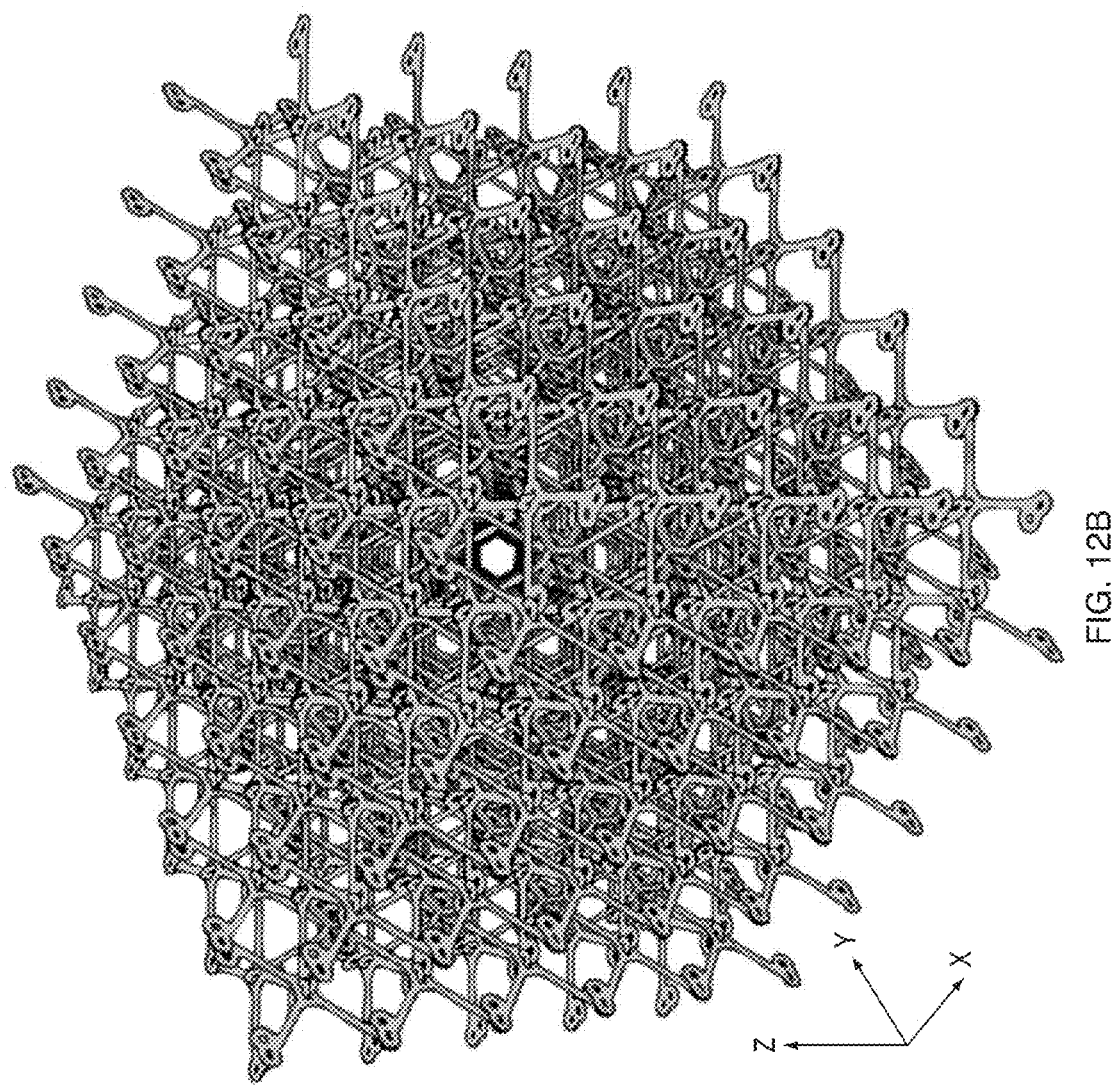
Figure 12C:
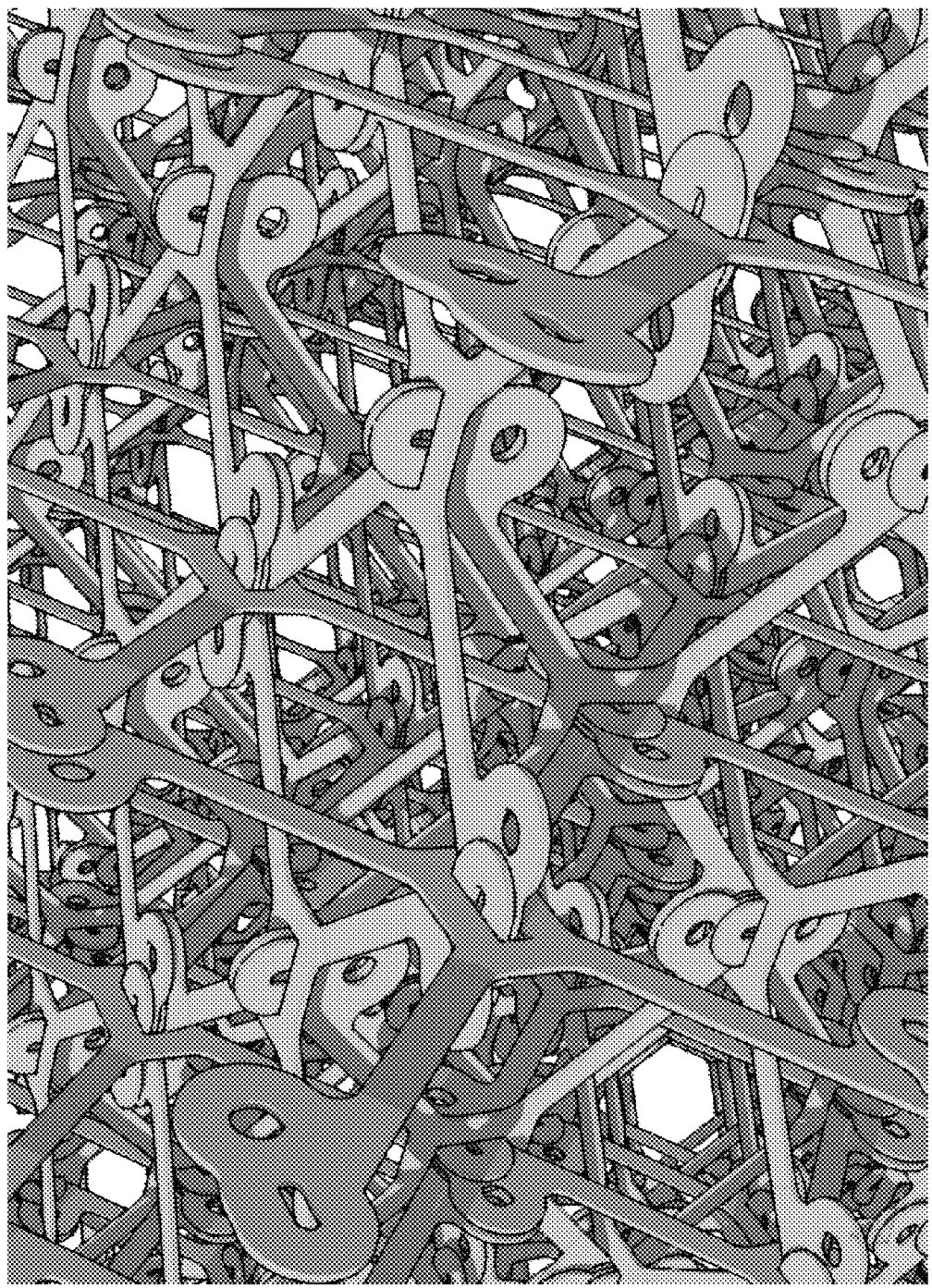

Another design case study takes the following design constraints: a specific material with known modulus (E) and yield strength ($\sigma_y$), that comes as sheet stock with thickness t, and a desired lattice pitch. To minimize mass density, make w=t. Finding the maximum per-strut member load follows from Euler Bernoulli theory:

$$F_{axial}=(\sqrt{2}\sigma_y/6)(tw^2/l)$$

$$E_{aluminum}\approx 69\ \text{GPa},\ \sigma_{yaluminum}\approx 400\ \text{MPa},\ l=1.8\ \text{cm}$$
(overall pitch of 2.54 cm), $F_{axial} \approx 2.68$ N, $t=w=0.8$ mm $E_{carbon} \approx 150$ GPa, $\sigma_{ycarbon} \approx 1.5$ GPa, $l=5.39$ cm (overall pitch of 7.62 cm), $F_{axial} \approx 3.36$ N, $t=w=0.8$ mm $E_{wood} \approx 12$ GPa, $\sigma_{ywood}=40$ MPa, $l=10.78$ cm (overall pitch of 15.24 cm), $F_{axial} \approx 2.80$ N, $t=w=3.175$ mm $AR=20,60,30$ Since the load pattern through each part is well described, this presents a unique application for fiber reinforced composite materials. FIG. 11 is diagram of fiber continuity and orientation for these parts, showing loops 1141 of fibers around the holes, and end-to-end continuity of other fibers 1142 that extend across the strut members and around the slots. FIGS. 12A-C are perspective views of exemplary complex cuboct truss assemblies, forming volumetric structures.

Production of the parts may be via pre-preg layup or multiplexed winding (explained in the next section) with conventional resin transfer molding, followed by slicing. Production of individual parts by conventional resin transfer molding is also a possibility, with the development of compatible fiber placement processes. Suitable prototype parts may also be made via two dimensional cutting of preformed laminates with appropriately oriented fibers, such as from quasi-isotropic laminate.

Figure 13:
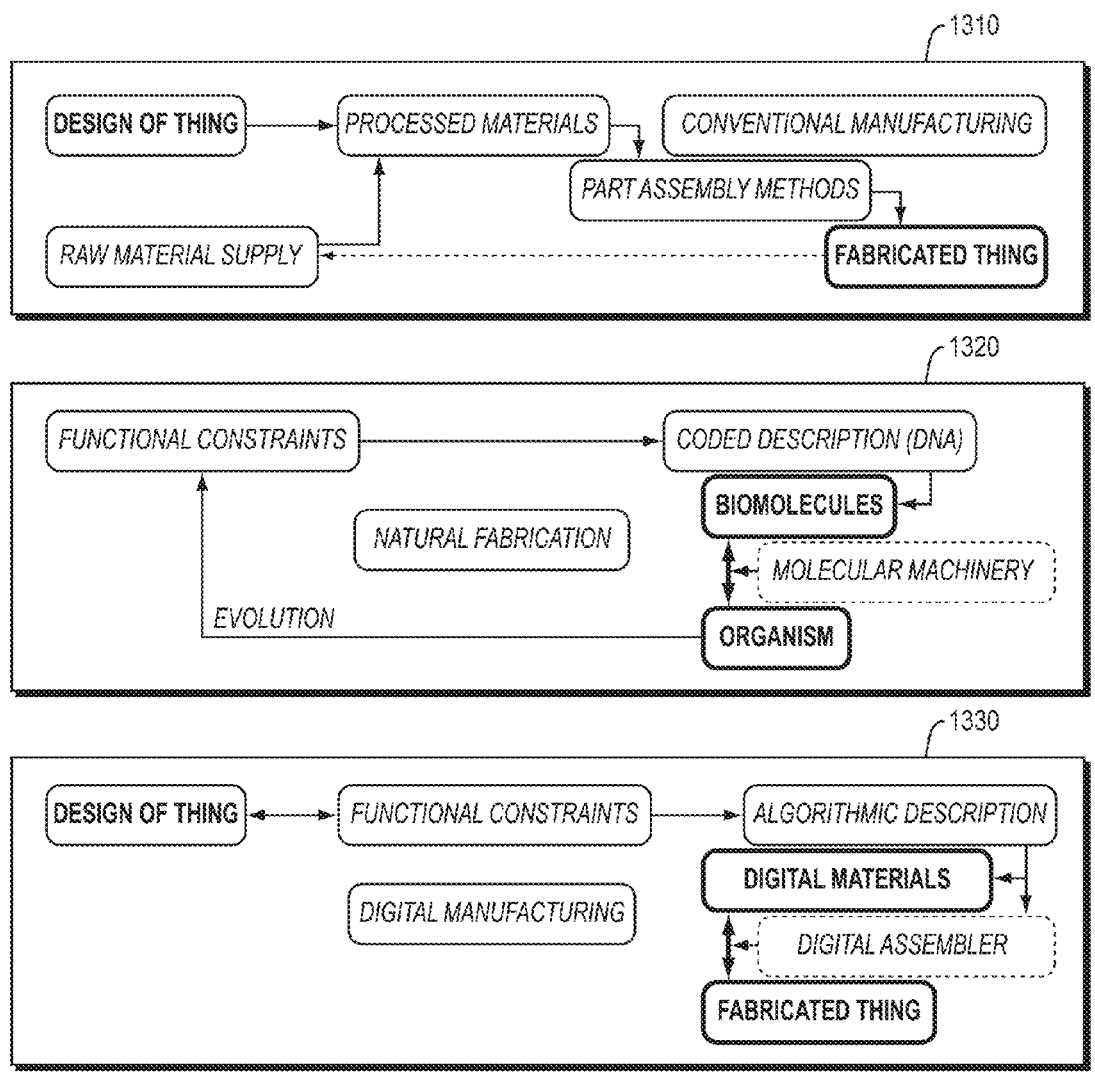
FIG. 13 depicts a comparison of the design workflows for conventional manufacturing, natural fabrication, and digital manufacturing.
Figure 14A:
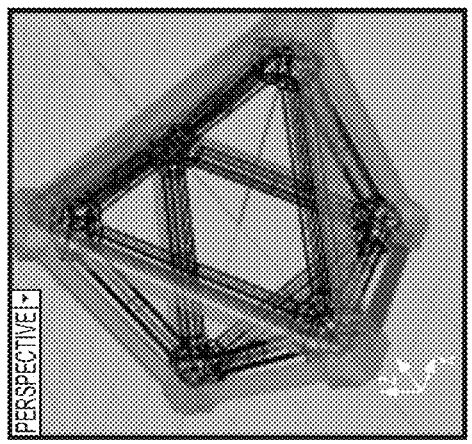
FIGS. 14A-D depict visual displays produced by some of the parametric design tools when employed for the digital composites experiments.
Figure 14B:
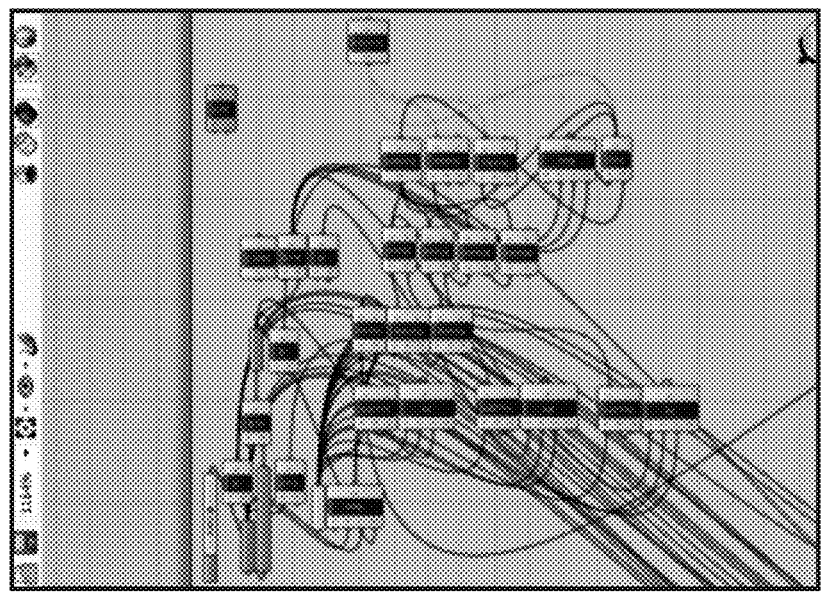
Figure 14C:
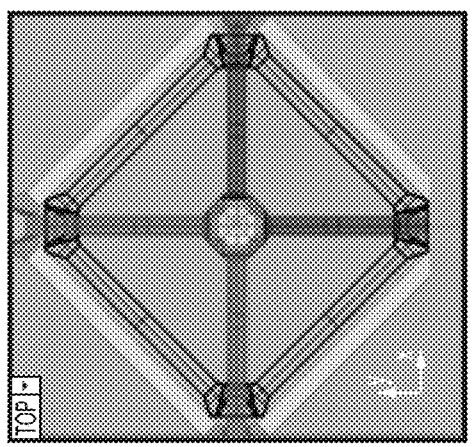
Figure 14D:
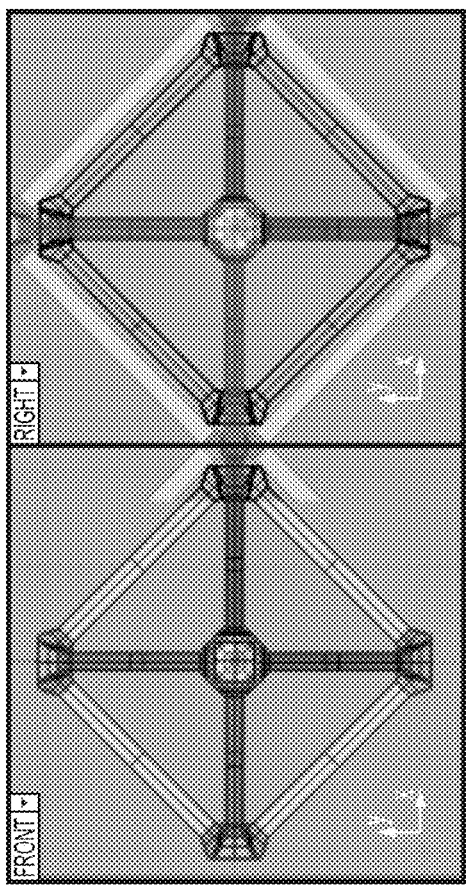

Method. Much progress is being made in the areas of algorithmic descriptions and the ability to simulate functional constraints in the CAD environment in order to get from a description of an object to the digital information needed to most efficiently fabricate the object. This is converging towards CAD descriptions that are functional object oriented systems. This may be mapped directly to digital material systems, whereby parts may be thought of as data types, physical assemblies may be thought of as classes, and robotic digital assemblers may be thought of as compilers. FIG. 13 compares the design workflow for conventional manufacturing 1310, natural fabrication 1320, and digital manufacturing 1330.

A rudimentary implementation (FIGS. 14A-D) of this was made, primarily driven by the convenience of free parameterization of the parts (both for analysis and fabrication). Basic C# scripts were written to interface with Rhinoceros API and occasionally as Grasshopper tiles, for export as stl files which are easily processed with existing CAM interfaces. In addition, the scripting methods were designed to output dxf files, only because of their standardization with existing CAM methods. The image above shows a parameterized cuboct truss cell unit with fixed connection design, and strut member aspect ratio as a user setting (slider in upper left hand corner of the graph), which results in corresponding variations to the cell pitch. Future work aims to solve the graph gui spaghetti-ball problem with real space correspondence between the graph and the drawing product, while also addressing the CAM interface file divergence problem by interfacing directly with machine tools.

Part fabrication. Two strategies are used for part fabrication, for comparison. The primary strategy focuses on optimization of fiber placement within each part. This can be summarized as a multiplexed winding of the part profile, which is then sliced into individual parts. The secondary strategy considers the industry best practice method of producing this part. This can be summed up as cnc milling of parts from quasi-isotropic laminate stock. Both the multiplexed winding and the quasi-isotropic laminate stock were produced at the same time, using the same source batch of unidirectional pre-preg, and under identical environmental processing conditions, with the obvious exception that they were produced on different tooling (both primarily aluminum, and with identical mold release agent).

Figure 15A:
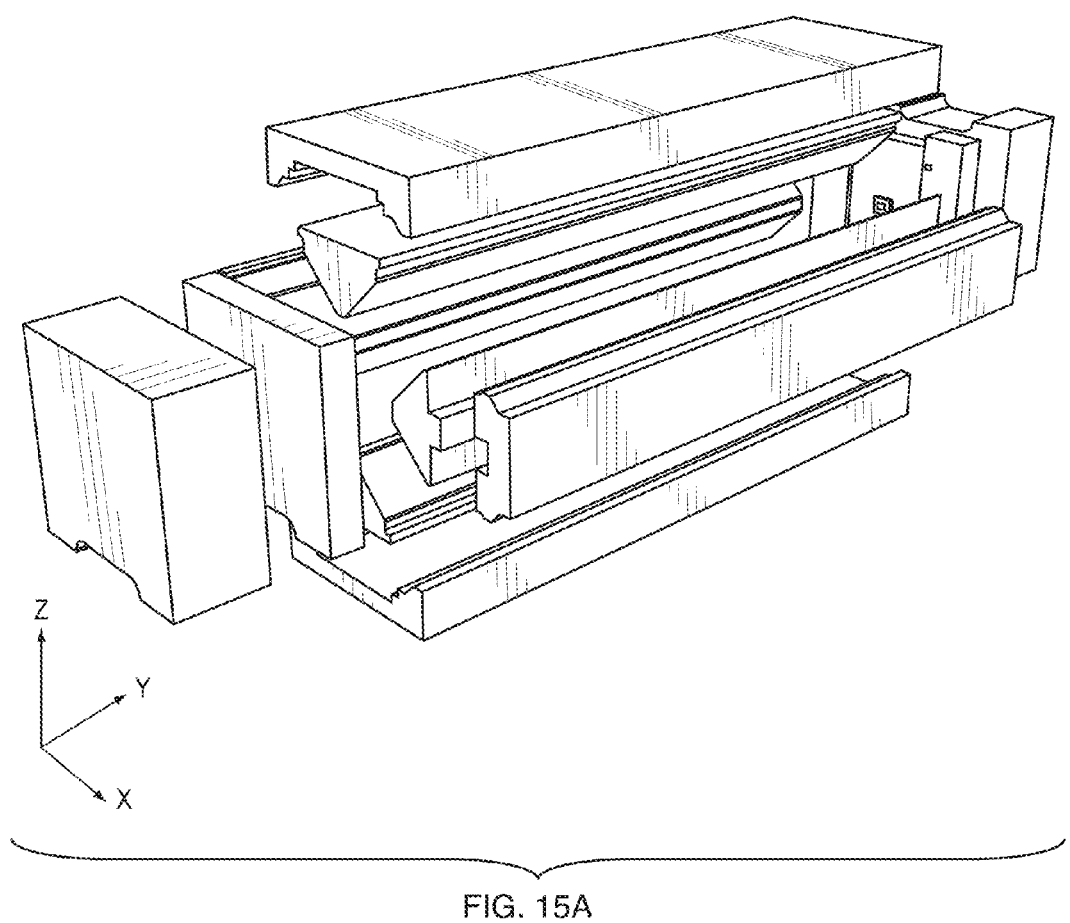
FIGS. 15A and 15B are perspective and cross-section schematic drawings, respectively, of an optimized part multiplexed winding mold diagram.
Figure 15B:
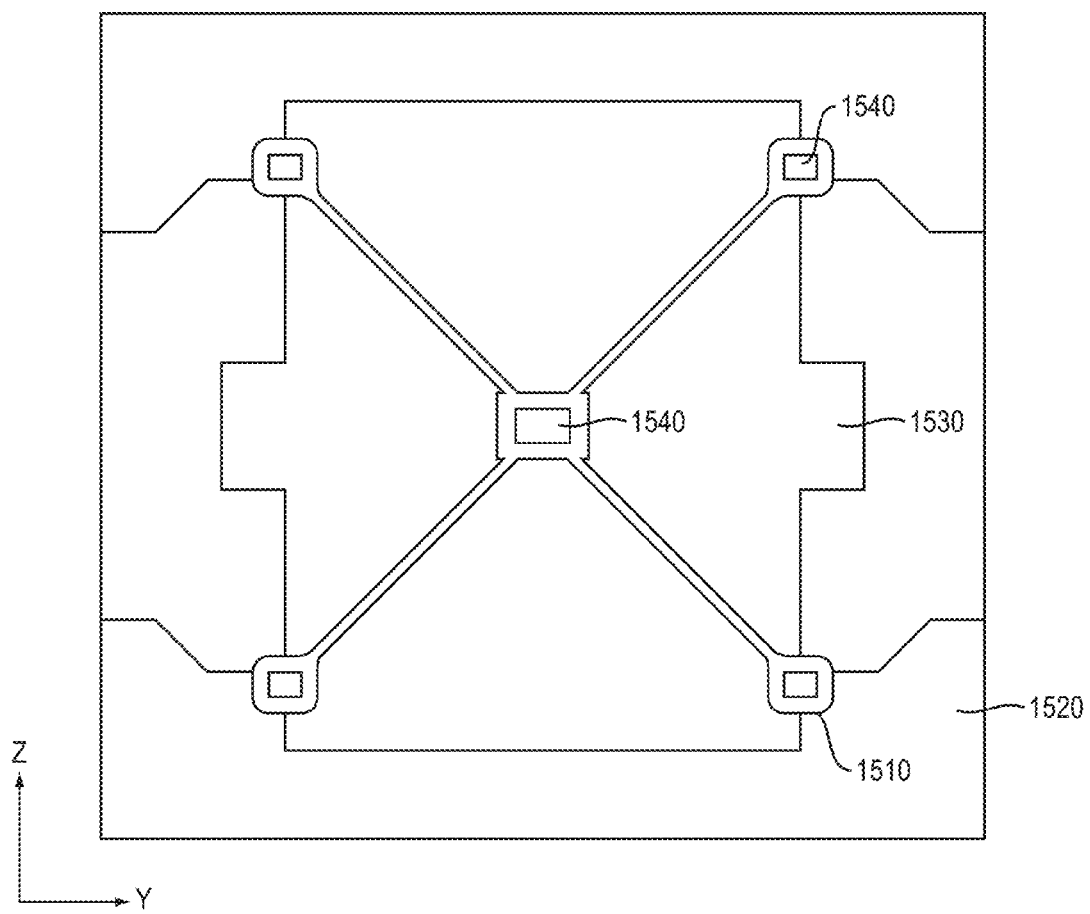

The tooling for the optimized parts was originally designed for use in a resin transfer molding press (spiritaero cdc prestwick, radius press), utilizing an existing tool frame and blanks to provide two dimensions (x and y) of constraint, with the press itself supplying vertical clamping pressure (6 bar). FIGS. 15A-B are perspective and cross-section schematic drawings, respectively, of an optimized part multiplexed winding mold diagram. Seen in the cross-section shown in 15B are the part 1510, aluminum tooling 1520, ptfe tooling 1530, and steel tooling 1540.

The process is as follows:
1) Wind each black mandrel to provide an effectively continuous loop of fiber around each hole (which is displaced by the mandrels).
2) Wind around the perimeter of the entire part, including the five mandrels. This is ideally done in an automated fashion, as a collapsed winding (around the four extremal windings while held at the proper distance apart, then simultaneously moved together while pressing in with the four tooling parts).
3) Place in tooling, clamp in press, draw vacuum pressure, infuse, cycle to temperature, demold.
4) Slice into individual parts.

In practice, step two was done in four pieces, with continuous strips running from the center of the part to the end of each strut member, around the end (with its sub-winding), and back to the center, with substantial overlap across the neighboring perimeter sections. The reason for the PTFE inserts is two-fold. PTFE has a substantially greater coefficient of thermal expansion, when compared to either the aluminum tool or the carbon fibers. Since the system is temperature cycled from room temperature to 180 C during the initial phase of the cure cycle, the expansion of the PTFE provides for even fiber consolidation, by exerting pressure on areas of the part for which the dimensional tolerances are less important than the structural quality. The only areas where dimensional tolerances are important are the interiors of the bearing holes, and the extremal half of the end of each strut member, around the bearing hole at the end. The other function for the PTFE inserts was for mold release.

Figure 16:
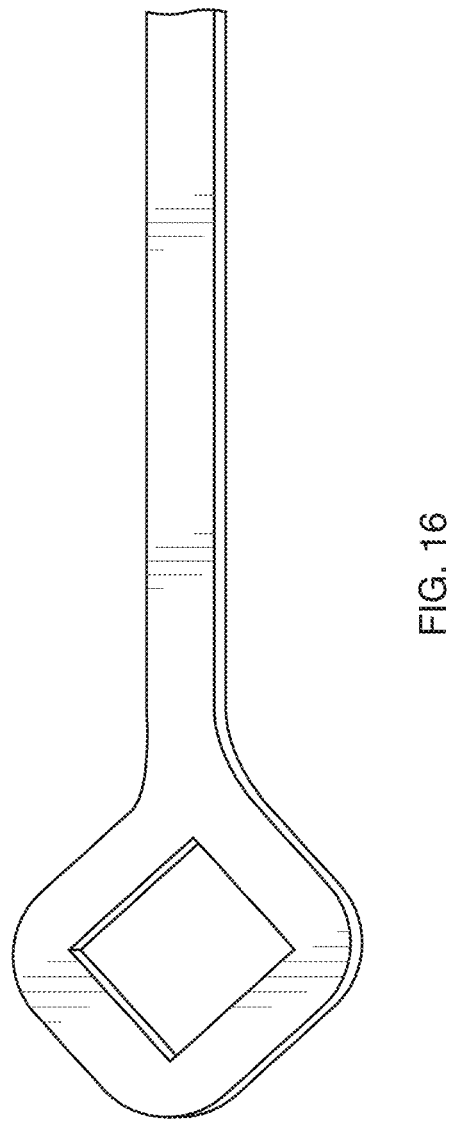
FIG. 16 is a close-up view of a part produced by multiplexed winding.

Following de-molding, the winding was sliced into individual parts using a wafer saw (Isomet 1000 with 7" 20HC blade at 175 rpm, with water coolant). Qualitatively, it was immediately apparent that these parts were stiffer per weight than the comparison parts made from quasi-isotropic stock. FIG. 16 is a close-up view of a part produced by multiplexed winding. Gradations on the scale are 100ths of an inch.

The industry standard method of designing a part with load bearing holes is to assemble a quasi-isotropic laminate from which load bearing holes are drilled or milled. For these parts, a thin (1 mm) laminate was designed using the 0.125 mm per ply unidirectional pre-preg that was used for the multiplexed winding. The layup schedule of 0, 45, 90, −45, −45, 90, 45, 0 was pre-cut with a cnc profiler, and laid up by hand onto 0.25" thick aluminum tool plates with frekote pre-applied. This was followed by traditional vacuum bagging, using fiberglass strips as air flow media at the edges, peel ply, a caul plate for top side surface finish, breather felt, and vacuum film sealed with silicone tape. Like the multiplexed winding tool, these were placed in an oven with continuous vacuum supply to the bag, for the duration of the cure cycle. Each laminate was then divided into eight 11"×11" sheets for processing on the Center for Bits and Atoms Hurco VM10U machining center.

Tooling was diamond coated ³⁄₃₂" diameter four flute square end mills with 30 degree helix angle, run at standard feeds and speeds, but with air cooling provided by a vortex tube. Tool life was comparable to carbide tooling, but with much cleaner cuts throughout the life of the tool. It is thought that the reason for the matched tool life is that the diamond coating insulates the tool and does not allow it to cool as effectively, under the vortex tube stream. The vortex tube was chosen for its efficacy over liquid coolant in allowing the fixturing to remain stable.

The laminate sheets were fixtured with thin 3M double sided tape with clear VHB adhesive and polyethylene film carrier, to an aluminum sacrificial planar layer. The carrier is important for de-fixturing, as it allows remaining adhesive to be removed efficiently. Wax (over a heated platen) and other tapes were found to be inadequate, noting that the relevant specification seems to be peel strength. With the 30 degree helix angle that was available, particularly high peel strength was necessary to maintain fixturing. For each cycle, after thorough cleaning of surfaces with alcohol, the tape was first applied to the sacrificial plate with a hard plastic laminating roller, then the laminate was placed on top and the laminating roller was used to apply pressure across the top of the laminate. This process left some adhesive residue on the cut sides of the parts, which was easily removed by hand.

Figure 17:
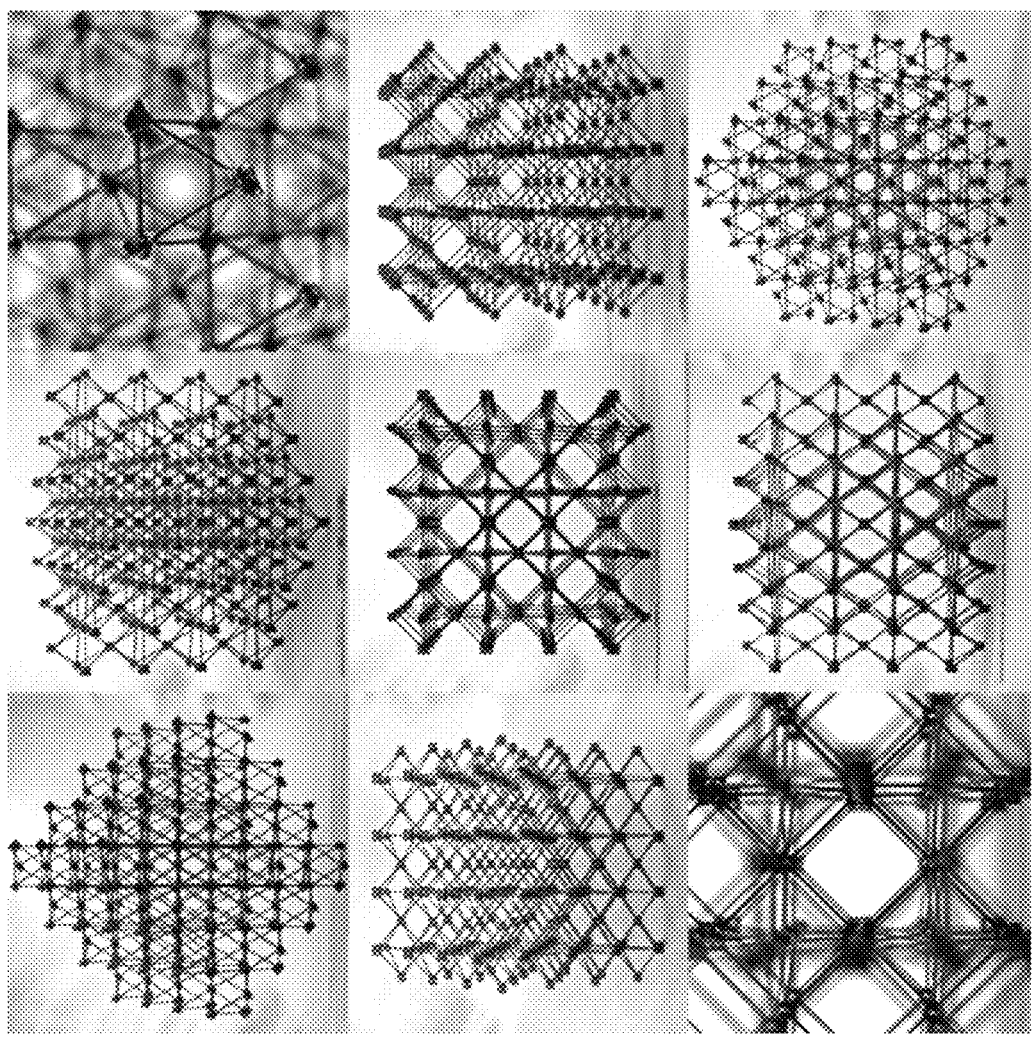
FIG. 17 is a series of photographs of the digital composite test specimen.

FIG. 17 is a series of photographs of the digital composite test specimen. Physical testing of the bulk properties of digital materials is fairly straightforward, as they are treated as classical bulk materials. Of primary interest are elastic modulus, strength, and isotropy. Testing was performed with traditional apparatuses: an Instron 5985 (250 kN) for final cfrp assemblies and constituent solid testing, and an Instron 4411 (5 kN) for component and small sub-assembly testing.

To prove both the assemble-ability of early digital material system designs, as well as key load transfer principles, initial ad-hoc testing of the tensile strength of digital composite chains were performed. The results of this test showed that building strong chains from snap-fit fiber composite parts was plausible. A brief detour focusing on a comparison to shear honeycomb materials showed that beginning by concentrating instead on a general isotropic system would be more fruitful.

Preliminary volumetric digital composite test pieces perform, in almost all mechanical respects, between the regime of alloy honeycomb or foam cores and prototype carbon micro-truss cores, according to manufacturer's data and control tests. Just from looking at the initial tension tests with randomly oriented glass fiber laminate, it was clear that a bulk digital composite structure that meets the whole-part loading specifications is attainable.

To prove both the assemble-ability of early digital material system designs, as well as key load transfer aspects of the designs, initial testing of the tensile strength of Digital Composite type C was performed. An important feature of the design was the cam action under load, which was intended to increase connection strength with load. If the connection surfaces properly increase in normal (therefore frictional) force when the design load is applied, then it is expected that within-part strut members will fail before the connections between parts.

The designs require snap-fit preload for new parts only required at the normal to the already built structure. Therefore, to add to a part, you only need to take new pieces and push them onto the outside of the part, which allows an automated assembly mechanism to have a single degree of freedom for the procedure of installing a new part. This example has a breaking strength of 1 kN with low variance, and effectively transfers load to orthogonal elements. At the lattice spacing of this particular part, the equivalent maximum (negative, on a surface) pressure is about three pounds per square inch. This is easily tunable by increasing the cross section of the parts—the sparseness of the structure allows for this particular design to be trivially adjusted to sustain an equivalent maximum pressure of thirty pounds per square inch (with the trade-off of increased mass density).

Repeated trials were performed with up to three connection long chains (the longest that would fit in the load testing machine), in order to check for consistent behavior with increasing length. The results confirm consistent behavior, so samples were tested manually using human weight.

The bulk mechanical properties of conventional honeycomb were compared with the performance of test digital composite assemblies. To test bulk compression modulus, example volumes of Digital Composite A, B, & C were prepared, as well as aluminum honeycomb, aluminum-fiberglass honeycomb, and rigid polyurethane foam. Approximately 4.5"×4.5"×4.5" cubes of material were constrained (epoxied) to fiberglass test plates and compressed using a 5 kN NC load frame. Specimens were crushed well past the yield point to a 1" height in order to observe a complete response curve, including crush strength. The test results are summarized in Table 2, together with published properties of commercially available structural honeycomb products, for comparison.

TABLE 2

|  | density (kg/m$^3$) | compression strength (KPa) | bulk modulus (MPa) |
|---|---|---|---|
| Experimental Data |  |  |  |
| digital composite A (cik) | 17.8735 | 150.025 | 87.27 |
| digital composite B (pushCam) | 15.1366 | 38.631 | 62.80 |
| digital composite C (pullCam) | 16.9449 | 34.309 | 11.90 |
| aluminum honeycomb composite | 73.5298 | 259.635 | 157.50 |
| aluminum honeycomb fiberglass composite | 102.4596 | 262.926 | 355.20 |
| polyurethane foam A | 92.6656 | * | 123.04 |
| polyurethane foam B | 93.7539 | 1112.634 | 45.69 |
| aluminum beverage can | 33.3611 | 248.372 | 97.44 |
| Manufacturer Data |  |  |  |
| ultracor PBO HC | 40.0462 | 889.423 | 75.84 |
| ultracor carbon/cyanate HC | 12.8148 | 255.106 | 64.12 |
| ultracor corrugated carbon | 112.1292 | 1179.003 | 89.63 |
| ultracor triax HC | 48.0554 | 2702.745 | 326.81 |
| ultracor quartz HC | 45 | 1489.268 | 102.04 |
| hexcel 5052al ld HC | 16.0185 | 137.895 | 68.959 |
| hexcel 5052al hd HC | 198.6289 | 13100.039 | 4481.59 |
| hexcel HRP glass/phenolic ld HC | 35.2406 | 861.844 | 89.63 |
| hexcel HRP glass/phenolic hd HC | 192.2216 | 12410.563 | 1792.64 |
| hexcel HRH glass/PI ld HC | 51.25908 | 1516.847 | 186.16 |
| hexcel HRH glass/PI hd HC | 128.1477 | 6894.757 | 689.48 |
| hexcel HRH aramid/PI ld HC | 24.0277 | 586.054 | 41.37 |
| hexcel HRH aramid/PI hd HC | 128.1477 | 11031.612 | 413.69 |

* specimen reached load cell maximum

It is not trivial to match the compressive strength and modulus of commercially available core materials, however, these initial tests suggest that it is quite possible to do so with Digital Composites (even just refined manufacturing methods for the parts might make up the difference observed in these tests). Regardless, the most compelling result is in terms of mass density. The un-optimized test samples show similar compressive strength to the commercial core products tested, but at a considerably lower density.

However, referring back to manufacturer's data on the best commercially available core products (i.e. carbon honeycomb core products), it can be seen that the preliminary digital composite test pieces are between this regime of alloy honeycomb or foam cores and carbon honeycomb cores (which are still considerably lighter for their strength than the test results for the test pieces).

This is not bad. To see why, refer to the loading test specifications for the part. Just from looking at the initial tension tests with randomly oriented glass fiber laminate, it is clear that a bulk digital composite structure that meets the whole-part specifications would not be overly difficult. In fact, it is clear that if the part were fabricated entirely as skinned commercially available structural honeycomb, it would far exceed the part specification (by three orders of magnitude, depending on the product). It seems that this latter method of construction is prohibitively difficult, since there are various non-structural systems that need to reside in the interior of the part. Furthermore, it would suffer from the same production issues that partially compel this application for digital composites in the first place. Larger monolithic structures provide fewer opportunities for qualification before the cost of a failed qualification test becomes too high.

These initial tests therefore suggest that while it seems possible, Digital Composites may not be a particularly good candidate material for replacement of carbon fiber laminate cores. However, results do suggest that Digital Composites can meet the structural specifications for entire assemblies.

Connection Tests. In order to understand design constraints, initial tests on connection strength, modulus, and failure modes were performed. Tests were performed with tooling grade carbon fiber laminate (mcmaster-carr 8181K32, 0 90 (50/50)), which was provided with estimated elastic modulus of 65 GPa at the 0 and 90 axes. The constituent fibers are described by the manufacturer as having an elastic modulus of 234 GPa, and the fiber fill fraction of the laminate is 55% by volume. The mass density of the laminate is specified as 1.4 grams per cubic centimeter.

The part design tested was an early version of the dcx3 part, with principal part dimension u (center of peripheral bearing hole to center of adjacent peripheral bearing hole) of 3.0000 inches, nominal ligament length of 2.1213 inches, thickness of 0.03125 inches, and width of 0.125 inches. Average principal part volume is 0.0385436 cubic inches, with an average pin part volume of 0.00441604 cubic inches. A resulting octahedral unit cell is composed of three parts and three pins, therefore its constituent solid volume totals 0.12887892 cubic inches for a cellular volume of $u^3$, or 27 cubic inches. The mass of the cell is 2.9567 grams, giving a total cellular material density of 0.006683 grams per cubic centimeter, and a relative density of 0.004773.

As reference, note that since the constituent solid modulus is expected to be ~65 GPa, the expected ideal modulus for a material composed of this solid and vacuum, at this density, is around ~310 MPa (typical for low density plastics). However, because of conformational constraints the expected ideal modulus for a stochastic cellular solid composed of this solid and vacuum, at this density, is instead around ~1.48 MPa (typical for elastomeric rubbers).

At ~0.007 grams per cubic centimeter, this material is on par with the density of the lightest foams—any lighter, and comparisons would be drawn with sparsely structured ultralight materials such as aerogels, for which the maximum modulus of a material composed of this solid and vacuum, at this density, is ~7.07 KPa (typical for biological tissue).

It is rather expected that the ligament end constraints will behave as guided constraints—rotationally fixed but with affine partial translational freedom (as they are co-constrained by the other seven ligaments meeting at any connection). As such, it is predicted that simultaneous axial and fixed-guided transverse beam loading will dominate the behavior of the structure. The resulting estimate for the ligament bending based modulus of an ideal material with this geometry is ~21.4 MPa. Considering that 0 90 biaxial laminate is being used for omni-directional loads, instead of ideally oriented fibers, ~50% of this ideal stiffness may be expected, giving an expected stiffness of ~10.7 MPa (typical for elastomeric rubbers).

The tests performed purely addressed the strength of a connection assuming half-length ligaments with fixed constraints on the ends, as worst-possible-case behavior. The objective was to look at the connection properties only. Any extension to overall material properties is predicated on the strong assumption that the connection dominates the behavior of the material, which is not actually expected.

E~12 MPa failure at ligaments

K~19 MPa failure at central load bearing feature

Second iteration tests are aimed at layup optimization. The part design tested was initially designed around existing development tooling, with principal part dimension u (center of peripheral bearing hole to center of adjacent peripheral bearing hole) of 2.0000 inches, nominal ligament length of 1.4141 inches, thickness of 0.03937 inches, and width of 0.04000 inches. Average principal part volume is 0.0158205 cubic inches, with an average pin part volume of 0.003394132 cubic inches. A resulting octahedral unit cell is composed of three parts and three pins, therefore its constituent solid volume totals 0.0474615 (part)+0.010182396 (pin) cubic inches for a cellular volume of $u^3$, or 8 cubic inches.

Continuing with calculations for the same material as above, the mass of the cell is 1.3224599 grams, giving a total cellular material density of 0.01009 grams per cubic centimeter, and a relative density of 0.007207. The expected ideal modulus for any material composed of this solid and vacuum, at this density, is around ~468 MPa (typical for plastics). Again, because of conformational constraints, the expected ideal modulus for a stochastic cellular solid composed of this solid and vacuum, at this density, is instead around ~3.38 MPa (typical for elastomeric rubbers), and the ligament bending based modulus of an ideal material with the prescribed non-stochastic geometry is ~39.8 MPa.

Testing the cuboct truss design. The testing methods employed followed a component-to-assembly strategy. This allows for proper estimation of fixturing and load requirements, as well as providing qualitative and quantitative information towards explaining the behavior of complete assemblies. Testing the axial and bending modulus and strength of the strut members of the actual components was undertaken first. Strut members were tested in tandem, held near their convergence point to aluminum tabs with high shear strength epoxy (Loctite Hysol 60 HP, cured at 50 C for 24 hours), which was then held in the grips of the load testing machine (Instron 4411).

Figure 18:
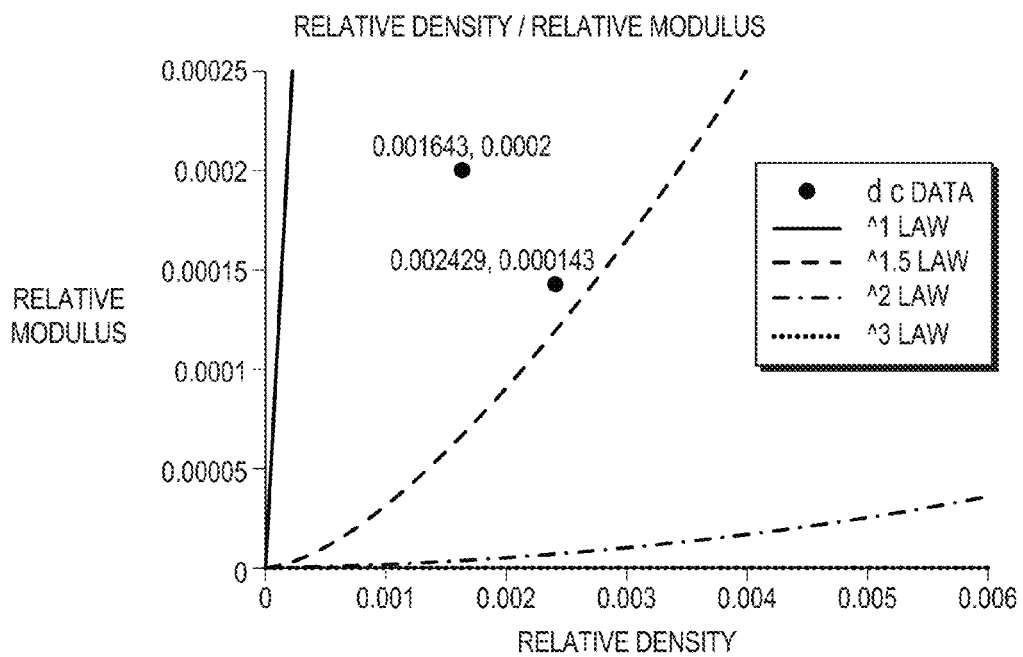
FIG. 18 is a graph of relative modulus vs. relative density obtained from initial constraint testing of the test specimen.

The lower constraint was either a glass plate with steel guides (to allow sliding motion, but constrain it to the part plane), or a plate with machined holes into which the ends of the strut members were also adhered (to provide full constraint). The data from the latter experiments was considered as providing an estimation of the upper bound on per-strut-member stiffness and strength, based on balanced axial loading of the parts. The former experiments provided a lower bound that is based on transverse beam bending behavior. FIG. 18 is a graph of relative modulus vs. relative density obtained from the initial constraint testing, providing the upper bound estimate.

Continuing this element-wise methodology, the connections were tested with very short attached strut members, in order to confirm connection design. This was performed across various axes, as well, to establish the isotropy of the connection.

To test isotropy of the lattice geometry as a whole, 3d printing was used (a dimension elite fdm with abs plastic material, and an invision si with uv curing acrylic) to generate samples that were computer sliced at arbitrary spatial angles, for load testing. To measure the uniformity of the assembled samples, radiography was used to visually check for alignment of the denser nodes (full ct scans were not particularly informative, since little more than one cell size worth of the structure fit into the operational scanning volume of the machine at any one time).

The final test samples were fixtured with a single bonded plate for each perimeter node, which was subsequently bolted to a larger coupling plate which was in turn bolted to a large platen fixture that was fixed to the load testing machine (Instron 5985).

Figure 19:
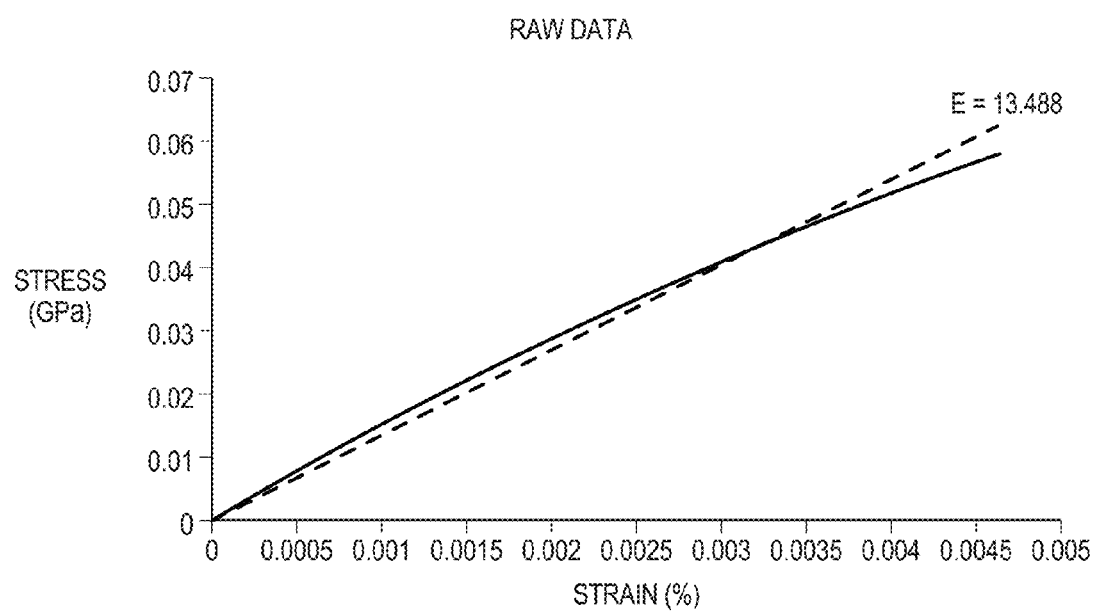
FIG. 19 is a graph of raw stress vs. strain data obtained from compliance testing, without compliance correction.
Figure 20:
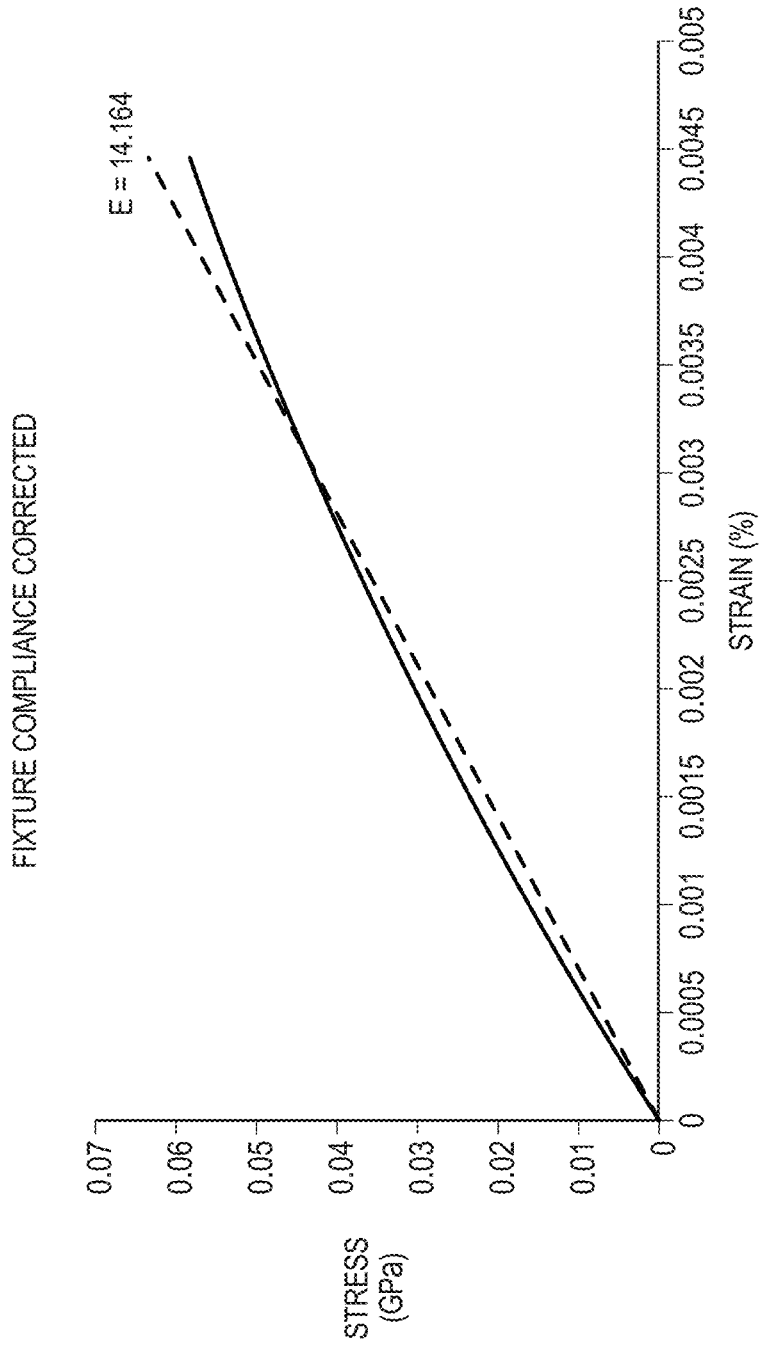
FIG. 20 is a graph of the data from FIG. 19, compliance corrected.

A large solid aluminum block was also machined and tapped so that it could be fitted as a sample, so that the compliance of the fixturing setup could be measured. The compliance of the machine and fixture was repeatably measured to equate to a virtual modulus of ~325 MPa at the cross section of the sample, with linear behavior across tension and compression. As this is over an order of magnitude greater than the observed experimental sample compliance, it does not appear that machine and setup compliance significantly affected the experimental results. Backing out the fixture compliance, with a linear adjustment based on force, from the results confirms this, as seen in FIG. 19 (raw data without compliance correction) and 20 (compliance corrected data).

Both methods of fabrication yielded parts that were assembled into ultra-light digital composite materials. The parts produced with multiplexed winding yielded a material with a density of 0.0048 grams per cubic centimeter—on par with aerogels. The parts produced by milling quasi-isotropic stock yielded a material with a density of 0.0096 grams per cubic centimeter, in the same regime.

Figure 21:
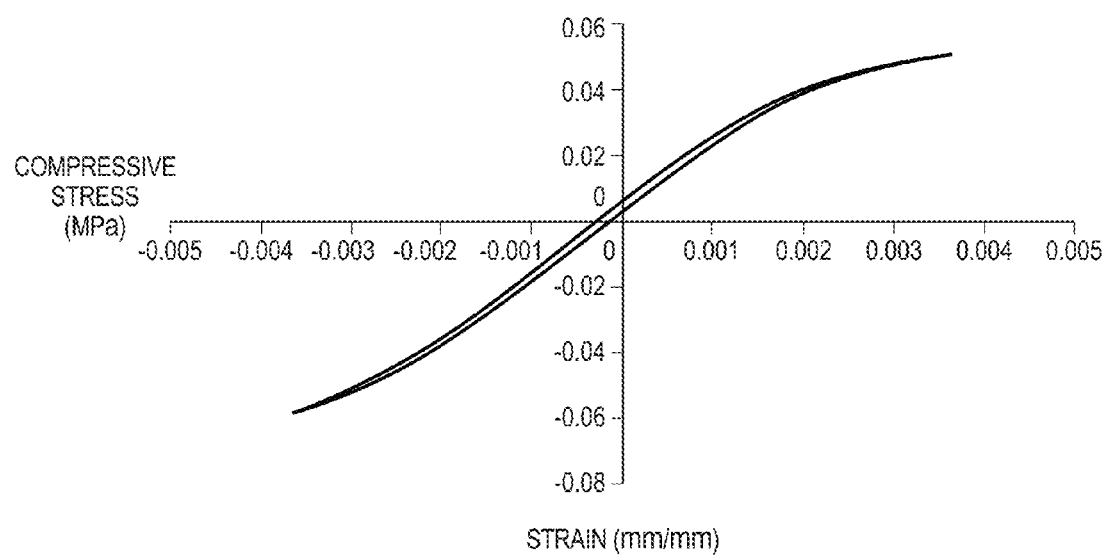
FIG. 21 is a graph of tension and compression cycling, showing transition from linear to non-linear elasticity with low hysteresis.

Mechanical performance of the parts met expectations—improving upon the conventional quadratic rule of thumb scaling law for lightweight cellular materials, and far improving upon the cubic rule of thumb scaling law for ultra-light materials. One of the most interesting results, however, can be seen in FIG. 21, which shows cyclic compressive and tensile loading of specimens, which display a linear elastic regime followed by a non-linear elastic regime with gradual reduction in stiffness and low hysteresis. This effect is nearly symmetric in both tension and compression. It is explained as a transition to coordinated elastic buckling of the strut members.

Figure 22:
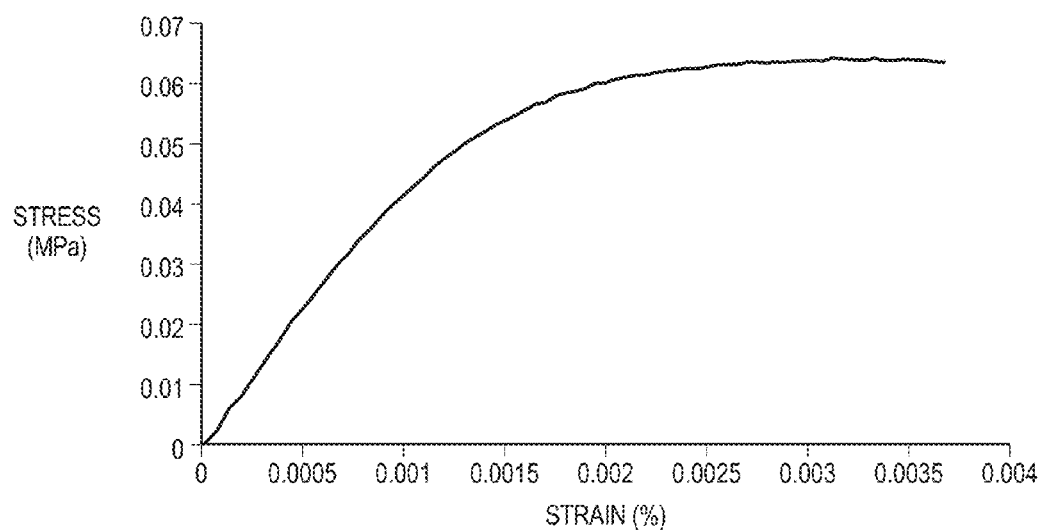
FIG. 22 is a stress strain chart for the test sample shown in FIGS. 23A and 23B.

Such an elastic instability, or pleating across a structure, had been described in two dimensional sheets before [Bertoldi, K., Reis, P. M., Willshaw, S., & Mullin, T., "Negative Poisson's Ratio Behavior Induced by an Elastic Instability", Advanced Materials, vol. 22, pp. 361-366, 2010], but it appears that this is the first example to be described in three dimensions. FIG. 22 is a stress strain chart for the test samples shown in FIGS. 23A and 23B.

Figure 23A:
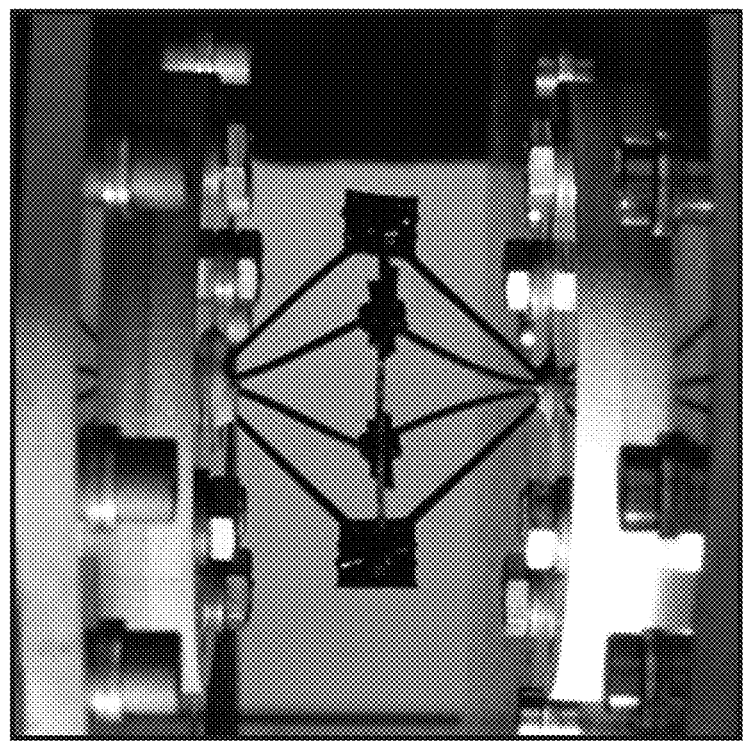
FIGS. 23A and 23B depict the load response of a test single unit to tension and compression, respectively.
Figure 23B:
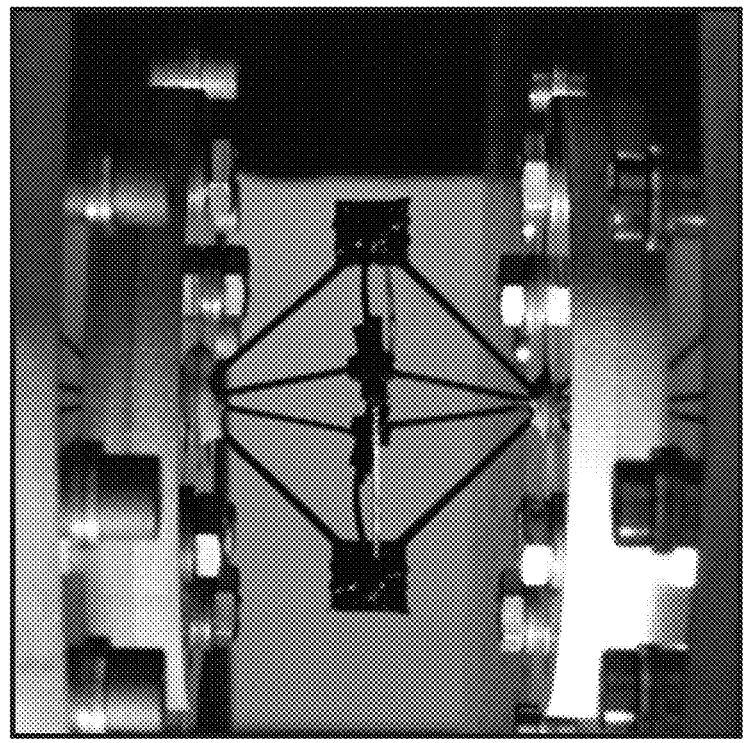

FIGS. 23A and 23B depict the load response of a single unit (unconstrained on the edges) to tension (FIG. 23A) and compression (FIG. 23B), showing coordinated buckling. FIG. 23A shows the strut members in the basal plane buckling in a coordinated fashion, resulting in rotation of the lateral end nodes. FIG. 23B shows twisting of the entire structure about the loading axis, which can be seen as twisting of the top and bottom end nodes.

Figure 24:
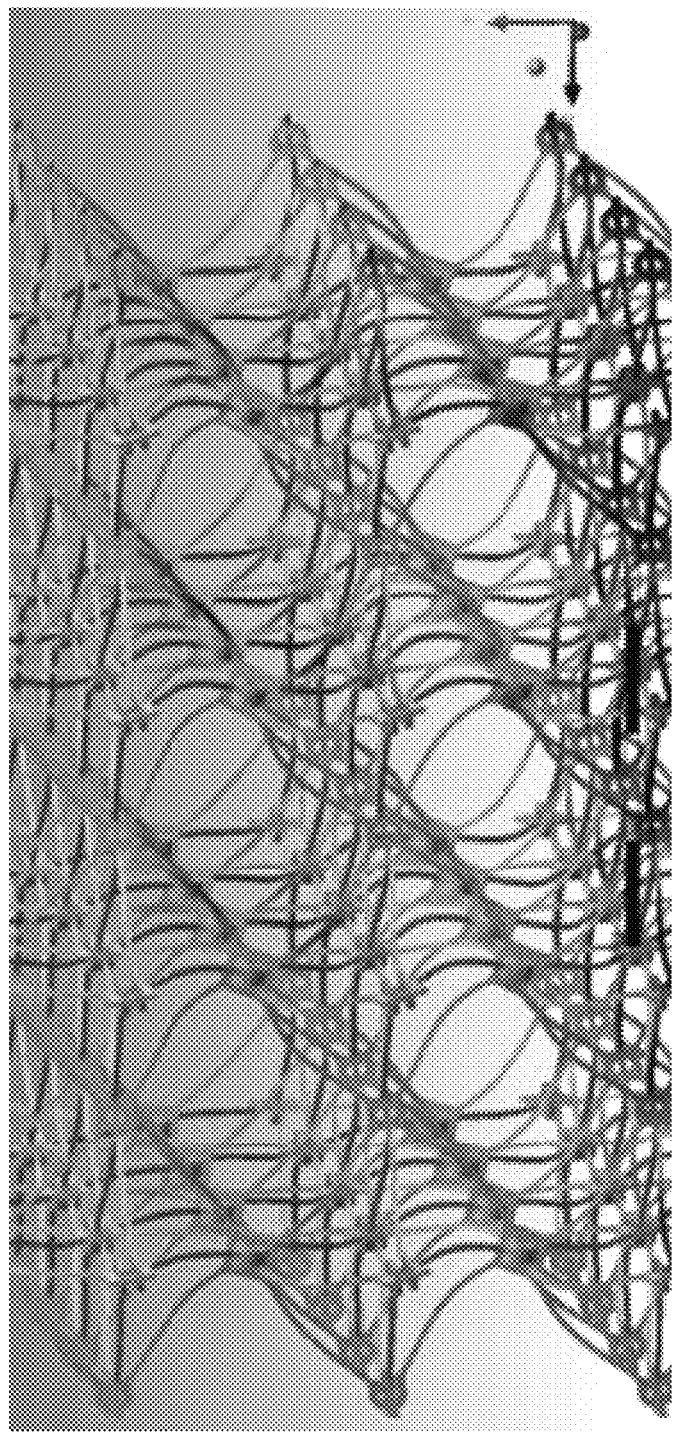
FIG. 24 depicts an ANSYS simulation with deflection multiplier, showing coordinated buckling mode.
Figure 25:
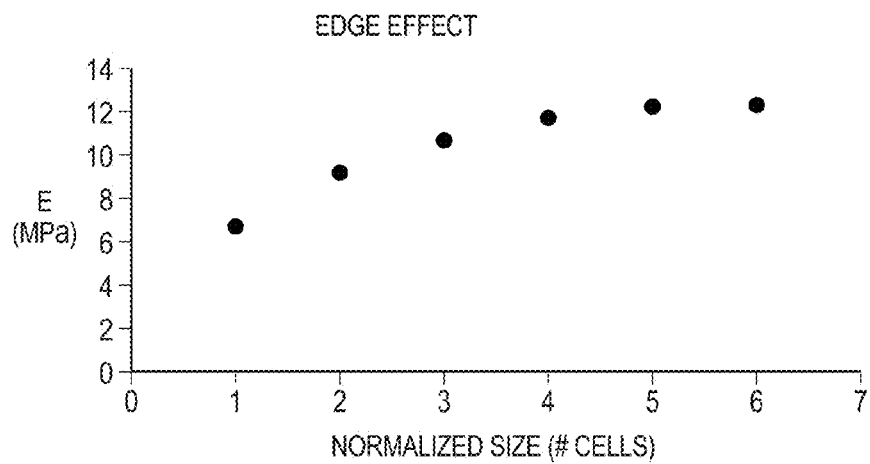
FIG. 25 is a graph of modulus plotted against normalized size (# cells) for the ANSYS simulation of FIG. 24.

Finite element simulations of assemblies corroborate this idea, as shown in FIG. 24, which depicts an ANSYS simulation with deflection multiplier that shows a coordinated buckling mode. Note the coordinated rotations of the nodes about the global principal axes. These simulations also examined edge effect. As can be seen in FIG. 25, edge effect generally conforms to prior studies [Andrews, E. W., Gioux, G., Onck, P., & Gibson, L. J., "Size Effect in ductile cellular solids. Part II: experimental results", International Journal of Mechanical Sciences, vol. 43, pp. 701-713, 2001], with minimal influence on overall results beyond characteristic dimensions exceeding several units.

FIG. 25 is a graph of modulus plotted against normalized size (# cells) for the ANSYS simulation of FIG. 24. As expected, the properties fall shy of the ideal proportional scaling limit, and predictions from full constraint preliminary strut member tests, The strength and modulus are, however, well above the lower bound predictions from pure bending strut member tests. This indicates successful implementation of additional constraint not typically seen in cellular solids.

Figure 26:
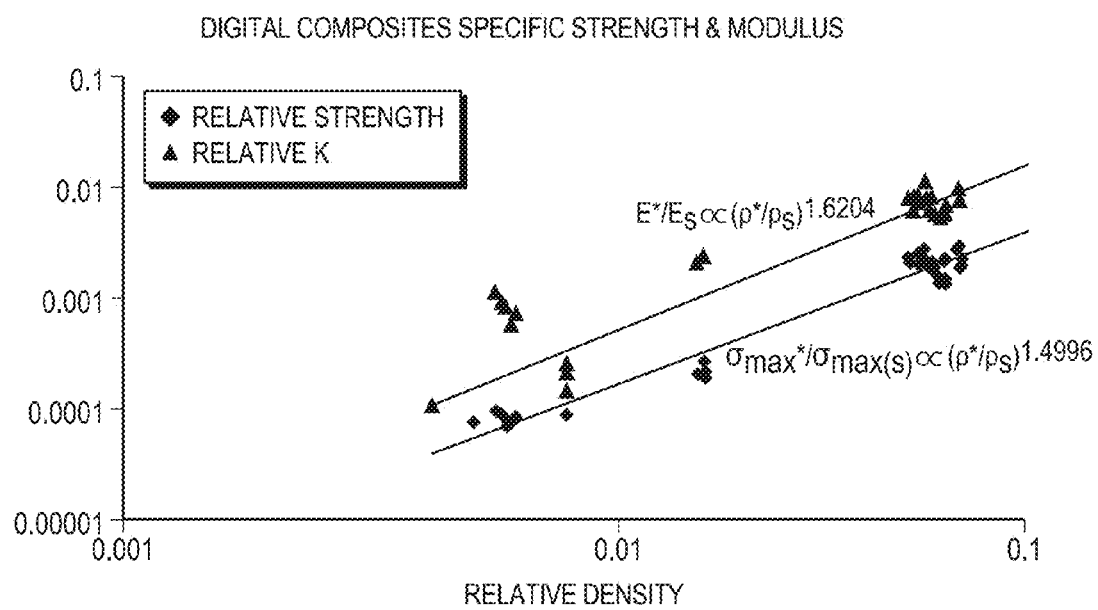
FIG. 26 is a graph of the relative strength and modulus of the digital composite samples.
Figure 27:
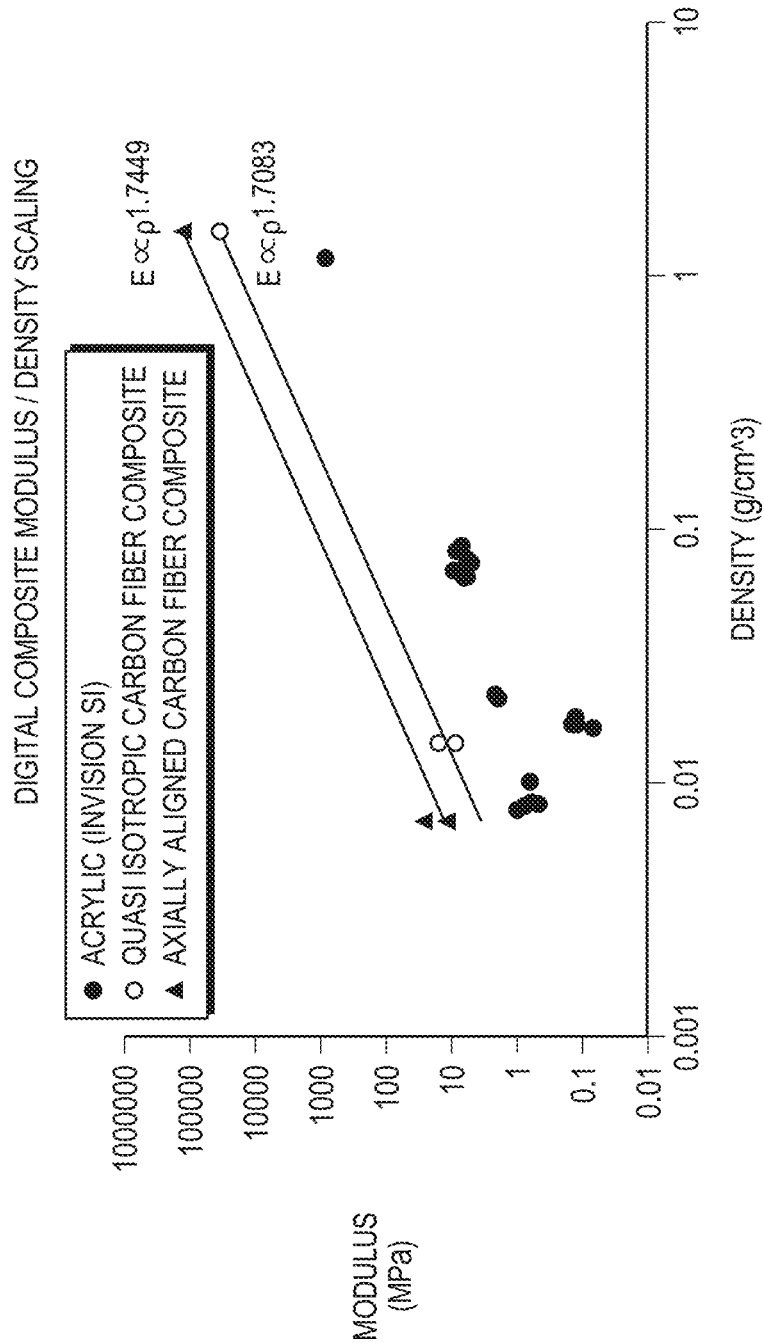
FIG. 27 is a graph depicting digital composite modulus scaling with density.

FIG. 26 is a graph of the relative material properties (strength and modulus) of the digital composite samples, and shows improved scaling for relative material properties, relative to other materials in this weight regime. Included in this graph are printed acrylic samples, which were taken from a computer model at arbitrary angles, and which show the isotropic behavior of the geometry. FIG. 27 is a graph depicting digital composite modulus scaling with density.

Since this case study was designed without connection release mechanisms, these digital composites behave in tension and compression as an elastic-superelastic-brittle cellular solid, with a pronounced non-linear elastic regime at higher strains. This is in comparison to a classical elastic brittle cellular solid, which displays linear elasticity followed by a brittle crushing plateau and densification [Gibson, L., & Ashby, M., Cellular Solids, Structure and Properties, Cambridge University Press., Cambridge, UK, 1988]. Densification of the test structures is irrelevant, given their sparseness. While there is a small periodic densification effect during the brittle crushing phase, a true analogy to densification does not occur until extremely high strains (>95%) are reached. Instead of having a linear elastic regime determined by cell edge bending and a collapse plateau associated with cell edge buckling failure, this material displays linear elasticity in compression that has a significant stretching component (in addition to cell edge bending), and an elastic plateau that is associated with elastic strut member buckling. This is similar to observations for periodic metallic cellular truss structures [Wadley, H. N. G., Fleck, N. A., & Evans, A. G., "Fabrication and structural performance of periodic cellular metal sandwich structures", Composites Science and Technology, vol. 63, pp. 2331-2343, 2003], but with the non-linear plastic regime of the metallic structures being supplanted by this elastic buckling.

In tension, linear elasticity again has a significant axial contribution. On the whole, this design behaves in tension in ways that are symmetrical to the way it behaves in compression, as an elastic-superelastic-brittle cellular solid. The tensile superelastic phase is marked by elastic buckling of interstitial strut members, which are placed in compression under tensile loading of most orientations of the lattice. The initial modulus and strengths are within measurement error across orientations, irrespective of these orientations. For these digital composite part types, the geometry initially results in simultaneous axial and transverse loading of elements that may be modeled as beams that are fixed on one end and guided on the other end; therefore, the joints are capable of transmitting a significant bending moment.

The present invention departs from the bulk of the cellular solids literature, which successfully models a wide range of observed cellular solids as pin jointed systems. It has been observed that biological fiber based mesh structures do not seem to obey even modern forms of the Maxwell rigidity criterion. This is recently explained by a mechanical model that assumes that the fibers behave in a manner that transmits significant bending moments across nodes in the structure [Broedersz, C. P., Mao, X., Lubensky, T. C. & MacKintosh, F. C., "Criticality and isostaticity in fibre networks", Nature Physics, vol. 7, pp. 983-988, 2011]. While the total explanation for this apparent violation of convention is still debated, considerable support is given by the relative magnitude of inter-molecular forces that are present in these biomaterials [Jacobs, D. J., Rader, A. J., Kuhn, L. A., & Thorpe, M. F., "Protein Flexibility Predictions Using Graph Theory", PROTEINS: Structure, Function, and Genetics, vol. 44, pp. 150-165, 2001]. The result is an addition to the typical two dominant phases of frameworks or trusses in mechanics—a stretch bend coupled phase, that is situated between the stretch dominated and bend dominated structures. If this is indeed the true explanation for the strength and stiffness of biomaterials, which exceed the expectation given by their topology, then it should be possible to produce this stretch bend coupled phase in macro-materials. Intrinsic to the design is the fact that for the eight strut members that meet at each node, four of them are actually part of a monolithic unit. A mechanical model was employed that considers this adjustment to the typical cellular solids analysis, noting that the axial and transverse loads on the strut member both contribute to the maximum bending moment [Timoshenko, S. P., & Gere, J. M., Theory of Elastic Stability, McGraw Hill, New York, 1961].

$$\delta = \delta_{axial} + \delta_{bending} \propto Fl/E_s t^2 + Fl^2/E_s I \propto Fl^2/E_s I \text{ (for low } \rho/\rho_s) \quad \text{Equation 30}$$

Where $\delta$=change in length $E$=modulus of elasticity of structure $E_s$=modulus of elasticity of constituent solid $\sigma = F/A_c$ $\epsilon = \delta/L_c$ for a cuboct structure, $A_c = 8l^2$, and $L_c = l\sqrt{2}/2$ for single beam ($A_c = 32l^2$, and $L_c = 4l\sqrt{2}$ for entire cell)    Equations 31 from which $E = \sigma/\epsilon$ gives an expected relative modulus of:

$E/E_s = (FL_c/A_c\delta)/E_s$ for a cuboct structure, $E/E_s = (1/(8\sqrt{2}))((F/l\delta)/E_s)$    Equations 32 thus, assume $E/E_s = C_g((F/l\delta)/E_s)$ and $$E/E_s = C_g((F/l\delta)/E_s \propto C_g \frac{F}{l(Fl/E_s t^2 + Fl^2/E_s I)E_s} \propto C_g\left(\frac{t^2}{l^2} + \frac{I}{l^3}\right) \quad \text{Equation 33}$$

assuming, from above, that $\rho/\rho_s \propto t^2/l^2$ and $I \propto t^4$, $$E/E_s \propto t^2/l^2 + t^4/l^3 \propto (\rho/\rho_s) + (t^2/l)(\rho/\rho_s) \propto (\rho/\rho_s) + (\rho/\rho_s)^n \propto (\rho/\rho_s)^n \quad \text{Equation 34}$$

where, given the assumptions of low relative density and high strut member aspect ratios, $$(\rho/\rho_s)^1 < (\rho/\rho_s)^n < (\rho/\rho_s)^{3/2} \quad \text{Equation 35}$$

Figure 28A:
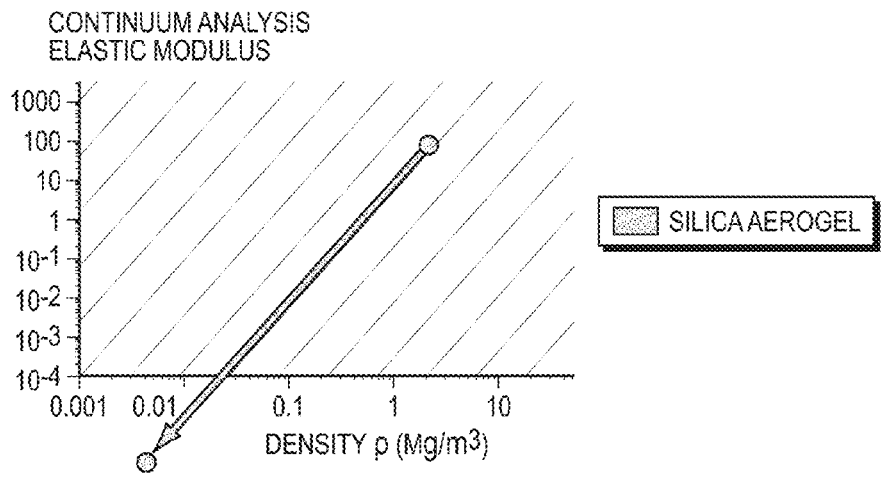
FIGS. 28A-B are graphs showing continuum analysis of elastic modulus vs. density for previously known ultra-light materials.
Figure 28B:
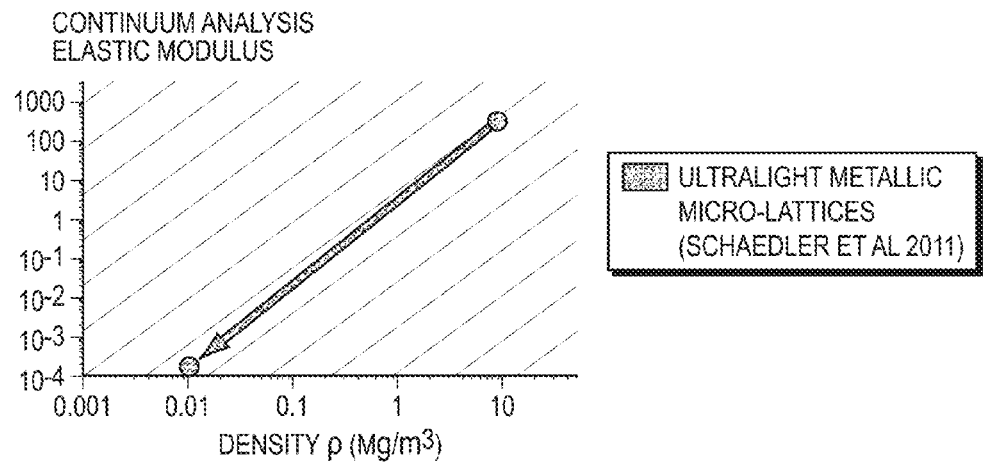
Figure 28C:
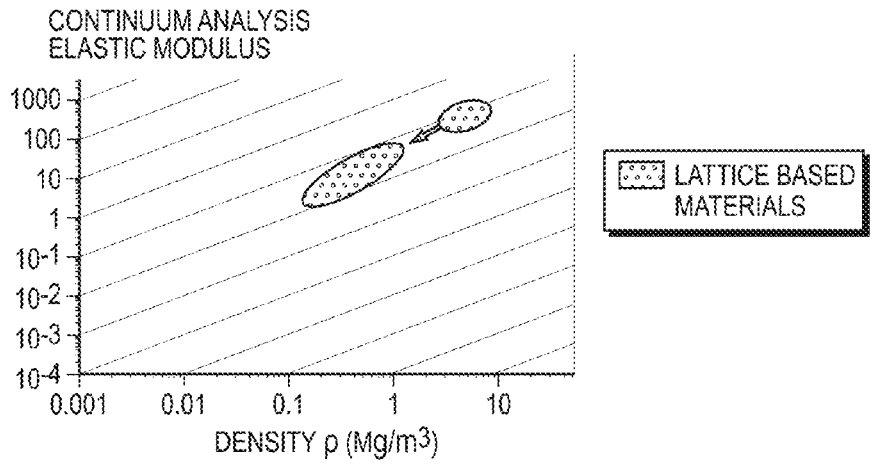
FIG. 28C is a graph showing continuum analysis of elastic modulus vs. density for previously known cellular materials with better than quadratic density modulus scaling properties.

Considering the ultra-light materials that are adjacent in density, considerable improvement is seen. For some time considered the lightest material, aerogels have a relatively poor stochastic structure that results in inverse cubic scaling of modulus with decreasing relative density. Simply achieving three orders of magnitude of reduction in density was an achievement at the time. More recently, materials have been reported (metallic microlattices, aerographite) that display inverse quadratic scaling of modulus with decreasing relative density. While this is standard for stochastic foams of all kinds (metal foams, polymer foams, etc.), the achievement, again, is related to the ability to achieve three orders of magnitude reduction in density. FIGS. 28A-B are graphs showing continuum analysis of elastic modulus vs. density for previously known ultra-light materials. FIG. 28C is a graph showing continuum analysis of elastic modulus vs. density for previously known cellular materials with better than quadratic density modulus scaling properties.

Figure 29:
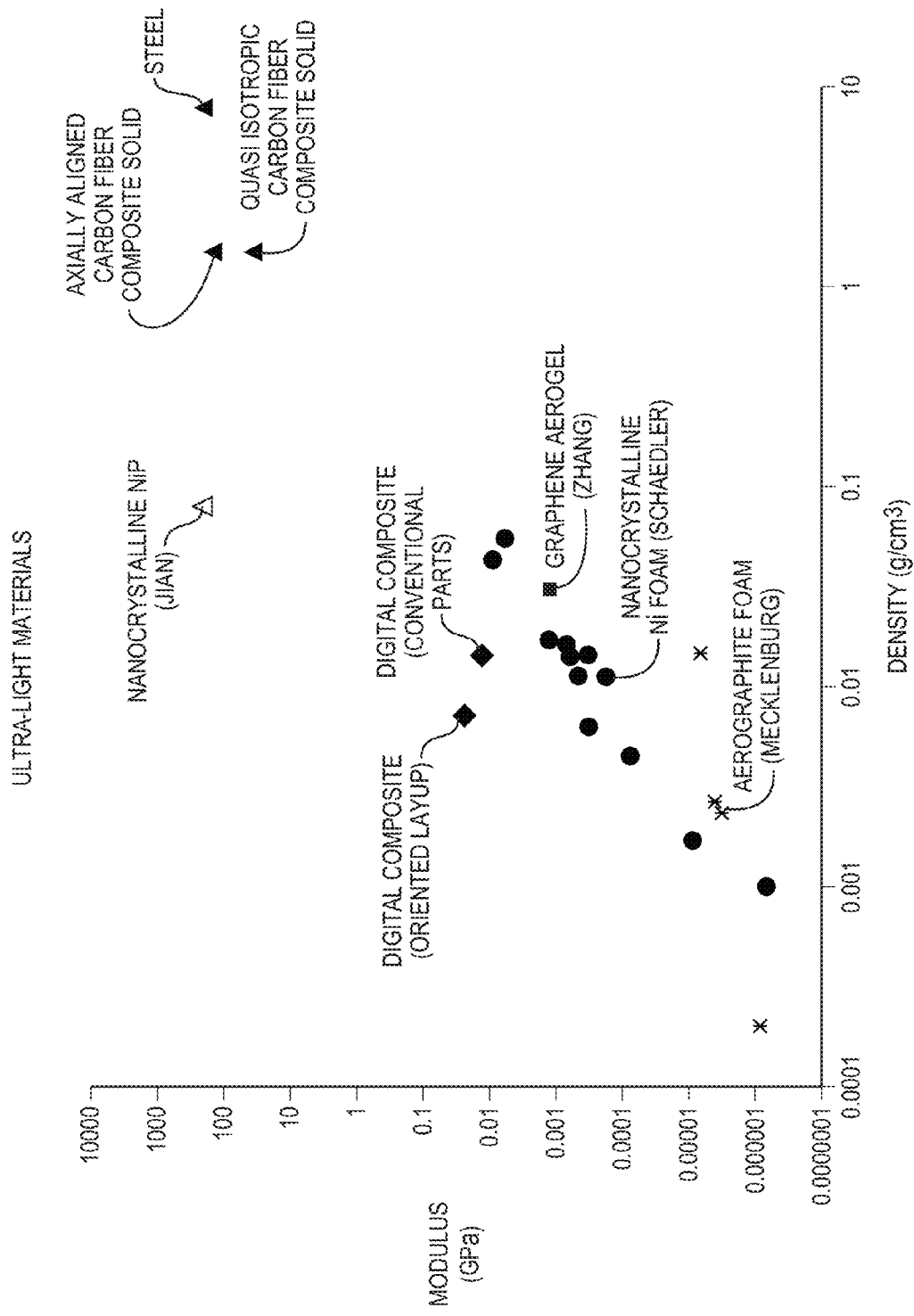
FIG. 29 is a graph depicting digital cellular composite material performance.

Near linear scaling of modulus with density has been reported in nonstochastic cellular solids for many years, but only with structures that span about one order of magnitude reduction in density, or less. These materials range from those that are effectively modeled as a solid with some holes in it [Gibson, L., & Ashby, M., Cellular Solids, Structure and Properties, Cambridge University Press., Cambridge, UK, 1988] to ordered periodic truss materials with strut member thickness to diameter ratios around or greater than 0.1 [Wallach, J. C., & Gibson, L. J., "Mechanical behavior of a three-dimensional truss material", International Journal of Solids and Structures, vol. 38, pp. 7181-7196, 2001]. The present digital composites, in contrast, show a three order of magnitude reduction in density, while maintaining better-than-inverse-quadratic scaling of modulus with relative density, and therefore access a new area of the materials property chart. FIG. 29 is a graph depicting digital cellular composite material performance, showing quadratic scaling from the ideal axially aligned carbon fiber composite solid.

One explanation for the prior lack of success in producing similarly strong and light structures from other materials that are near to the material properties of solid composites is the prevalence of "morphological quality" issues that are intrinsic to other production methods, such as casting [Evans, A. G., Hutchinson, J. W., & Ashby, M., "Cellular Metals", Solid State & Materials Science, vol. 3, pp. 288-303, 1998; Wadley, H., "Cellular Metals Manufacturing", Advanced Engineering Materials, vol. 4, no. 10, pp. 726-733, 2002], which results in an inability to produce ordered structures of very slender columns.

Figure 30:
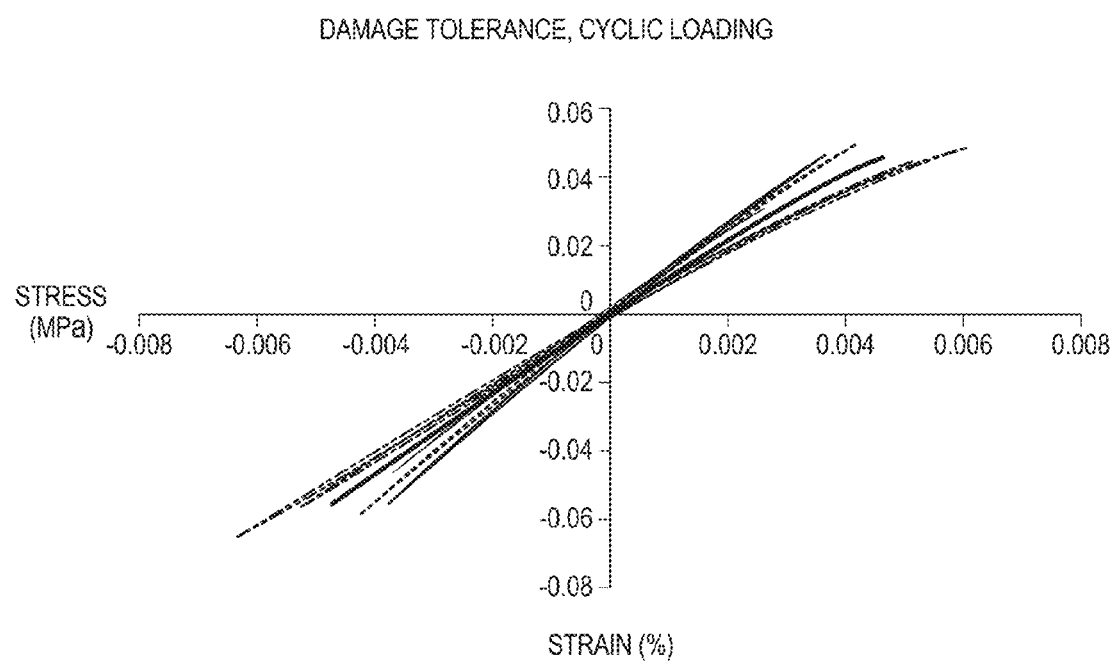
FIG. 30 is a graph of cyclic loading of a specimen, through overloading induced damage events.

A perceived disadvantage to using carbon fiber composites is its failure mode. Where many structural materials display a plastic yielding plateau that absorbs energy, carbon fiber composites are known to remain nearly linear elastic up to the point that they break. A consequence of this is that the breakage event involves the rapid elastic unloading of the broken parts, which can cause further damage to a superstructure, as well as present a significant additional safety hazard. Digital composites, in contrast, display relatively graceful degradation when overloaded, whereby incremental defects are accompanied by a gradually decrease in the modulus of the overall structure. FIG. 30 shows cyclic loading of the same specimen, through overloading induced damage events, showing gradual reduction in effective modulus. Failure modes include crack propagation, non-linear elasticity by elastic buckling, and brittle crushing.

It is expected that natural lattice features such as dislocations can be easily designed into digital material structures with results that are analogous to work hardening—modulus may be increased at a strength cost, by effectively producing internal preloading. With a scheme for self-detachment and reattachment of connections, this type of process can occur dynamically, but for now, it suffices to address static reconfiguration to achieve such states.

With progress in unmanned vehicle technology, experience has shown that rogue or poorly piloted vehicles represent a significant danger to people and property. This is particularly true of unmanned aerial vehicles, which pose a ballistic hazard to manned aircraft during normal operation. If civilian unmanned aerial vehicles are to become widely accepted, then they need to be constructed in a manner that can be qualified as presenting minimal danger when complete loss of control occurs. This is common practice at a different scale, for tempered glass in human transport applications, and possible through analogous mechanics in digital materials, whereby pre-stress introduced during assembly results in predisposition of the material to fracture in ways that span the entire structure.

Digital composites enable the design of aero-structures with precise failure modes, because of the tunability of the constituent elements. On the other extreme from the previously mentioned damage tolerance, a structure that is strong and light enough for flight can rapidly self-disassemble upon impact with another object. This may ideally manifest as bulk structure disintegration without exceeding the linear elastic limits of the individual parts (or certain parts in the assembly), and this is referred to here as digital elastic frangibility.

Many fields have applications that call for strong, light-weight, and precisely shaped surfaces. Many of these applications have turned to fiber reinforced polymer composite technology for the ability to tune the mechanical properties of the parts. This work proposes that the ability of fiber reinforced polymer composite digital materials to reconfigurably form tuned structures makes it a particularly efficient and functional prototyping and manufacturing tool for these applications. The nature of Digital Composites—as having designed anisotropic strength characteristics of individual part types—allows assemblies to be highly tunable in terms of their shape, density, and corresponding mechanical properties.

Reconfigurability. Cellular solids engineering has already enabled the use of materials with greater elasticity than previously commonly employed, most significantly with polymer foams. A result has been recent progress with both regular [Wang, L., Lau, J., Thomas, E., & Boyce, M. C. C., "Continuous Composite Materials for Stiffness, Strength, and Energy Dissipation", Advanced Materials, vol. 23, pp. 1524-1529, 2011] and irregular [Hiller, J., & Lipson, H., "Automatic Design and Manufacture of Soft Robots", IEEE Transactions on Robotics, vol. 28, no. 2, pp. 457-466, 2012] arrangements of discrete quantities of material throughout space, to simplify complex material design problems. While these examples both use dense analog 3d printing technologies (and are digitally designed), digitally assembled cellular solids can allow a greater range of properties for engineered structures, with cell sizes and strut member aspect ratios that are outside of what is practical with foams. A potentially interesting application for this is large scale lightweight high performing shape morphing structures.

Figure 31B:
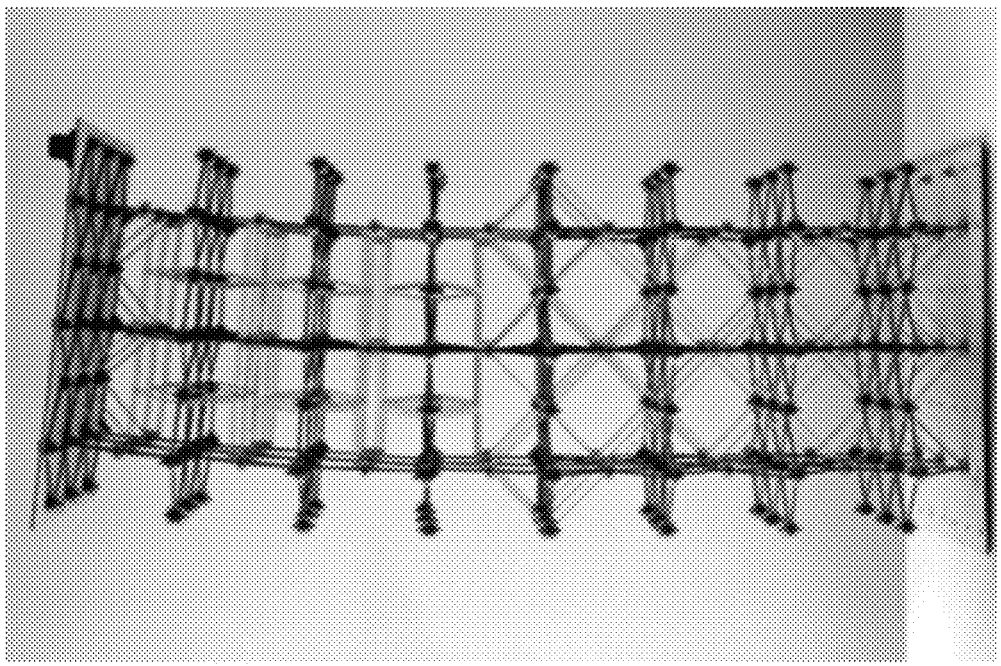
FIGS. 31A and 31B illustrate the tunable elasticity achievable in structures comprising digital flexural materials.
Figure 31A:
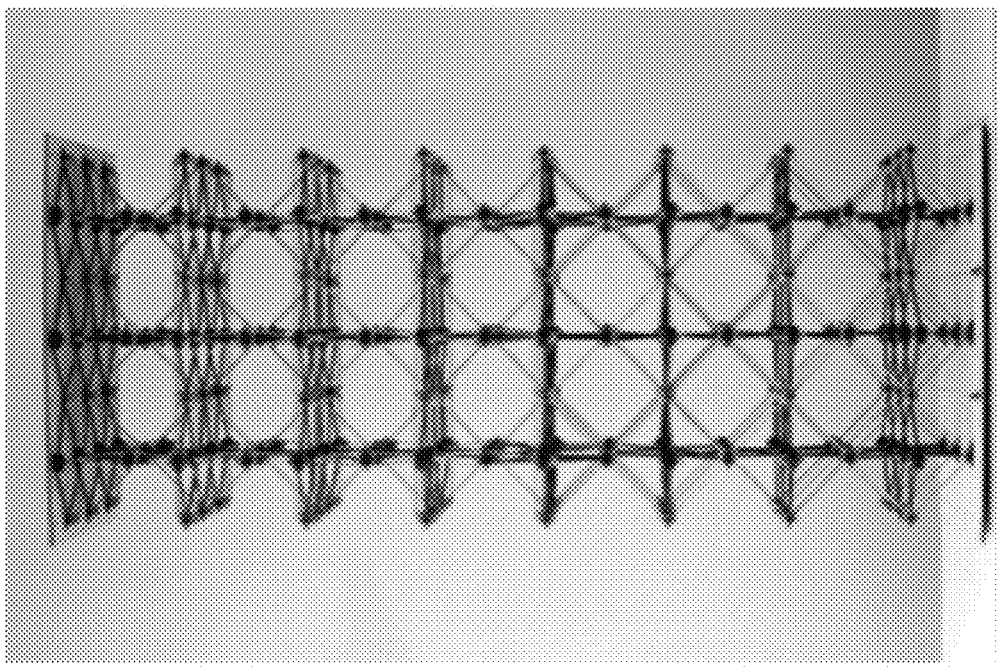

Continuously shape morphing structures have mostly focused on traditional kinematics, with flexural components accounting for continuous deformation and/or high density and high cost materials, such as piezoelectric ceramics, shape memory alloys, and electro-active polymers. This has limited the size, degrees of freedom, and manufacturability of shape morphing structures to date. Digital materials allow for the design of materials with many small and inexpensive actuators that combine to deliver large displacements with large forces, and/or tunable elastic phases in a lattice geometry that allows for deformation with simple large scale actuation and low actuator degrees of freedom. FIGS. 31A-B visually illustrate the tunable elasticity achievable with such a structure.

Figure 32B:
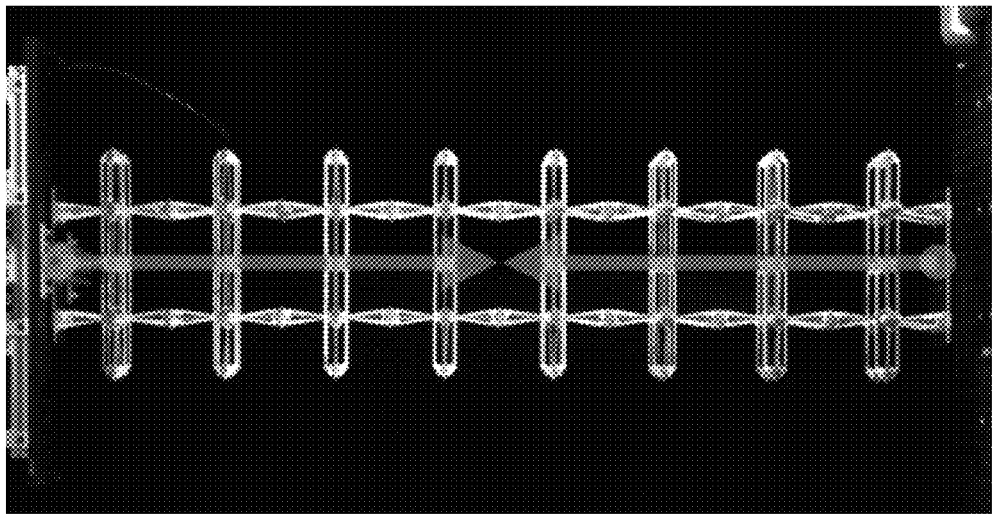
FIGS. 32A and 32B are photographs of a test digital composite column assembly in profile, showing the loading scheme (FIG. 32B)
Figure 32A:
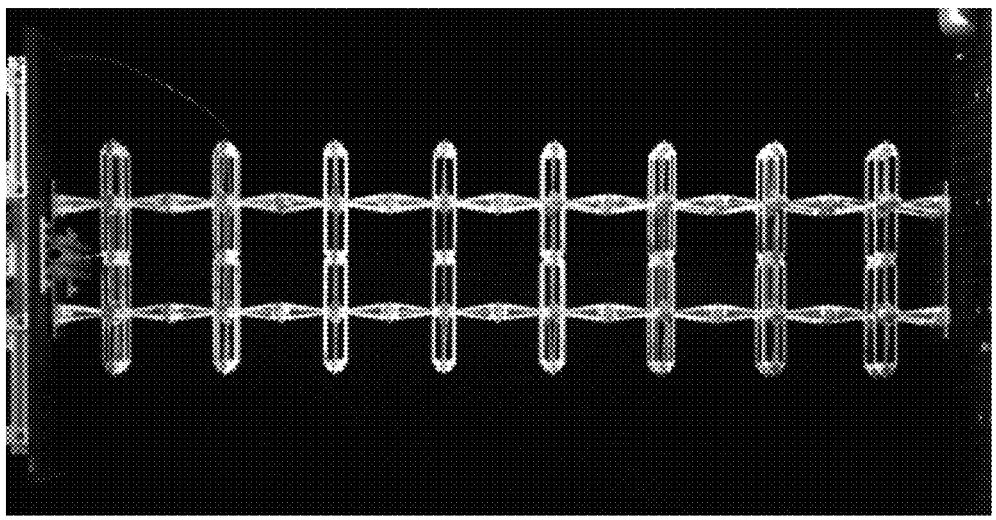
Figure 33B:
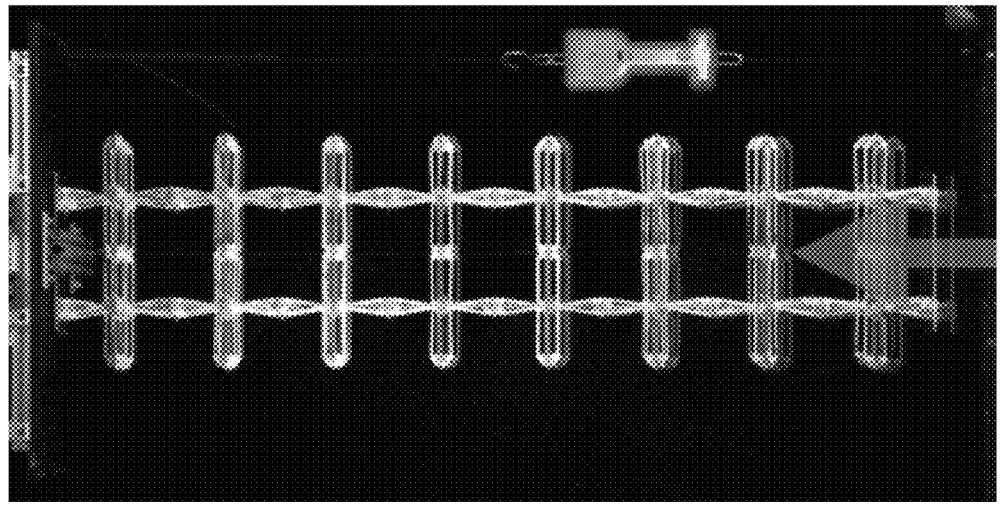
FIGS. 33A and 33B depict a simulation and photograph, respectively, showing pure axial compression in the test digital composite column assembly of FIGS. 32A-B.
Figure 33A:
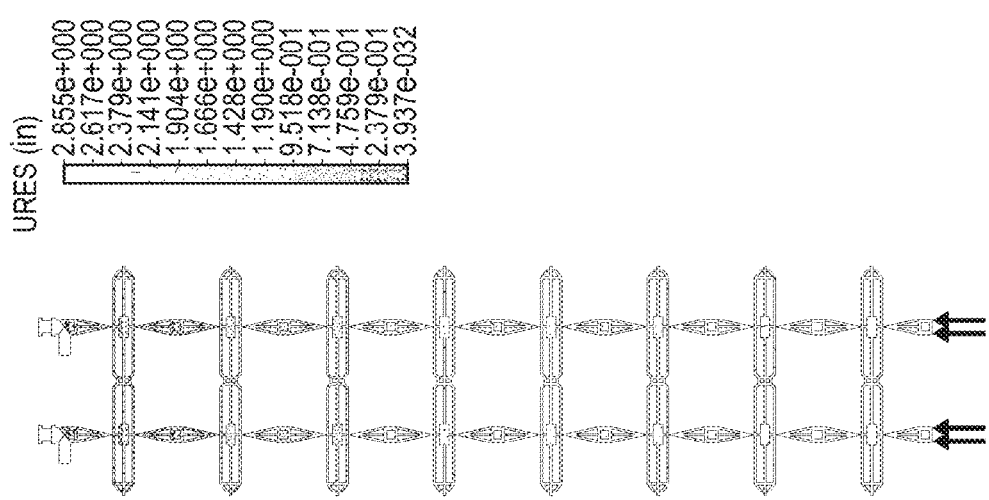
Figure 34B:
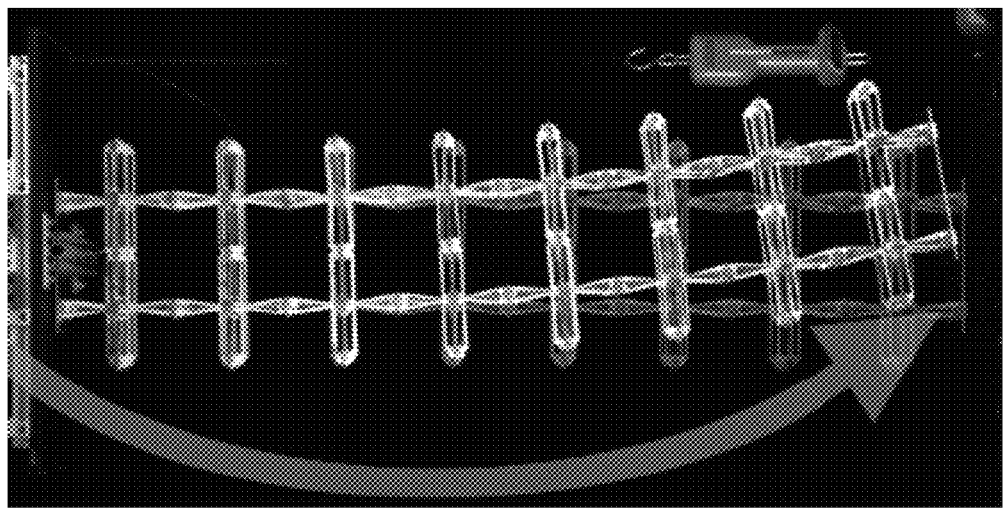
FIGS. 34A and 34B depict a simulation and photograph, respectively, showing simple Euler buckling in the test digital composite column assembly of FIGS. 32A-B.
Figure 34A:
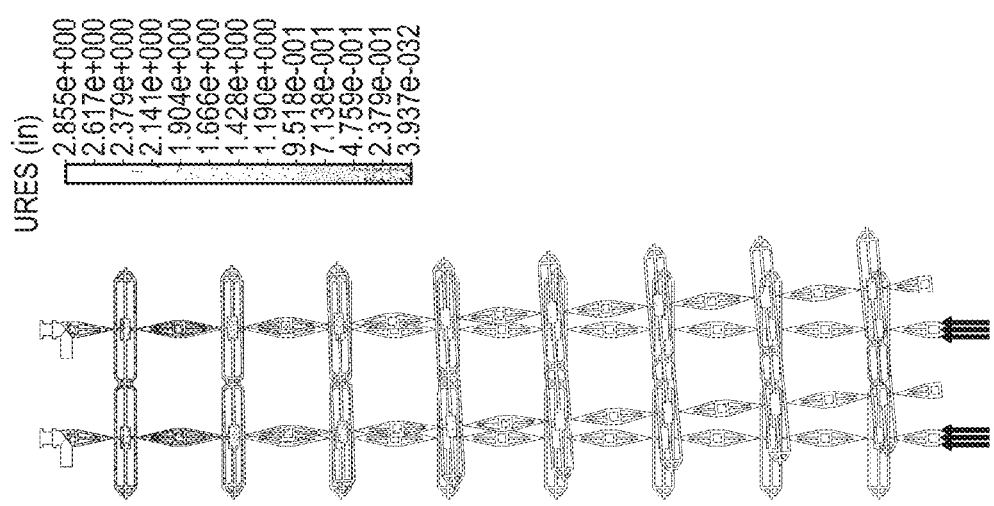
Figure 35B:
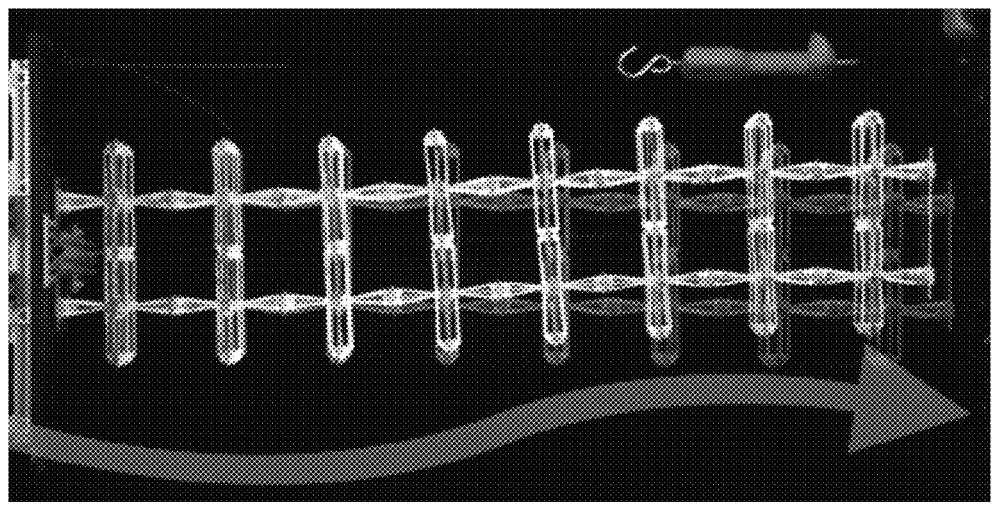
FIGS. 35A and 35B depict a simulation and photograph, respectively, showing complex buckling in the test digital composite column assembly of FIGS. 32A-B.
Figure 35A:
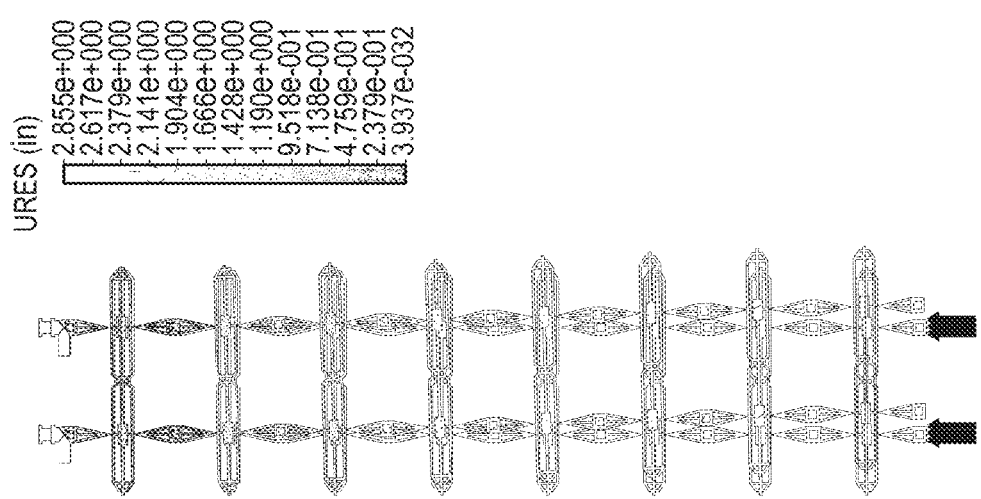

The example depicted in FIGS. 32A-B, 33A-B, 34A-B, and 35A-B illustrates this programmability of deformation modes in a Digital Cellular Solid. Using identical quantities of two part types, these structures differ only by the spatial arrangement of these parts. FIGS. 32A-B are photographs of the test digital composite column assembly in profile, showing the loading scheme. Under identical constraints and loading conditions (provided by a cable running through the center of the structure), pure axial compression is seen in the simulation (FIG. 33A) and actual experiment (FIG. 33B) of FIGS. 33A-B, simple Euler buckling (biased to occur on a single axis) is seen in the simulation (FIG. 34A) and actual experiment (FIG. 34B) of FIGS. 34A-B, and complex buckling is seen in the simulation (FIG. 35A) and actual experiment (FIG. 35B) of FIGS. 35A-B.

A potential application of this is shape morphing structures. Variable geometry mechanisms have been employed in many fields including structural and vehicle (sea, air, or land) design. The purpose is often to adapt to varying environmental physical conditions (such as which result from differences in sunlight and temperature or differences in airspeed), and the devices themselves are typically active and have been implemented with extrinsic control and actuation. Digital materials allow for structures with similar changes in geometry by design, but which occur as passive responses to changes in environmental condition.

Figure 36A:
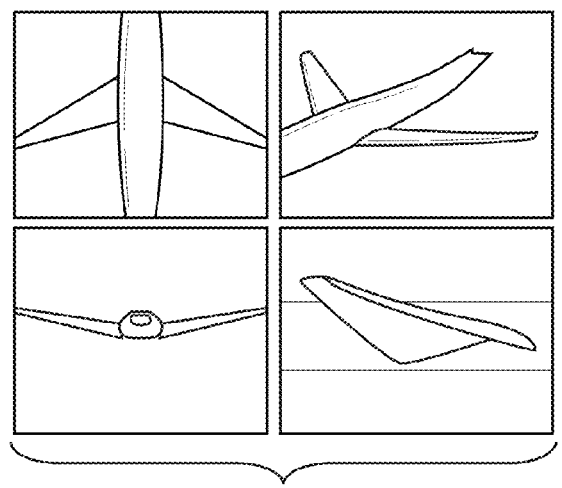
FIGS. 36A-C graphically depict exemplary wing shape morphing schemes (high lift, FIG. 36A; cruise, FIG. 36B; control/flap, FIG. 36C) for different aerodynamic regimes.
Figure 36B:
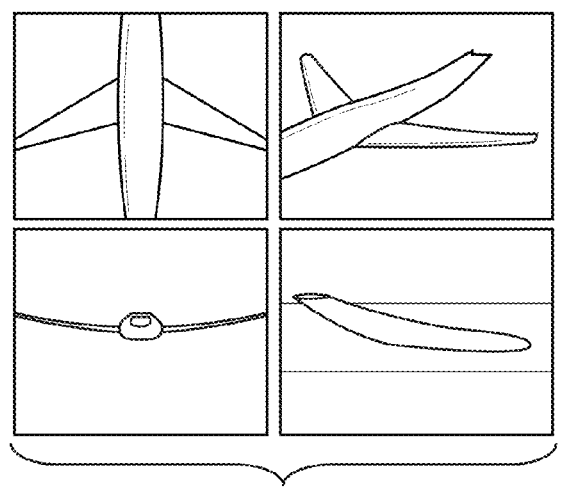
Figure 36C:
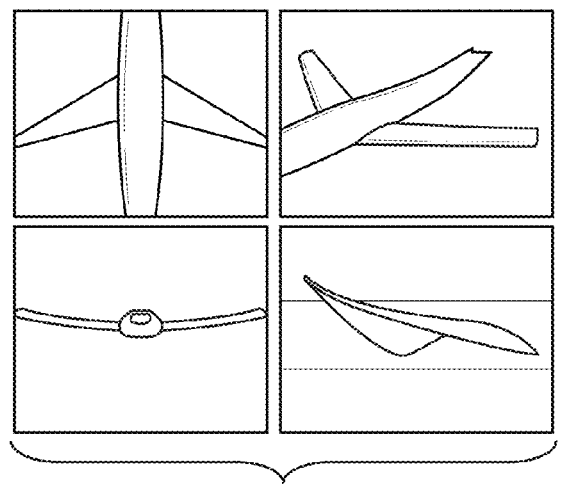
Figure 37B:
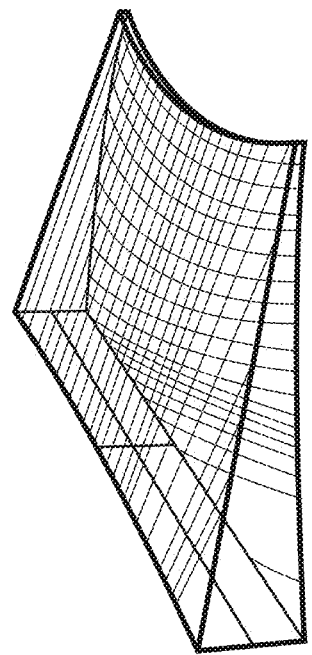
FIGS. 37A-D are top, perspective, side, and end views, respectively, of an exemplary conventional aircraft wing structure having a volume that contains static metal spar-and-ribs structure with composite skin panels containing honeycomb filler.
Figure 37D:
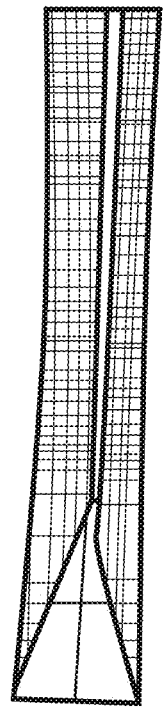
Figure 37A:
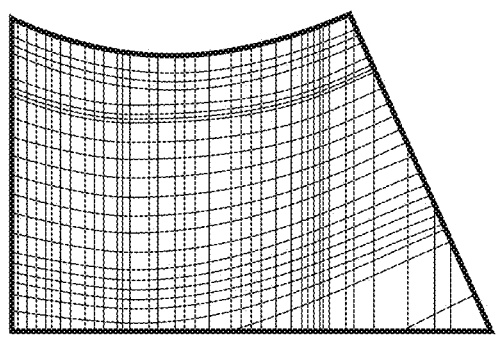
Figure 37C:
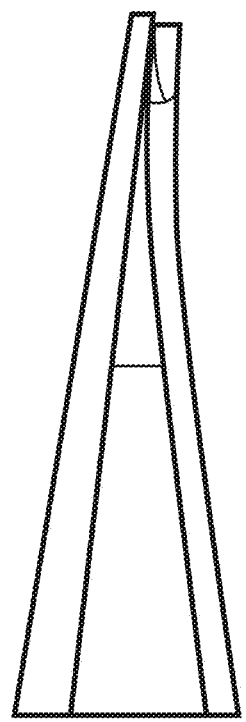
Figure 38A:
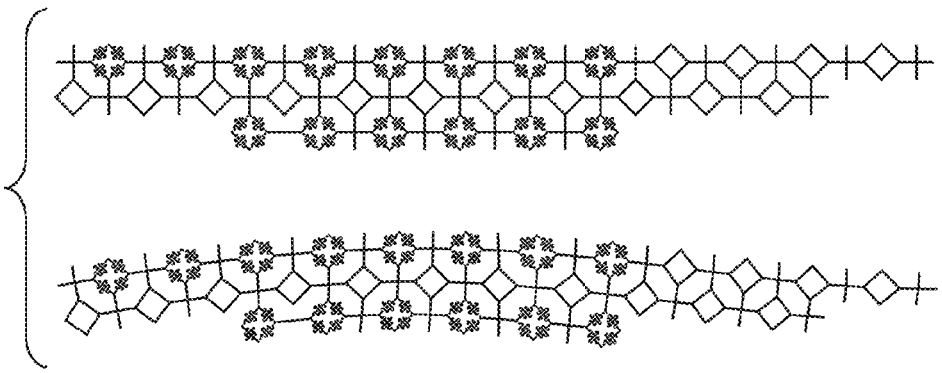
FIGS. 38A-B are top and perspective views, respectively of the digital parts in assembled configuration used for a model of an exemplary digital flexural material aircraft wing structure.
Figure 38B:
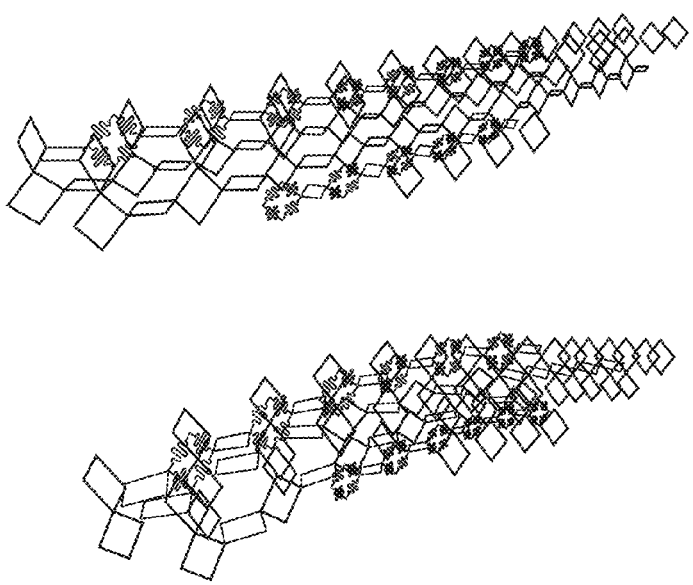
Figure 39B:
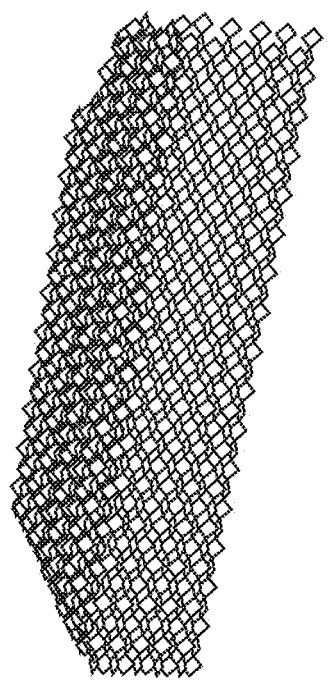
FIGS. 39A-D are top, perspective, side, and end views, respectively, of a model of the exemplary digital flexural material aircraft wing structure, depicting automated inclusive filling of the envelope with a digital composite system.
Figure 39D:
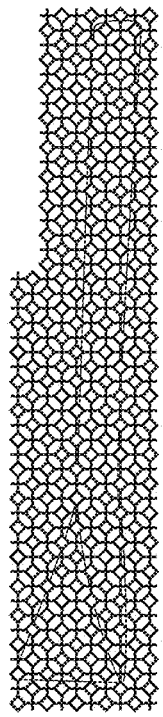
Figure 39A:
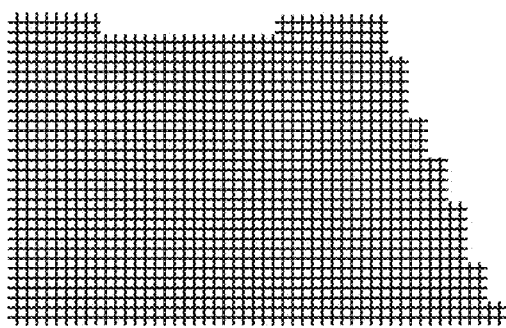
Figure 39C:
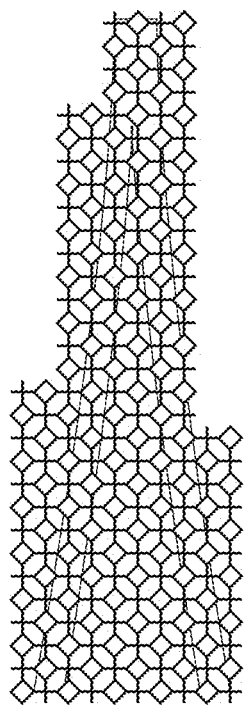

Utilization of this principle dates as far back as the beginning of engineered flight [Wolko, H. S., The Wright Flyer, An Engineering Perspective, Smothsonian Books, Washington, D.C., 1987]. There are many current engineering examples of aircraft that employ actuated structures that change many aspects of wing shape (effective airfoil camber, chord, thickness, angle of incidence, sweep, etc.) specifically because idealized wings for low speed (where the need to achieve high lift provides significant constraint) applications are very different in shape to idealized wings for high speed (where drag, controls, and structural stress provide significant constraint) applications. Since aircraft need to pass through low speed and high lift regimes on their way to and from high speed cruise conditions, it is natural for an engineering design goal to include good performance under both conditions. Current solutions rely on control and actuation systems that are extrinsic to the primary aircraft structure. Digital Composites can present a solution that accomplishes a tuned global deformation with a single degree of freedom tendon actuator that spans the chord-wise direction of the airfoil. FIGS. 36A-C graphically depict several exemplary wing shape morphing schemes (high lift, FIG. 36A; cruise, FIG. 36B, control/flap, FIG. 36C) for different aerodynamic regimes.

Digital cellular airfoil application. This structure is designed to bend elastically as a variable camber airfoil, and is composed of two part types, similarly to the previous column buckling example. The leading edge area of the structure retains the highest compliance for the bending axis, which results in the most curvature; the mid-section retains intermediate compliance (again, for the bending axis), and the trailing edge maintains a relatively flat surface, as it includes none of the high compliance part type. Wind tunnel testing provided performance figures for lift per airspeed, and qualitative assessment of the stiffness of the system.

The goal of these materials is to efficiency distribute loads across structures. For applications such as transport, this requires the ability to transmit loads to the external environment, in order to achieve a net force vector in the desired direction of travel. A method of interfacing between the periodic digital structure and the outside environment provides two important capabilities. If the characteristic length scale of variation in the application load map is less than the digital material cell size, then this allows for local distribution of loads onto the structure, via a cellular skin. If there are peaks in the application load map that exceed the design limits of small areas of the structure, then effective smoothing of this load map can be accomplished with a skin design whereby cells also distribute loads onto neighboring cells. An extreme limit of such a digital cellular skin is essentially a digital composite in surface form, with tunable response to hoop stress, but the focus here is on the more basic architecture, where each interface or skin cell is responsible for transferring load only to the underlying lattice unit that it is attached to.

At this stage, a specific subject was studied. Feedback from collaborators in the commercial aero-structures industry has pointed to the potential for benefits in prototyping, manufacturing, and maintenance costs for aero-structures based on the idea of doing fabrication by discrete addition, subtraction, and sorting. One of the first application of the invention was therefore an aircraft wing wedge. The digital flexural material was designed to replace the interior structure of the wing wedge, and ultimately any aircraft load bearing interior structure.

Conventional aircraft wing structural designs and qualification test specifications were obtained for the purpose of this study. An example substructure is shown FIGS. 37A-D, which shows a volume that contains static metal spar-and-ribs structure with composite skin panels containing honeycomb filler. Buckling is mitigated by providing a stiff but lightweight material core connected to an exterior skin which performs aerodynamically. The skin may or may not be load bearing depending on loading requirements. Aircraft core construction is analogous an I beam, with the skin of a core functioning the same way the top and bottom flange would on a beam, and the inner core in a sandwich similar to the web of a beam.

The test part was a bulk volume of digital composites, similar to the examples shown in FIGS. 38A-B and 39A-D, completed with a skin. At very high resolutions for a given structure, digital materials can form apparently continuous shapes. Additionally, hierarchically scaled part types can allow for adjusting of resolution as necessary (FIGS. 2A-E).

Replacing just the honeycomb was identified as an early and simple opportunity—it is good in compression and shear, but poor in bending, torsion, and maintenance under typical environmental conditions (water infiltration and retention is a major problem). The problems with it are enough for the industry to identify it as a "pain point." FIGS. 39A-D depict automated inclusive filling of the envelope with a digital composite system (Digital Composite type A).

The interior of the wing wedge is designed as a cellular solid, a repetitive lattice with standard elongated shapes which interlock with a reversible insert in each joint, to allow for easy assembly and disassembly for ultimate reusability, recyclability and repairability. Another objective was to design a hierarchical geometric space filling shape, such that it would be scalable to allow for greater surface resolution of the final structure. If not scalable, there could also be different variations of the initial part geometry, such as half shapes or quarter shapes of the original. Also, the parts had to be milled out of fat sheets of material utilizing subtractive fabrication methods to allow for quick, easy and greater control over the fabrication process. Finally, the goal was to create an isotropic structure, such that the properties of the geometry and material would be the same in every direction of the bulk material. The ultimate goal was to create a lightweight and highly porous structure for a wing with a stiff cross-sectional core analogous to spars in a wing or fuselage.

The first step involved a series of design studies for a proof of concept lattice structure to fill three dimensional space. In two dimensions, there are five different lattice configurations: square, hexagonal, parallelogrammic, rectangular and rhombic. In three dimensions, there are 14 different lattice shapes, commonly referred to as Bravais lattices. The design typically begins by choosing a lattice type and then proceeds with a geometry which repeats across the entire lattice in all directions.

Design strategy 1 is a space-filling polyhedron also known as a tetrahedron. It is hierarchical and scalable because it features three different tetrahedron sizes. The disadvantage with this proof of concept lies in the weak connections between adjacent interlocked 2D parts. Each 2D geometry meets at a plate connection, and the plates hold in compression while the diagonal members serve to hold in tension. The connection between the diagonal members and plates requires a better strategy for stiffening the joints. Design strategy 2 is a space filling geometry based on a body centered lattice with t shaped members. This strategy does not fulfill a hierarchical system in the sense that the model only features half shapes of the original. The strategy needs to incorporate three or more different sizes of the same component scaled up with the same connections. Structurally, the system relies on stiff joints acting in tension and compression. This strategy demonstrates the greatest potential because of its joining system, and the next iteration would feature snap-fit or press-fit joints for a stronger connection. Design strategy 3 is a space filling geometry that fulfills the hierarchical requirement but works as an anisotropic structure which fails the requirement of isotropy. Furthermore, the joining system relies on press-fit joints that are weak and direction dependent. Since strategy 2 demonstrated the greatest potential, it was further developed in the next phase of design and fabrication of the wing.

Figure 40:
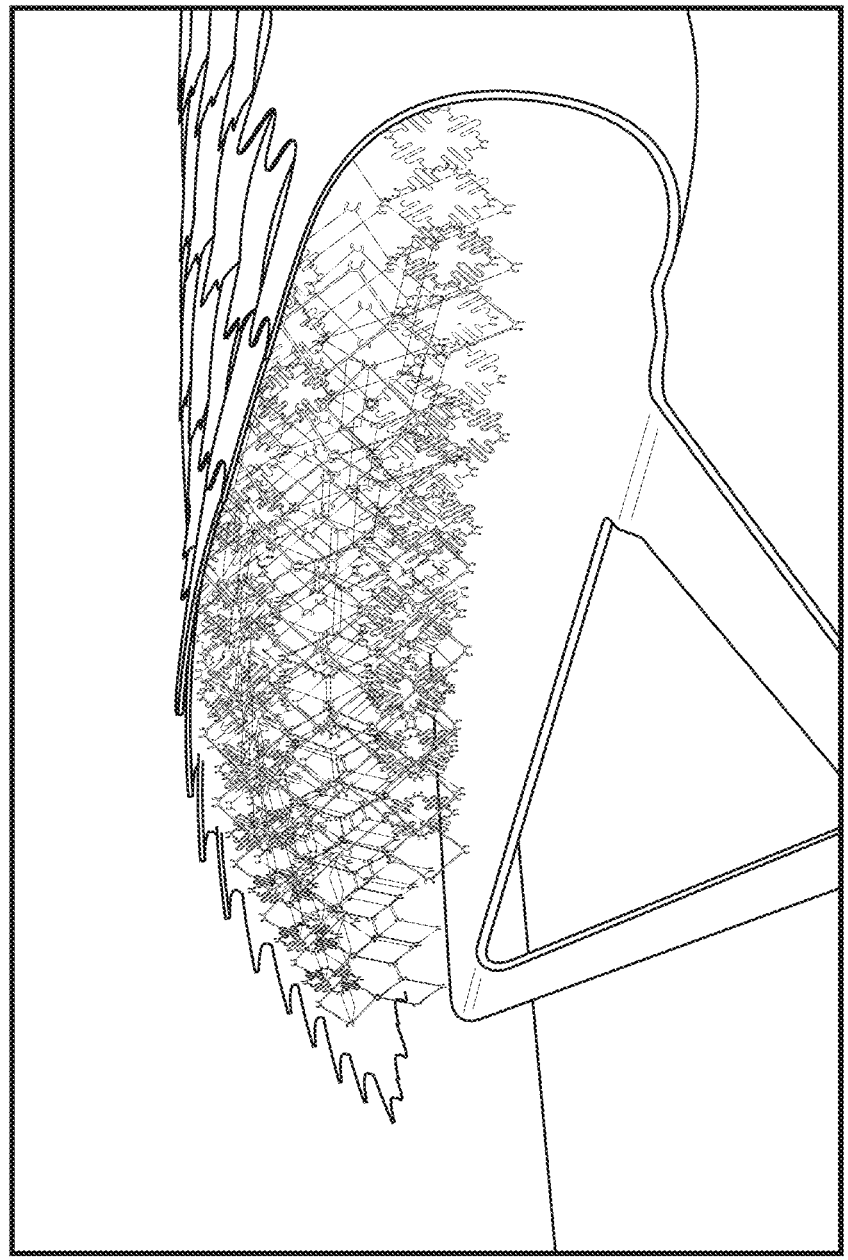
FIG. 40 depicts a prototype digital cellular airfoil according to one aspect of the present invention.

The next phase of the wing wedge prototype is made of 12"×24" laminated sheets of carbon fiber composites. Earlier test pieces of the laminated sheets used a 500 W laser cutter, along with several experiments on a shopbot and a waterjet. The shopbot shows the most potential, when used with a $\frac{1}{32}$" diamond carbide end mill. Although the shopbot creates the best cuts, it also required a lot of time to change endmills, especially since the endmills are prone to break after two or less pieces are milled. The laser cutter was eventually the machine selected because of rapid part production. Over a 1000 pieces of the digital material shapes were lasercut in 6 days and assembled by hand in 4 days. FIG. 40 depicts a prototype digital cellular airfoil according to this method.

Figure 41:
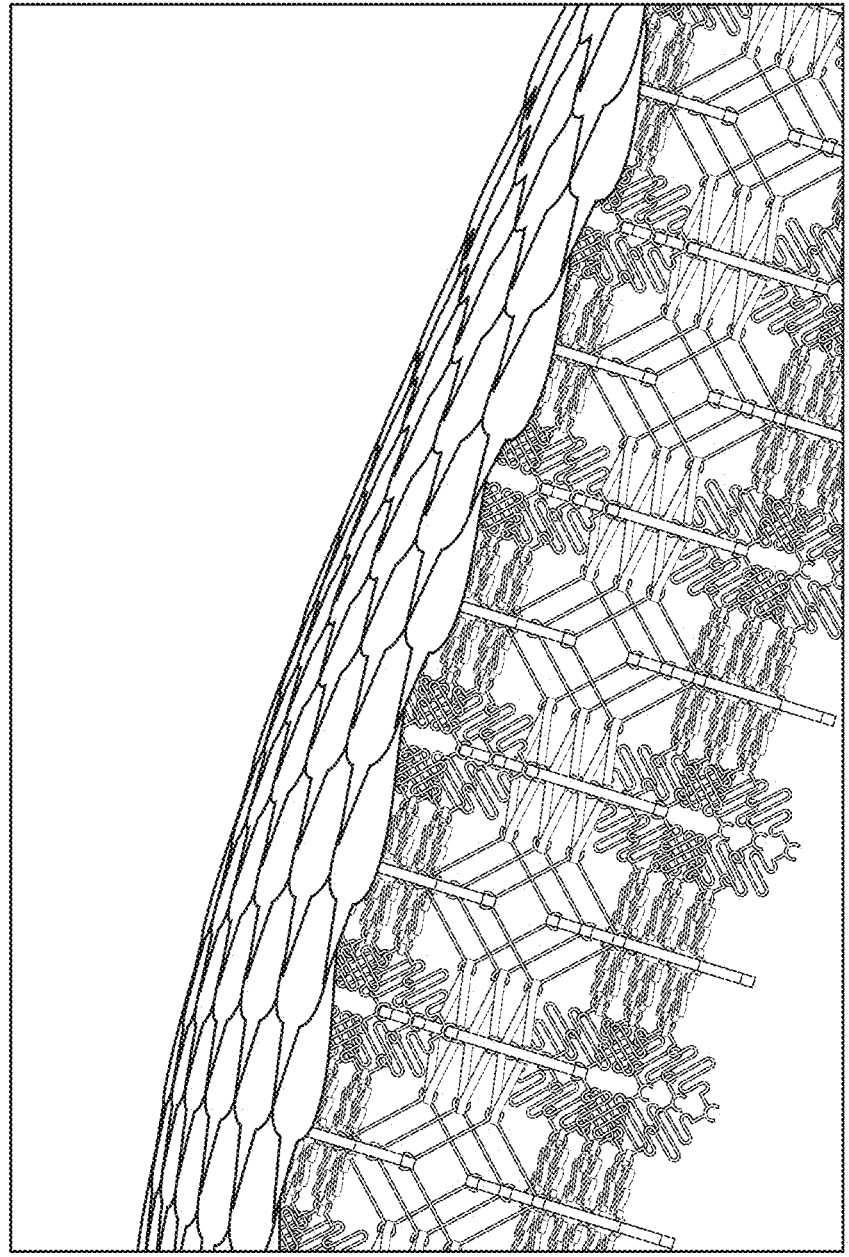
FIG. 41 is a magnified view of the wing of FIG. 40, depicting the interface between structure and airstream provided by cellular skin for the prototype digital cellular airfoil of FIG. 40.

Skins (two-dimensional digital cellular materials). The skin is discretized two-dimensional digital cellular material, similar to scales or feathers, and is free to conform to the changeable shape of the structure. Each skin cell is only required to carry the aerodynamic loads of a parcel of the surface, according to the pitch of the supporting digital composite. In this example, there is some minor structural coupling between skin cells, which allows for smoothing of the surface. FIG. 41 is a magnified view of the wing of FIG. 40, depicting the interface between structure and airstream provided by the cellular skin for the prototype digital cellular airfoil of FIG. 40.

Figure 42A:
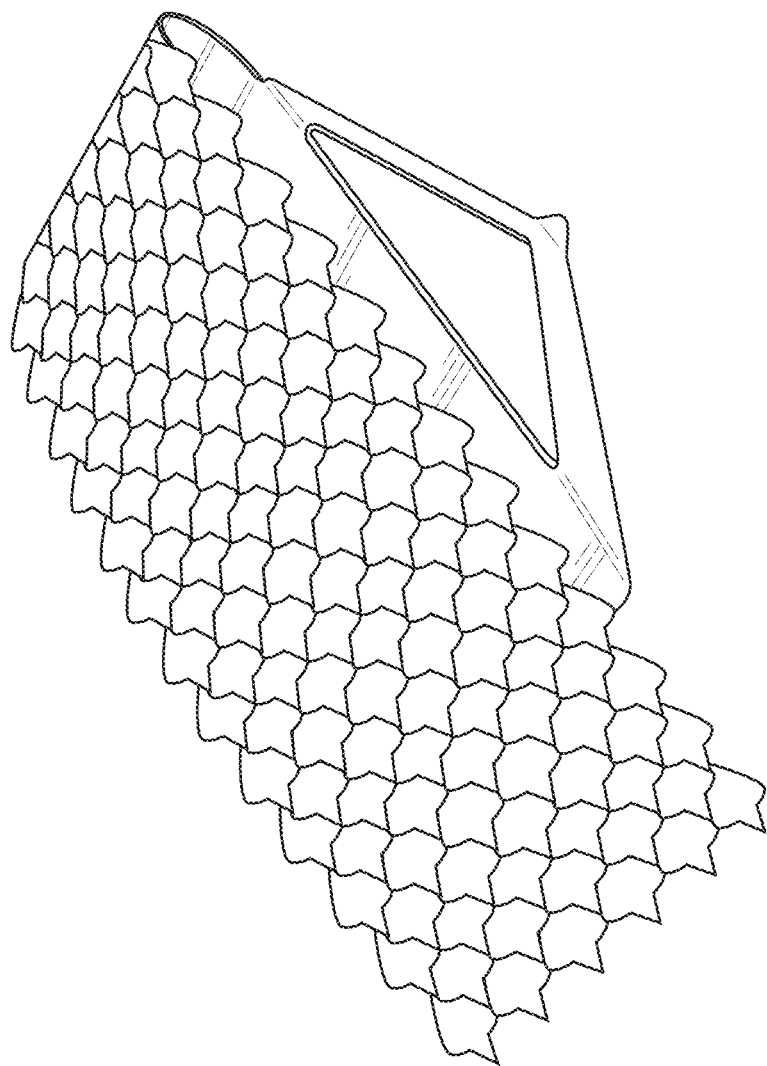
FIG. 42A is a top view of the prototype digital cellular airfoil of FIGS. 40 and 41.
Figure 42B:
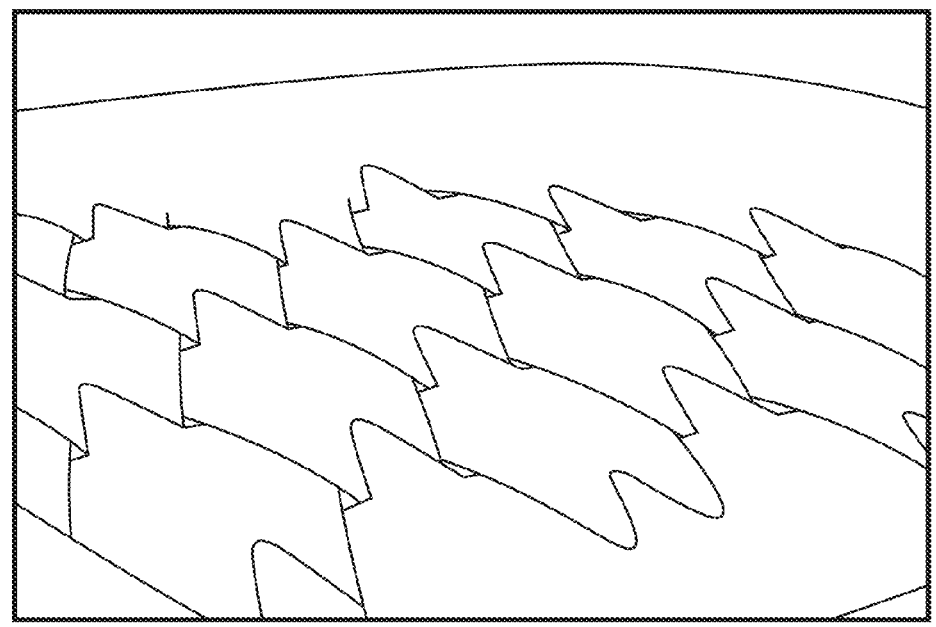
FIG. 42B is a magnified top view of the prototype digital cellular airfoil of FIGS. 40, 41, and 42A.

The skin cells are tessellated overlapping units, each with a single attachment to the digital composite structure underneath. Since overall shape is controlled by the structure underneath, this skin handles negligible hoop stress, and primarily serves to transmit normal stress—so, it allows for free deformation of the surface within the plane of the surface. There are some details that need to be worked out, in order to make it able to maintain a proper pressure gradient for a given aerodynamic regime, and reduce tile-tile friction, but it performed well in the wind tunnel (lift characteristics showed that it worked as an airfoil; could maintain boundary layer attachment at high speed and angles of attack). FIG. 42A is a top view of the prototype digital cellular airfoil of FIGS. 40 and 41. FIG. 42B is a magnified top view of the prototype digital cellular airfoil of FIGS. 40 and 41.

Figure 43:
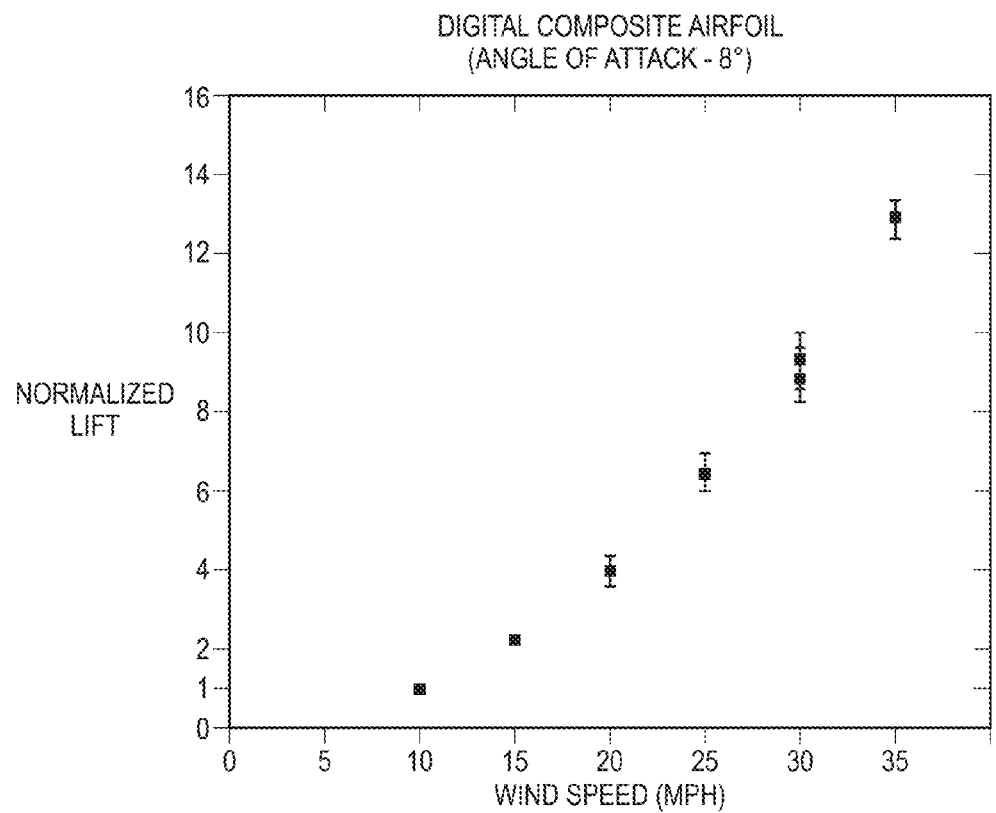
FIG. 43 is a graph of normalized lift vs. wind speed for the prototype digital cellular airfoil of FIGS. 40-42.
Figure 44G:
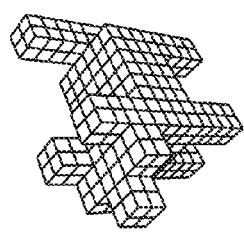
FIG. 44 graphically depicts an exemplary 1d→3d workflow with potential applications to digital composite assembly, according to one aspect of the present invention.
Figure 44F:
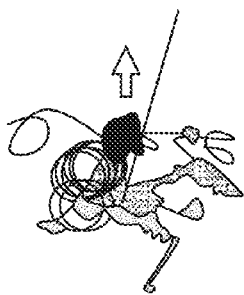
Figure 44E:
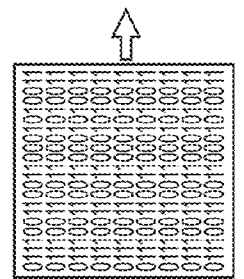
Figure 44D:
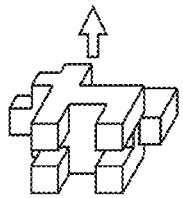
Figure 44C:
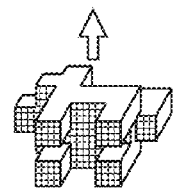
Figure 44B:
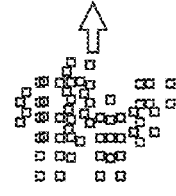
Figure 44A:
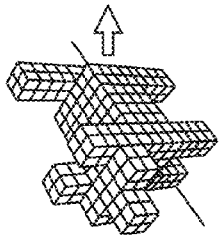

The underlying structure has a two inch cell pitch, and the skin cells are produced from material that is 0.01" thick, constrained to a shape that is curved about the stream-wise axis with a 0.04" variation from the highest to lowest point, relative to the smooth convex hull of the underlying structure. Boundary layer attachment was sustained to twelve degrees angle of attack at thirty five miles per hour. This was the highest angle of attack and highest speed that was tested. FIG. 43 is a graph of normalized lift vs. wind speed for the prototype digital cellular airfoil of FIGS. 40-42.

Self-Assembly. For assembly process, Digital Materials may be classified by spatial dimension of the assembly process. One dimensional systems, or "Digital Strings," have been demonstrated for the purpose of programming actuated shape, and presents a simple coded strategy for the design of digital assembly processes ("Programmable Matter") for two and three dimensional structures [Cheung, K. C., Demaine, E. D., Bachrach, J. R., and Griffith, S., "Programmable Assembly With Universally Foldable Strings (Moteins)", IEEE Transactions on Robotics, vol. 27, no. 4, pp. 718-729, 2011]. This led to the question of the mechanical properties of completed assemblies. FIG. 44 graphically depicts an exemplary 1d→3d workflow with potential applications to digital composite assembly.

The one-dimensional mechanical properties of this kind of digital material system in string form is trivial to consider. While some work has been done to analyze and predict the stiffness of folded string structures without strong cross-linking [White, P. J., Revzen, S., Thorne, C. E., and Yim, M., "A general stiffness model for programmable matter and modular robotic structures", Robotica, vol. 29, pp. 103-121, 2011], generalized usefulness of these systems is generally founded upon the assumption of the string taking on a three dimensional strongly interconnected state.

Figure 45:
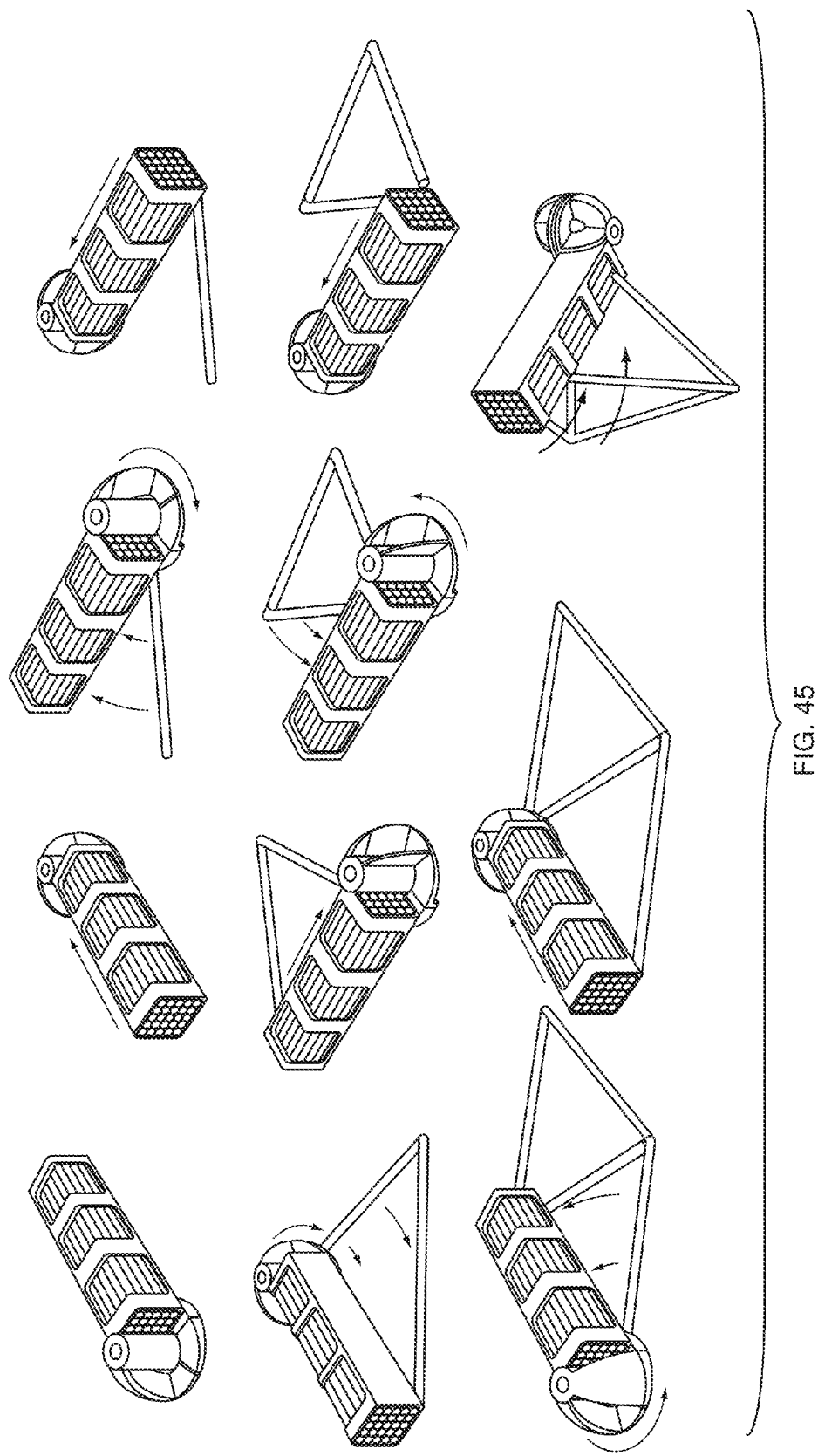
FIG. 45 graphically depicts an exemplary one-dimensional workflow for framework construction.

The ability of the string or surface to reach smooth topologies in three-dimensional space may be enabled by explicit degrees of freedom, and may permit the formation of non-Euclidean, non-developable surface forms, such as spherical or hyperbolic shells with programmable porosity. Generally, the topology of a digital material assembly may therefore be any surface or volume meshing, with arbitrary node connectivity, as necessary to achieve a specified range of configurations. Regardless of the geometric system, it is useful to automate the description and assembly process. For instance, for digital surfaces, decomposition of any surface as an assemblage of planes, geodesic, and hyperbolic surfaces that can be approximated by the system can be calculated based on the curvature map of the form, and the degrees of freedom inherent in the component design. It is apparent that both one- and two-dimensional systems can be developed to form three-dimensional interconnected assemblies. FIG. 45 graphically depicts an exemplary one-dimensional workflow for framework construction.

Digital Cellular Solids are cellular solids that exhibit improvements in relative stiffness and strength compared to relative density, over current practices for producing lightweight materials. This is accomplished by assembling lattice geometries that perform better than any that it is known how to make with traditional methods. When implemented with fiber composites, the result is not only stiffer and stronger than any previously known ultra-light material, but it presents a new scalable and flexible workflow for applying fiber composites to engineering problems—in particular, those that might benefit from tuned elastic deformation.

The science of cellular solids has enabled the widespread use of lightweight materials to meet important engineering needs, such as passive energy absorption, but they are not in widespread use for structural applications, perhaps due to a large gap between the strength and stiffness to weight ratios of popular classical solids, and the performance of known lightweight cellular materials that are produced from the same constituent material. Stochastic cellular architecture results in distribution towards properties such as low stiffness, low strength, but good energy absorption and low thermal conductivity [Gibson, L., & Ashby, M., Cellular Solids, Structure and Properties, Cambridge University Press., Cambridge, UK, 1988]. Young's modulus of ultra-light stochastic materials generally follows $E \propto \rho 3$, as opposed to the $E \propto \rho 2$ relationship for random open cell foams with higher relative densities [Ma, H. S., Prévost, J. H., Jullien, R., & Scherer, G. W., "Computer simulation of mechanical structure-property relationship of aerogels", J. Non-Cryst. Solids, vol. 285, pp. 216-221, 2001]. The present analysis shows considerable improvements on this, with close to linear scaling over three orders of magnitude in density. Conventional analysis of stochastic cellular solids (i.e. foams) relies on simple mechanical cell models and dimensional arguments, verified with experimentation. Analysis of digital composites with the same methods (except that the mechanical models are not nearly as approximate as with analysis of foams) is shown to yield good predictions of experimental behavior, as well. However, unlike with stochastic foams, direct modeling and measurement of elements (with specific load tests) is possible at these scales.

The engineering of fiber reinforced composite materials has enabled structures with large reductions in weight for given strength and stiffness targets, but at very high design and processing costs, and many challenges producing mechanical interfaces (joints). For the field of fiber composite engineering, digital composites systems circumvent the conventional assumption that efficient composite design is one where micro-scale material features must constantly be adapted towards macro-scale design features, in an analog fashion. This analog simultaneous design and production of materials and components is currently performed at great expense. Performing this optimization in a digital fashion not only decouples the part design from the low level material design, but it allows for greatly increased design and prototyping freedom within the traditionally difficult realm of lightweight, strong, and stiff materials.

Digital materials promise scalable methods of producing functional things with reconfigurable sets of discrete and compatible parts, but the presence of many reversible connections has raised questions about the performance of the end result. It is shown here that, for a Digital Cellular Solid lattice structure composed of strut members and joints at intersection nodes, the joint strength can be tuned to have higher load capacity than the buckling load for the strut member in the structure, while still maintaining favorable relative density as well as corresponding relative strength and pre-buckling modulus performance. This is because geometric factors dictate that relative density scaling with connection volume is less dominant than relative density scaling with strut member aspect ratio, and simple column buckling analysis reveals that for slender strut members, there is generous allowable connection volume while still maintaining desirable relative density. The result allows for structures with very low hysteretic losses. With fiber composite parts, this can be accomplished as an ultra-light material and with post-buckling elastic collapse behavior that stays completely elastic over large additional strain, displaying much of the strength stiffness to weight benefits of solid fiber composites together with a superelastic phase that could be used to circumvent the typical energy release that characterizes conventional carbon fiber composite failure modes.

Strong, lightweight, reconfigurable and precisely shaped structures are desired in many fields (e.g., architecture, aerospace, transport, science). These can range from many kilometers scale elevated light railway infrastructure to meter scale vehicle structures, to low inertia measurement devices with micron scale features. This work proposes that the ability of Digital Materials to reconfigurably form tuned structures makes it a particularly valuable functional prototyping and manufacturing tool for these applications. These systems may be understood as a digital material for rapid prototyping and fabrication of any two-dimensional or three-dimensional shape with discretized resolution, from fiber reinforced composite material. This may be thought of as a kit of parts whose individual fiber layups and interconnectivity allows for tuned macro-assemblies. Therefore, a primary feature of fiber reinforced composite materials—the ability to engineer very specific mechanical material properties—is enhanced with this kit-of-parts method, whereby functional material properties as well as overall shape are tuned via the strategy for assembly of the parts.

When made from anisotropic fiber reinforced composites, digital composites function as a chain of discrete fiber composite parts that can be close to the strength of a monolithic part, as a low density, sparse structural system. Particular advantages over conventional fiber composites include manufacturing processes, serviceability, and reusability, in addition to the tunability and extensibility that are general goals of digital materials. This is accomplished by linking tiles that are individually tuned through their fiber layup, so that forces are transferred between the tiles, rather than having continuous fibers span entire macro-structures.

Collaboration with and review of the commercial aero-structures industry reveals potential benefits in prototyping, manufacturing, and maintenance costs for aero-structures in particular—based on fabrication by discrete addition, subtraction, and sorting. From a total systems perspective, consider that a Boeing 747 consists of approximately six million discrete parts, half of which are fasteners. Estimates for part count of similar planes are within an order of magnitude of this figure, and seem to scale roughly proportionally to volume. For the Boeing 747, commercial price is on the order of one hundred million U.S. dollars.

The current 737 fuselage is comprised of a couple of hundred thousand parts (depending on the sub-model), not including fasteners. Given the parts ratios for the 747, it may be assumed that an additional couple of hundred thousand fasteners are used to attach these parts to each other. With a factory system of about seven hundred people, about one fuselage per day is completed. Therefore it can be estimated that, on average, seven thousand parts are added to the assembly, per hour (or ten per person per hour), or about two per second. Not even counting the high level of automation that is integrated into this production process, just the people involved spend more than 1.7 megawatt hours assembling this part, based on well accepted estimated of human metabolic rate (100 W per person). Each part costs about ten watt hours of just manual labor to install. Estimating the total structural volume of this fuselage as a cylinder—which is four meters in diameter, forty meters long, and twenty five centimeters thick—gives about one hundred and twenty cubic meters. This would require about nine hundred thousand parts, if just the cuboct truss presented here were used. Trained students can place one of the cuboct truss parts every five minutes, so with the same workforce, the job would get done in five days.

Final comparison to conventional aero-structures must be from a functional constraint perspective. Is this a better way to build an airplane—does it more efficiently handle aerodynamic loads? From a simplified structural performance point of view, it may be useful to see where things are on a chart of strength or stiffness to density. Note on the solid material density to modulus charts, $E/\rho$ isocurves indicate modulus of elasticity remaining proportional to density. This means that for a given material (such as one that digital material components are made from), if you change the volumetric fill fraction of a continuum of that material and empty space (which gets counted towards the volume, but not the mass), the $E/\rho$ curve indicates the theoretical upper bound on the modulus of that altered material. The economics of flight dictate that for any given flight mechanism, lighter is better. A given flight mechanism will also depend to a fair degree on material stiffness, in order to push or react against the air.

Comparison of performance, between conventional aero-structures and Digital Composite replacements, was initially considered to be a simple task—all that is required is to place a digital material replacement part into the same testing apparatus that is used to qualify conventional parts. This, however, presents an interesting problem and point of discussion, since the qualification methods are tailored towards the structural design of the conventional part (they are not qualified to fly, for instance, by seeing if they can fly).

Referring to the loading test specifications for an actual aero-structure assembly, it can be seen that the complete structural system does not have extreme loading requirements. Aerodynamic loads are intrinsically quite distributed. In fact, it is clear that if the part were fabricated entirely as skinned commercially available structural honeycomb, it would far exceed the part specification (by three orders of magnitude, depending on the product). This latter method of construction is assumed to be prohibitively difficult, since there are various non-structural systems that need to reside in the interior of the part. Furthermore, it would suffer from the same production issues that partially compel this application for digital composites in the first place (for instance, larger monolithic structures provide fewer opportunities for qualification before the cost of a failed qualification test becomes too high).

An overall aero-structure deflection test may include a wing tip load that is applied via a winch cable attached to a bolt on the wing tip, for which a spar leading to the wing root is probably fairly close to an idealized structure. However, as a test of (especially extreme) operating conditions for a plane, this relies on an important assumption—that the surface material's (i.e. skin panels) contribution to the structural performance when the assembly is point loaded on a spar—gives you enough useful information about the spar's contribution to the structural performance when the assembly is surface loaded, such as in flight. This is justified if actual flight data (for wing deflection) matches the test deflections.

While the testing method may be well reasoned for the conventional structure, it is simply apples to airplanes to compare with digital material volumes in the same test. An entire digital composite wing, in the testing fixture for the conventional structure, would need special interfacing elements (which could be floating within the structure, in this case), in order to distribute the point loads of the conventional test. Yet, this kind of point loading remains just an approximation for the forces that these structures are subjected to in flight. It is possible that an airworthy digital material wing under conventional structure testing operations would simply have a handful of digital composite units rip loose at the loading points. The wing would otherwise stay intact (and undoubtedly still airworthy).

Perhaps it only will be a fair comparison when considered in terms of first principles of flight and definitions of safety factor. Additionally, conventional control surface structure attachment points represent perhaps unnecessary localized loading as a result of conventional design, and looking ahead to morphing structures, the safety factor would need to be redesigned.

Figure 46:
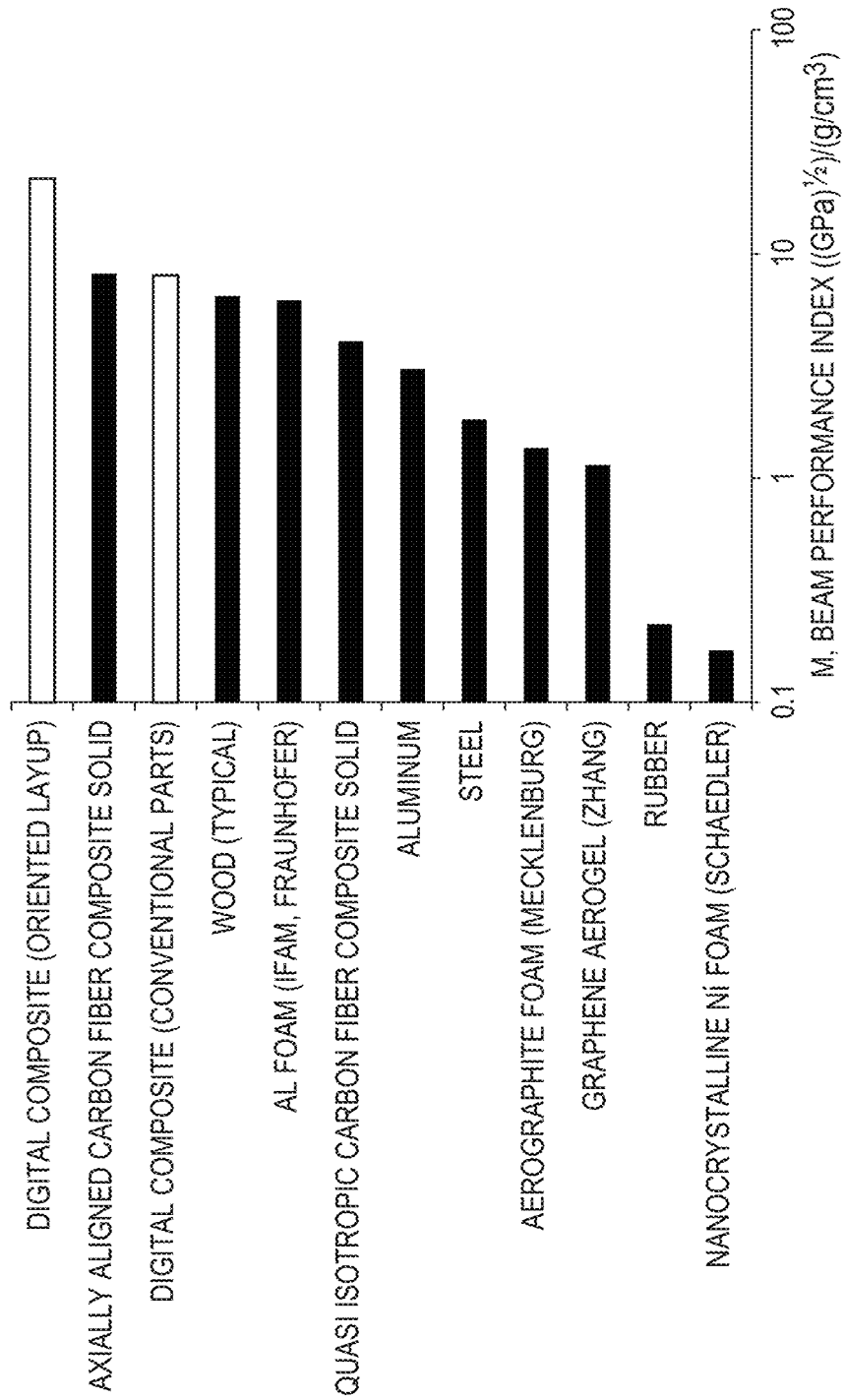
FIG. 46 is a chart of the beam performance indices of digital composites in comparison to traditional aero-structure materials.

A metric such as weight per span can be seen as a size independent indicator of flight efficiency, for given materials and construction methods. For instance, all birds are basically made out of the same materials with the same method of construction, and their wing performance per weight is known to follow a basic similarity law, regardless of their size. The critical aspect of materials and construction that affect flight is mechanical performance in beam bending [Cleveland, F. A., "Size Effects in Conventional Aircraft Design", Journal of Aircraft, vol. 7, no. 6, pp. 483-512, 1970]. Beam performance can be optimized for stiffness to weight via a beam performance index that is defined as the square root of the modulus of a material divided by the material density, for a given cross sectional shape [Ashby, M. F., & Cebon, D., "Materials Selection in mechanical design", Journal de Physique IV, Colloque C7, supplement au Journal de Physique III, vol. 3, 1993]. A chart of the beam performance indices of digital composites in comparison to traditional aero-structure materials is shown in FIG. 46.

The continually evolving quest for more efficient aircraft has always included a focus on strength to weight ratios. If an aero-structure can be made a modest amount lighter for the same stiffness (and therefore aerodynamic performance, by current convention), then a considerable weight of fuel is saved. This is because an initial fuel savings itself incurs a reduction in weight, which incurs additional reductions in aero-structural requirements, and additional reductions in weight [Cleveland, F. A., "Size Effects in Conventional Aircraft Design", Journal of Aircraft, vol. 7, no. 6, pp. 483-512, 1970]. Digital composites may therefore present an opportunity for a significant increase in engineered efficiency for high performance structures, including large scale static aero-structures. With the apparent opportunities to design structures with complex elastic modes, it may also be possible to access uncharted design space for structural kinematics, including with engineered flight, with digital composites.

Recent work in engineered flight is exploring the possibility that flapping wing flight can save aerodynamic power compared to fixed wing flight, by mechanisms such as interaction with self-induced wakes. To do this, relative to engineered flapping wing craft (ornithopters), it has been shown that biological flight employs a greater range of coordinated wing motions, including wing twist, span-wise bending, vertical flap, and horizontal flap [Lehmann, F. O., & Pick, S., "The aerodynamic benefit of wing-wing interaction depends on stroke trajectory in flapping insect wings", The Journal of Experimental Biology, vol. 210, pp. 1362-1377, 2007; Heathcote, S., Wang, Z., & Gursul, I., "Effect of spanwise flexibility on flapping wing propulsion", Journal of Fluids and Structures, vol. 24, pp. 183-199, 2008; Jongerius S. R., & Lentik, D., "Structural Analysis of a Dragonfly Wing", Experimental Mechanics, vol. 50, pp. 1323-1334, 2010]. The mechanical systems that achieve this in biology is observed to rely on sparse, lattice like arrangements of material, ranging from avian bones to insect wing cuticle (Wang et al 2008). Both examples employ considerably dense and stiff bio-materials, as constituent solids, for aero-structures with very low weight per span [Vincent, J. F. V. & Wegst, U. G. K., "Design and mechanical properties of insect cuticle", Arthropod Structure & Development, vol. 33, pp. 187-199, 2004], and which digital composites bear a passing resemblance to.

Digital composite electronics reconfigurator. Even in its densest form, Digital Material structures can maintain an integral and redundant set of communication channels (three dimensional mesh network) that allow for the diffusion of information, such as signaling of the need to adapt the structure. This means that the material can also be employed as part of sensing and monitoring equipment. For example, structural carbon fiber may be employed as strain gauges, heating elements, temperature detectors, capacitive energy storage devices, and more. Possible uses include structural health monitoring and even computational logic. Digital Material construction presents the ability to deploy this type of equipment in a scalable manner.

Furthermore, active or passive electronic circuits can be embedded in Digital Material structures, which can be constructed from a mix of conductive and insulating digital composite parts, allowing for the storage of information that may be used for purposes ranging from passive monitoring to altering overall shape. Carbon fiber heating elements are commercially available, and the use of graphite resistors as Resistance Temperature Detectors is common practice. With Digital Composites, the interfaces between parts may be set up to couple to each other (e.g. through carbon fiber), either conductively or electromagnetically. Commercially available in situ fiber reinforced polymer sensing and monitoring systems are very expensive, and many rely on custom designed schemes for embedding nonstructural components within parts.

Directional Connection Schemes. To illustrate the principle of using part types with various mechanical properties, consider the three examples of digital material data types shown in FIGS. 47A-C. These include one basic compression type and a paired (compatible) set of compression and tension types. The first is a basic orthotropic lattice system with diamond shaped parts and press-fit slotted interfaces ("Digital Composite A").

In FIG. 47A, the first part shows a raw assembly, and FIGS. 47B and 47C show the addition of boundary types that aid in transferring uniform loading patterns onto the lattice. The other set shown includes a compression specific component ("Digital Composite B, push cam") and a tension specific component ("Digital Composite C, pull cam"). These parts are shown assembled together into a single structure in FIG. 47C. The geometry of the load transfer mechanisms defines their function as a tension or compression component.

Figure 48A:
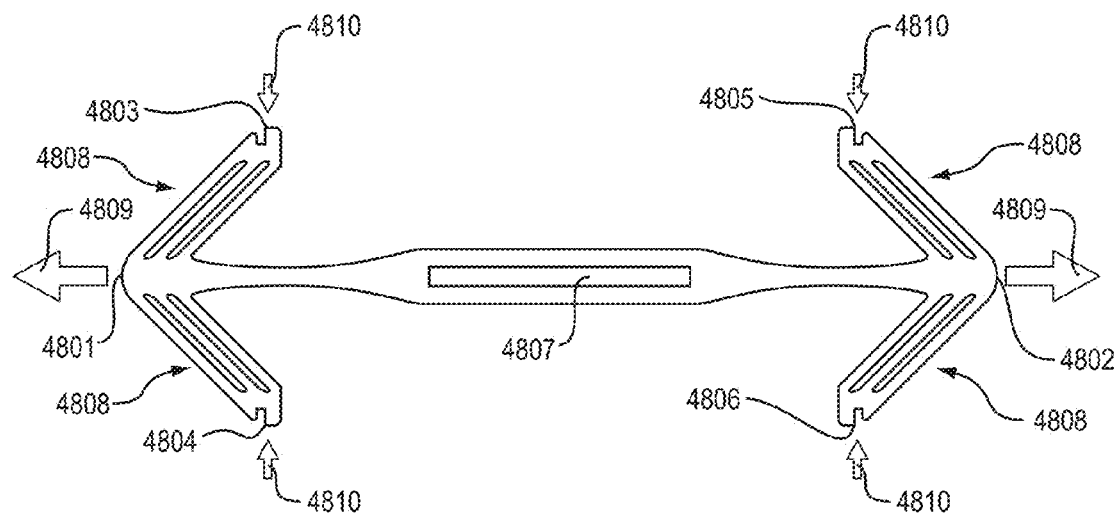
FIG. 48A-B depict an exemplary tension unit and an exemplary compression unit, respectively.
Figure 48B:
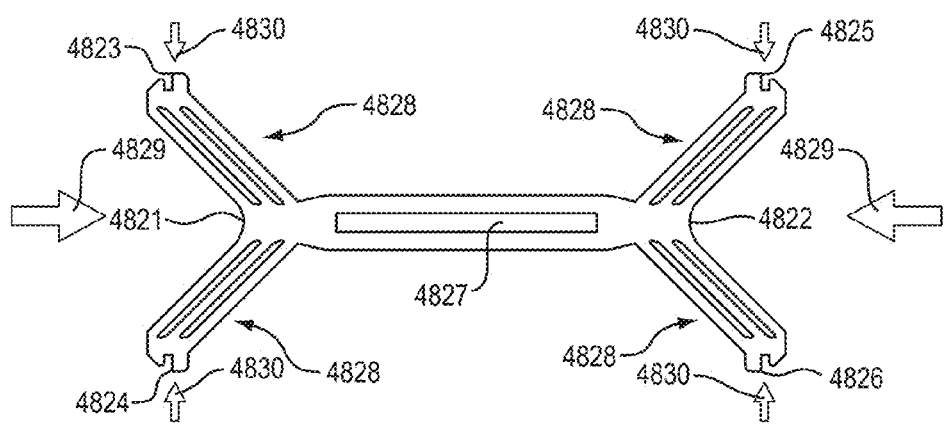

FIGS. 48A-B depict exemplary compatible tension and compression components, respectively, that can be used to assemble a tuned Snap Fit Digital Composite Volume. When tension-loaded along the primary axis, given a normal force on terminal ends 4803, 4804, 4805, 4806, 4823, 4824, 4825, 4826, provided through keyhole 4807, 4827 of its interlocked neighbor, flexural arms 4808, 4828 will provide a cam like action, transferring load to its orthogonal interlocked neighbors. The geometry of the load transfer mechanisms defines their function as a tension or compression component. Tension loading is indicated by arrows 4810 in FIG. 48A; compressive loading is indicated by arrows 4825 in FIG. 48B.

These compression units and tension units are carbon fiber epoxy composite parts with flexural locking mechanisms, requiring snap-fit preload for new parts only required at the normal to the already built structure. To add to a part, new pieces are pushed onto the outside of the structure, which allows an automated assembly mechanism to have a single degree of freedom for the procedure of installing a new part. In addition, the design transfers axial load on components to orthogonal neighboring elements.

Each compression unit and each tension unit includes flexural locking mechanisms and load transfer mechanisms. The flexural locking mechanisms comprise elastically compliant flexures 4808, 4828 with locking notches at their terminal 4803, 4804, 4805, 4806, 4823, 4824, 4825, 4826. These notches have chamfered outside edges, allowing the end of one unit (e.g., 4801) to snap into the keyhole (e.g., 4827) of another unit, as shown in more detail in FIGS. 49A-C. Keyholes 4807, 4827 allow two units (one from either direction) to be simultaneously locked in. For simplicity, this design allows these two units to enter side-by-side.

The load transfer mechanisms utilize the same armatures as the flexural locking mechanisms, loaded axially along the primary longitudinal axis (which intersects 4801, 4802 in FIGS. 48A and 4821, 4822 in FIG. 48B), instead of transversely, as when locking or unlocking units. Natural loading of this digital composite structure using these components will only result in axial loading of the individual components. The transverse forces required to assemble and disassemble structures (indicated by arrows 4810 in FIGS. 48A and 4830 in FIG. 48B) need to be provided by an external device, such as a robotic digital assembler.

Consider the tension unit shown in FIG. 48A: When tension-loaded along the primary longitudinal axis (which intersects 4801, 4802), and subjected to normal forces on terminal ends 4803, 4804, 4805, 2486 (which normal forces are along the same lines as arrows 4810, respectively, but opposite in direction to arrows 4810, respectively, and are in each case transmitted through the keyhole of an interlocked neighbor of the tension unit), flexural arms 4808 will provide a cam-like action, transferring load to its orthogonal interlocked neighbors.

Similarly, consider the compression unit shown in FIG. 48B: When compression-loaded along the primary longitudinal axis (which intersects 4821, 4822), and subjected to normal forces on terminal ends 4823, 4824, 4825, 4826 (which normal forces are along the same lines as arrows 4830, respectively, but opposite in direction to arrows 4830, respectively, and are in each case transmitted through the keyhole of an interlocked neighbor of the tension unit), flexural arms 4828 will provide a cam-like action, transferring load to its orthogonal interlocked neighbors.

Figure 49A:
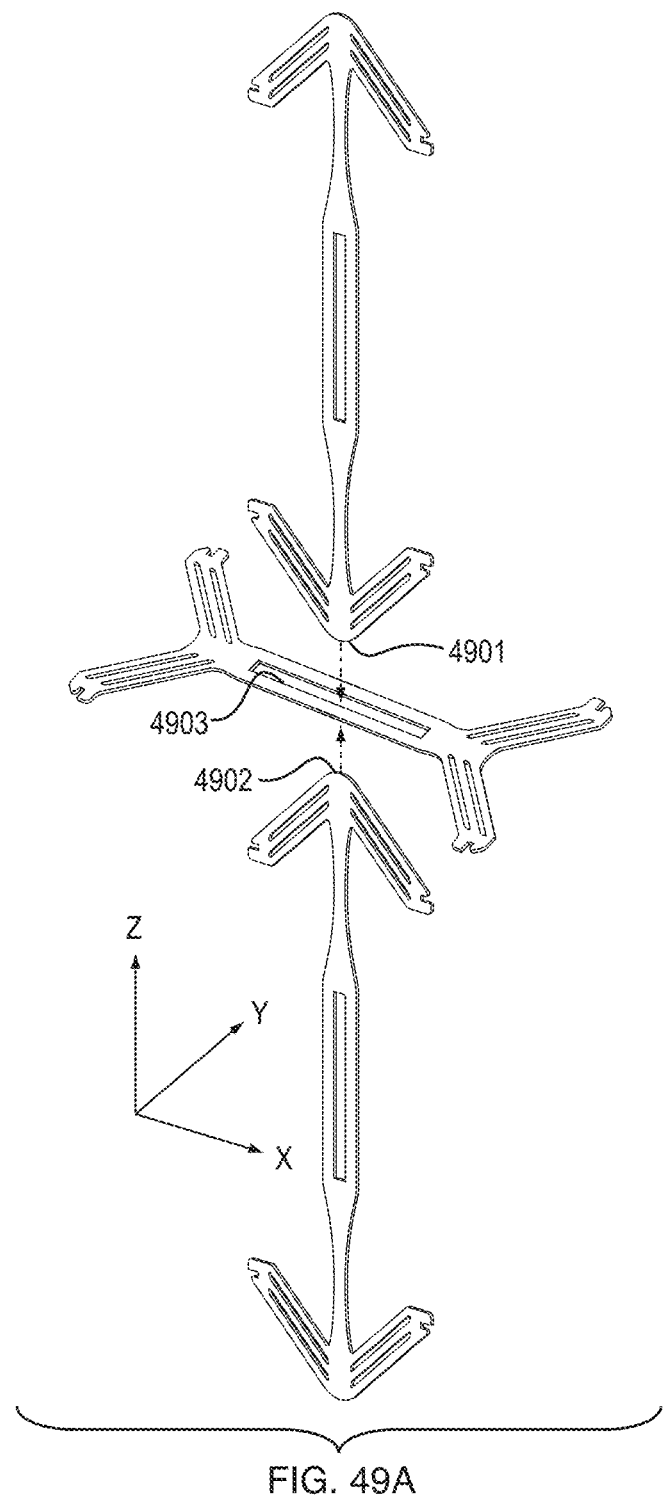
Figure 49B:
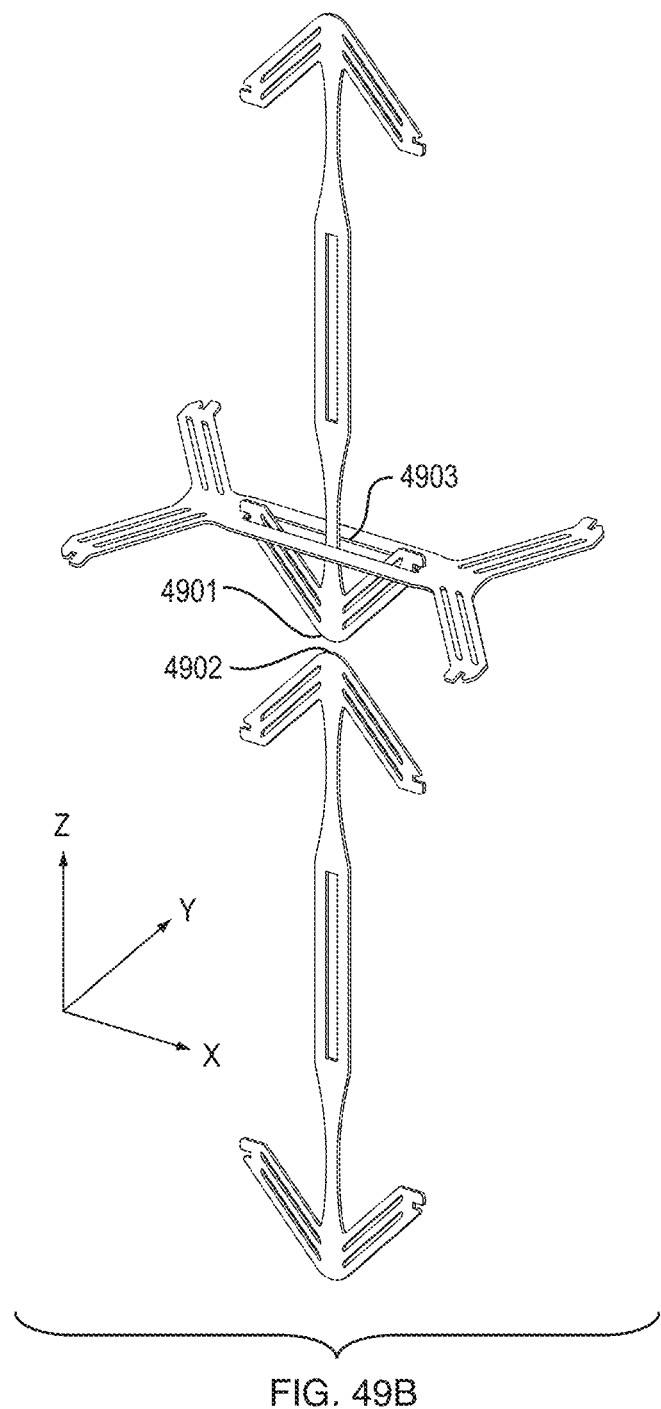
Figure 49C:
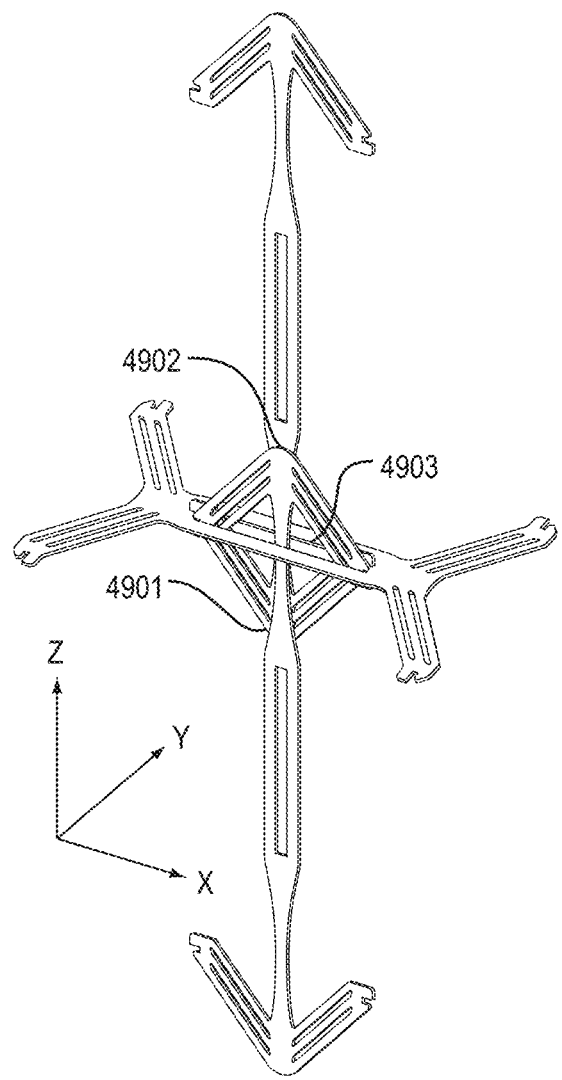

FIGS. 49A-C depict a directional connection schematic, wherein FIGS. 49A-C show three units being connected together, by inserting tip 4901 of a first unit and tip 4902 of a second unit into keyhole 4903 of a third unit. FIG. 49A shows the configuration before the tips are inserted into the keyhole, FIG. 49B shows the configuration after tip 4901 of the first unit has been inserted, and FIG. 49C shows the configuration after the two tips have been inserted into the keyhole.

Figure 50A:
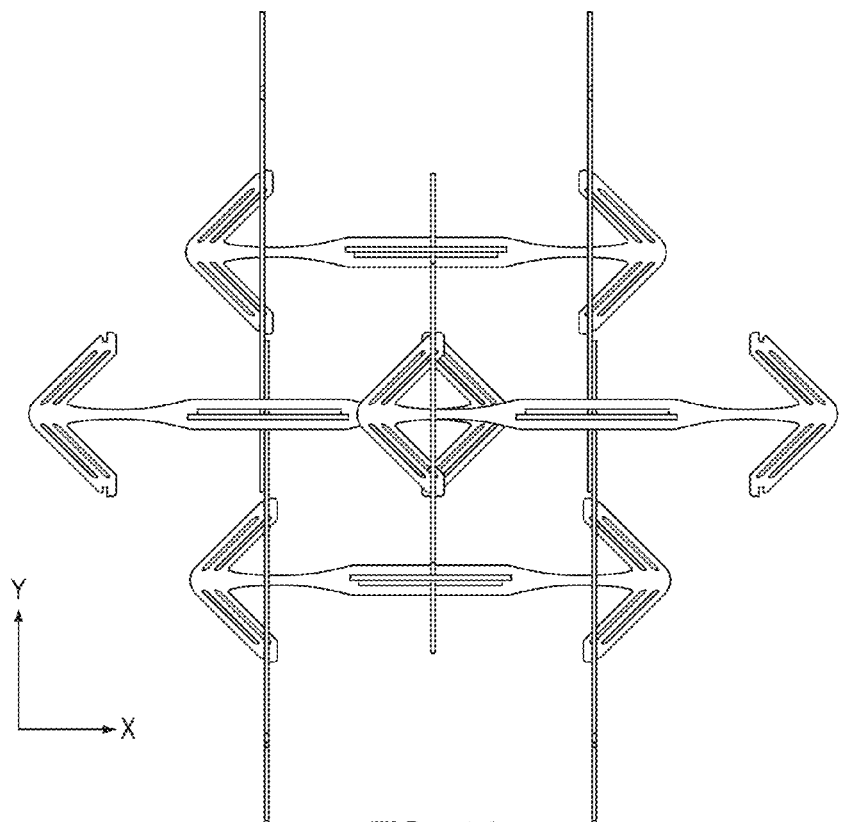
FIGS. 50A, 50C, and 50D depict different normal views.
Figure 50B:
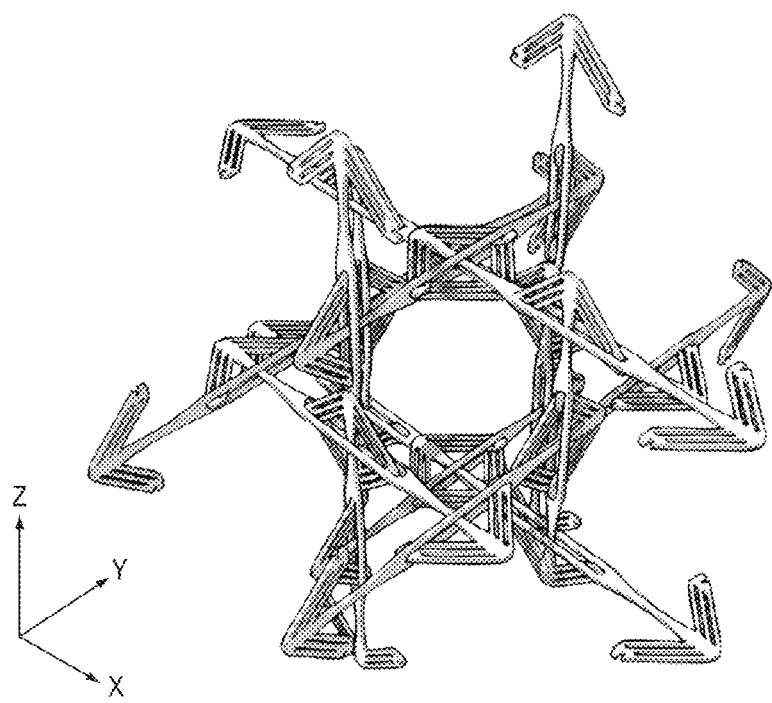
FIG. 50B depicts a perspective view, of an exemplary sparse structure that comprises tension elements.
Figure 50C:
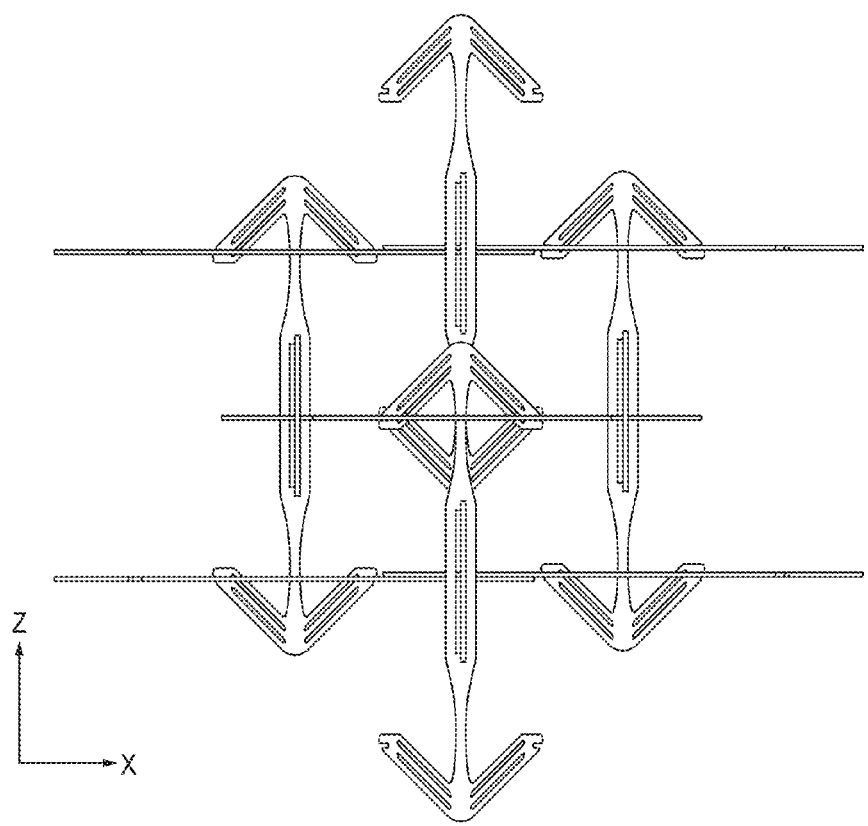
Figure 50D:
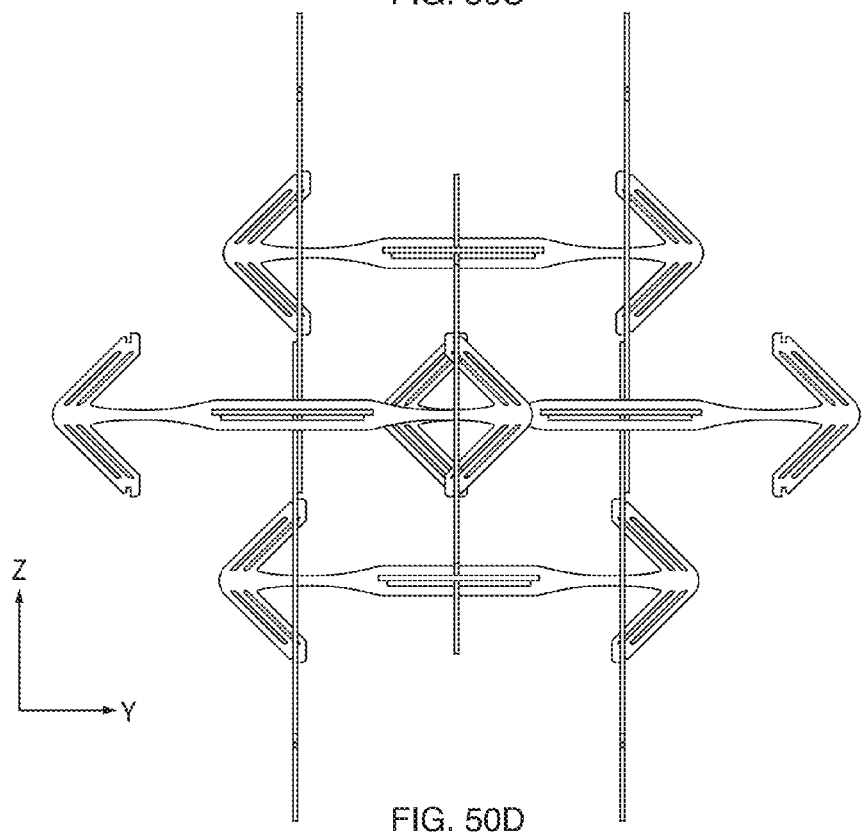
Figure 50E:
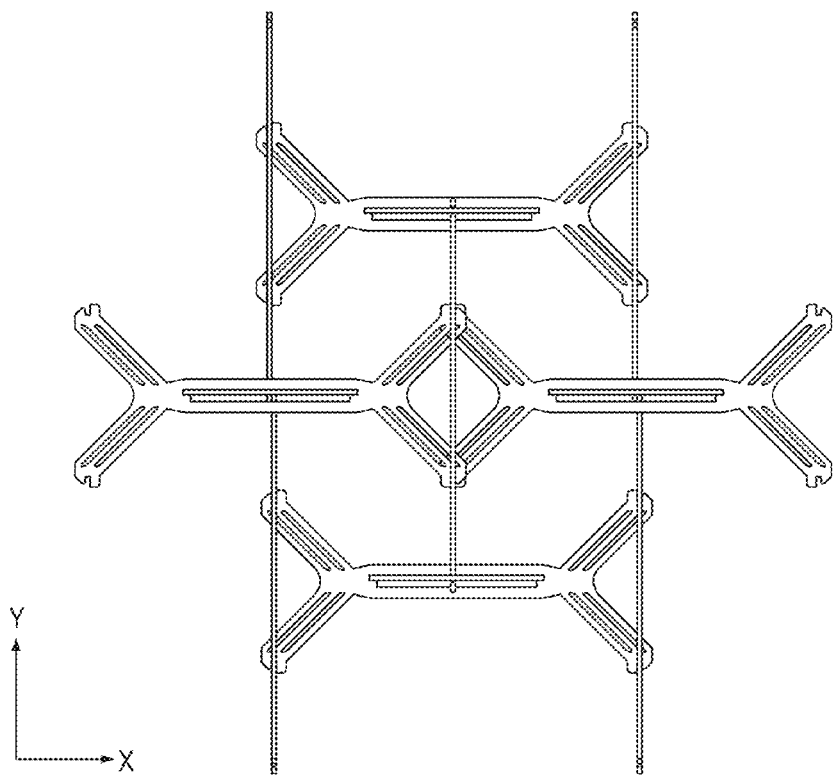
FIGS. 50E, 50G, and 50H depict different normal views.
Figure 50F:
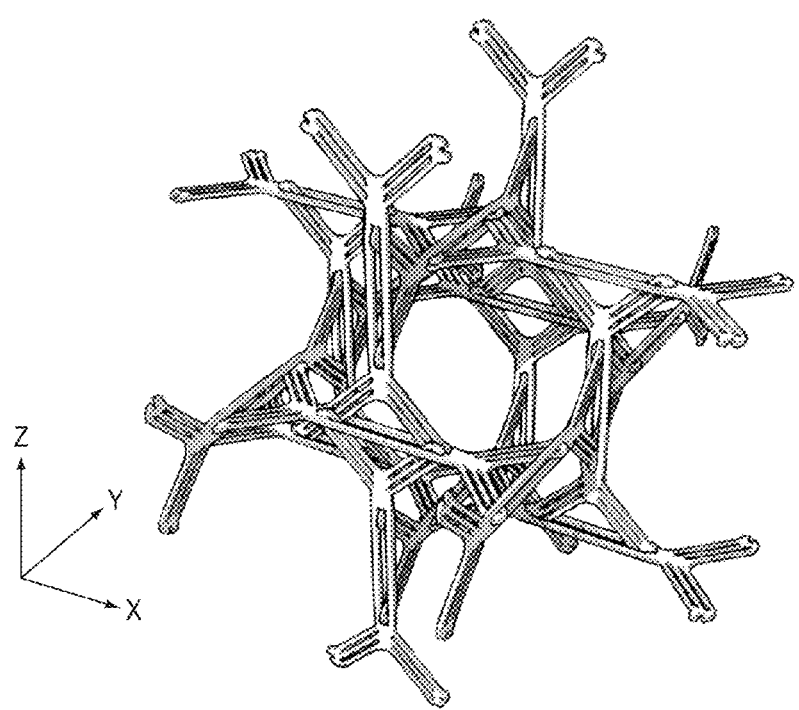
FIG. 50F depicts a perspective view, of an exemplary sparse structure that comprises compression elements.
Figure 50G:
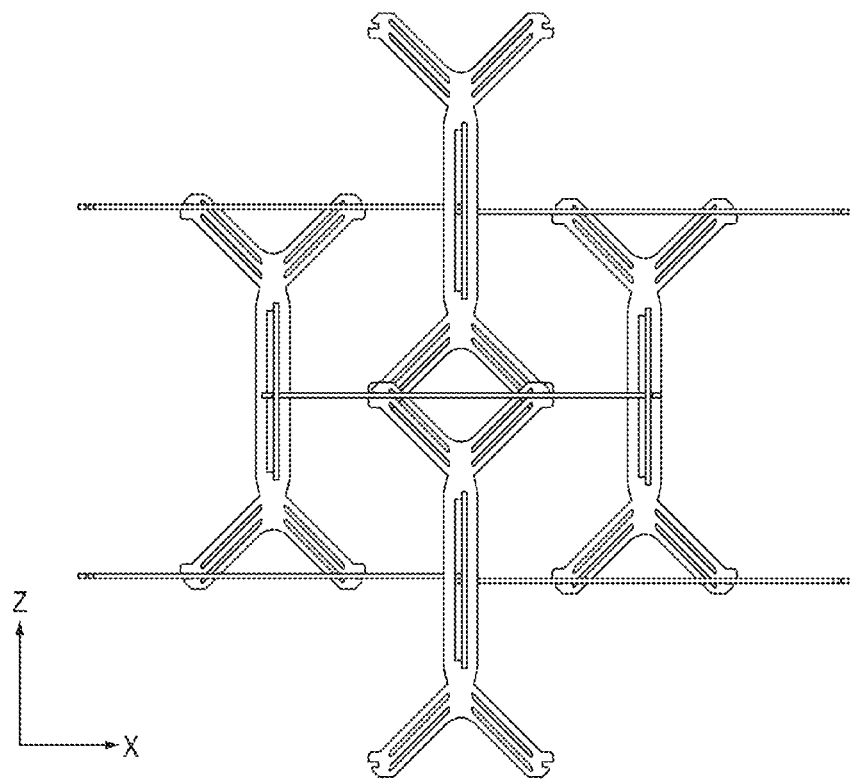
Figure 50H:
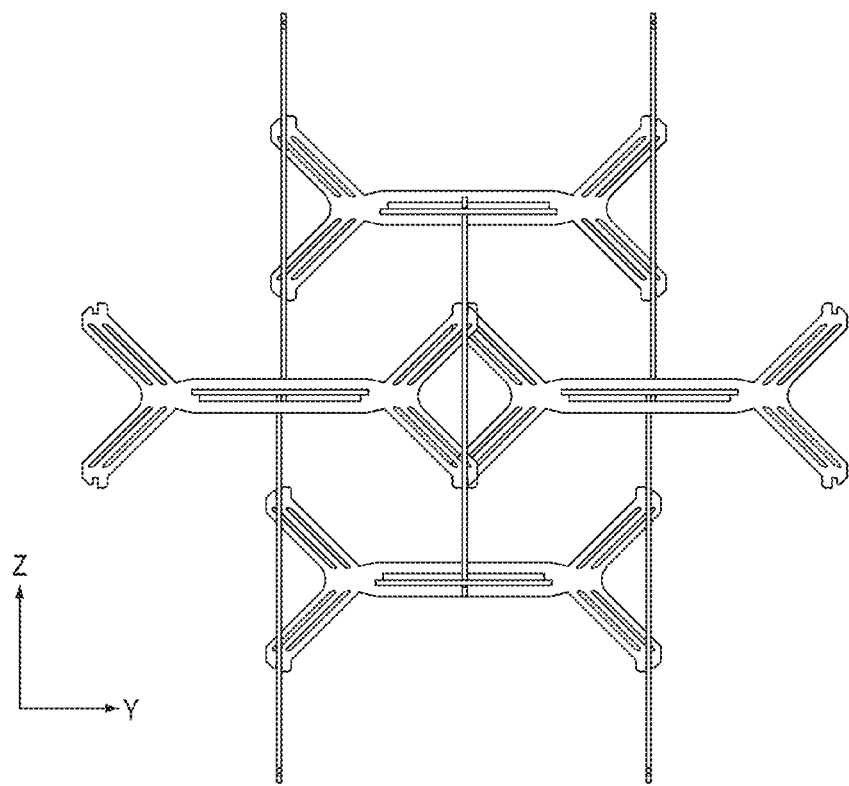

FIGS. 50A-H depict directional connection sub-structure types, built from tension-specific parts in FIGS. 50A-D and compression-specific parts in FIGS. 50E-H. FIGS. 50A, 50C, and 50D depict different normal views, and FIG. 50B depicts a perspective view, of an exemplary sparse structure that comprises tension elements. FIGS. 50E, 50G, and 50H depict different normal views, and FIG. 50F depicts a perspective view, of an exemplary sparse structure that comprises compression elements.

Through mechanical property programming, as described above, the bulk properties of the Digital Composite material can progress from primarily compressive strength through tensegrity-like properties to primarily tensile strength. Related attributes (eg., Poisson ratio), can be programmed as easily. Imagine having a container that any electronic "trash" can be tossed into for rapid disassembly by mechanical enzymes. This process would take vastly less energy than mining individual elements from the assemblies. The constituent parts are fundamental—power electronics, simple microprocessors, input devices, and output devices—get automatically evaluated for reuse, and organized into groups, floating around in the container. The same mechanisms in the container are capable of assembling the units to make new devices, according to codes passed in to the container. It is like a printer that takes old printed material as its feedstock.

Digital flexural mechanisms. Many engineered mechanisms could be replaced by digital flexural materials, as the latter provides for exponential tunability. A good example is medical orthoses and prostheses, which require tunability, extensibility, and very high strength and stiffness to weight ratios. These constraints have resulted in leading devices that cost around the same as conventional personal vehicles, which renders them inaccessible to many patients. Current prosthetics methods rely on expensive stocks of materials and parts with very limited reusability or recyclability. A digital composite kit could provide the tunability required of these devices, at a much lower cost and weight, with reusable parts.

Passive Shape Optimization and Resonant Aerodynamic Propulsion. A wing with digital material structure could be tuned to passively elastically deform to optimal shapes as a response to changes in load, load distribution, or pressure that results from changes in airspeed. Further, the notion of flapping—momentum transfer through non stream-wise motion—need not be restricted to the mass distribution that is commonly observed in nature. Resonant modes across a large structure could be tuned such that only small driving and control inputs are necessary to maintain speed.

Rapidly Deployable Infrastructure. In the long term, with completion of assemblers, these systems have the ability to gradually adapt to new load patterns, with mobile units that travel over the structure and delete portions of its own structure, as well as other units that are capable of adding new material. This is essentially a large scale version of the reconfigurator.

Three-Dimensional Villages. In the field of architectural construction, it is clear that conventional on-site assembly and materials processing methods are vastly less energy and time efficient than that which can be achieved in a factory. Proof of this problem is in the quantity of waste that is commonly produced during on-site building construction, which easily exceeds twenty percent of all solid waste in nations that collect such data [Horvath, A., "Construction Materials and the Environment", Annual Review of Environment and Resources, vol. 29, pp. 181-204, 2004; Bossink, B. A. G. and Brouwers, H. J. H., "Construction waste: quantification and source evaluation", Journal of Construction Engineering and Management, vol. 122, no. 1, pp. 55-60, 1996]. With conventional assembly methods, the assembly tools and machines must be larger than the product that is operated upon, to maintain metrology [Gershenfeld, Neil A., Fab: the coming revolution on your desktop—from personal computers to personal fabrication, Basic Books, New York, 2005]. It is not difficult to imagine the realms in which there are distinct efficiency advantages for production methods that allow the assembly tools and machines to be smaller than the final products. While there exist factory built assemblies at the building scale (i.e. airplanes, boats), architecture may always demand site specific and structural customization that precludes prefabrication (and the economics of optimization for transport as large units).

The total inhabitable natural surface of the earth is finite—global land area is estimated to be around 58×106 square miles. The human population has already exceeded seven billion. It is no surprise that the surface of the earth that has been developed for human inhabitation is increasing, accordingly. Assuming that the inhabitable surface of the earth stays constant, the earth's entire surface could possibly be used up within a few generations. If a continuously growing population is to be accommodated, then ways must be found to make cities more population dense.

Truly volumetric villages will have to be evolvable structures—the ability to perform in situ repairs and modifications is critical. In effect, the lifespan of the structure should be infinite. A part of the challenge, here, is to make the dense urban situation not only functional, but more desirable than the suburban condition. If a structure were sufficiently light for its strength and stiffness, it will be possible to sparsely distribute building throughout space, and maintain a very high population surface density. This can serve to consolidate land usage into hyper efficient meta-buildings, leaving the majority of the land available for agriculture and wilderness.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A product comprising a set of discrete units, the set of discrete units being reversibly assembled, or reversibly assemblable, into a structure, wherein:
   the units in the set are reversibly assembled, or are reversibly assemblable, into the structure according to a lattice geometry, wherein the units, when assembled according to the lattice geometry, together comprise a stretch-bend coupled material;
   a majority of the discrete units are each reversibly connected, or are reversibly connectable, to at least two other units in the set according to the lattice geometry; and
   wherein, in response to greater than minimal loading of the structure, a reversible deformation of at least part of the structure occurs.

2. The product of claim 1, wherein the reversible deformation of at least part of the structure is due to at least in part to at least one of: the shape of the units in the set, the material composition of the units in the set, the configuration of connections between the units of the set, and the configuration of the lattice geometry.

3. The product of claim 2, wherein the connections are elastic.

4. The product of claim 1, wherein the units in the set of discrete units are identical.

5. The product of claim 1, wherein the structure fully encloses an interior volume.

6. The product of claim 1, wherein some of the units include electrical conductors and others of the units do not include electrical conductors.

7. The product of claim 1, wherein the units are reversibly connected, or are reversibly connectible, to the other units in the set by connections that are flexural locking mechanisms, pinned locking mechanisms, or compression clips.

8. The product of claim 1, wherein at least some of the discrete units are reversibly connected to others of the discrete units by connections that transfer force between connected units.

9. The product of claim 1, wherein the units in the set of discrete units are of at least two types.

10. The product of claim 9, wherein at least one of the at least two types of units is a connector unit.

11. The product of claim 10, wherein at least one of the at least two types of units differs in material composition or property from at least another of the at least two types of units.

12. The product of claim 9, wherein the structure fully encloses an interior volume.

13. The product of claim 1, wherein at least some of the units comprise composite material.

14. A product comprising a set of discrete units, the set of discrete units being reversibly assembled, or reversibly assemblable, into a structure, wherein:
- the units in the set are reversibly assembled, or are reversibly assemblable, into the structure according to a lattice geometry;
- the units in the set of discrete units are of at least two types;
- a majority of the discrete units are each reversibly connected, or are reversibly connectable, to at least two other units in the set according to the lattice geometry; and
- wherein, in response to greater than minimal loading of the structure, a reversible deformation of at least part of the structure occurs.

15. The product of claim 14, wherein at least one of the at least two types of units is a connector unit.

16. The product of claim 15, wherein at least one of the at least two types of units differs in material composition or property from at least another of the at least two types of units.

17. The product of claim 14, wherein the reversible deformation of at least part of the structure is due to at least in part to at least one of: the shape of the units in the set, the material composition of the units in the set, the configuration of connections between the units of the set, and the configuration of the lattice geometry.

18. The product of claim 17, wherein the connections are elastic.

19. The product of claim 14, wherein some of the units include electrical conductors and others of the units do not include electrical conductors.

20. A product comprising a set of discrete units, the set of discrete units being reversibly assembled, or reversibly assemblable, into a structure, wherein:
- the units in the set are reversibly assembled, or are reversibly assemblable, into the structure according to a lattice geometry;
- at least some of the units comprise composite material;
- a majority of the discrete units are each reversibly connected, or are reversibly connectable, to at least two other units in the set according to the lattice geometry; and
- wherein, in response to greater than minimal loading of the structure, a reversible deformation of at least part of the structure occurs.

* * * * *